(12) United States Patent
Sekiguchi

(10) Patent No.: US 7,019,809 B2
(45) Date of Patent: Mar. 28, 2006

(54) LIQUID CRYSTAL DISPLAY PANEL HAVING AN INSULATING MEMBER TO PROTECT LEAD ELECTRODES

(75) Inventor: Kanetaka Sekiguchi, Sayama (JP)

(73) Assignee: Citizen Watch Co., Ltd, Tokyo (JP)

( * ) Notice: Subject to any disclaimer, the term of this patent is extended or adjusted under 35 U.S.C. 154(b) by 29 days.

(21) Appl. No.: 10/450,711

(22) PCT Filed: Jun. 28, 2002

(86) PCT No.: PCT/JP02/06578

§ 371 (c)(1),
(2), (4) Date: Jun. 24, 2003

(87) PCT Pub. No.: WO03/003108

PCT Pub. Date: Jan. 9, 2003

(65) Prior Publication Data

US 2004/0046909 A1 Mar. 11, 2004

(30) Foreign Application Priority Data

Jun. 29, 2001 (JP) .............................. 2001-197963
Oct. 5, 2001 (JP) .............................. 2001-309298

(51) Int. Cl.
*G02F 1/1333* (2006.01)
*G02F 1/1343* (2006.01)
*G02F 1/1345* (2006.01)

(52) U.S. Cl. ...................... 349/149; 349/147; 349/152; 349/138; 345/104; 361/720

(58) Field of Classification Search ................ 349/149, 349/147, 152, 138; 257/737; 345/104; 361/720
See application file for complete search history.

(56) References Cited

U.S. PATENT DOCUMENTS

| 6,157,079 A | * | 12/2000 | Taguchi | 257/737 |
| 6,411,359 B1 | * | 6/2002 | Kobayashi et al. | 349/149 |
| 6,535,261 B1 | * | 3/2003 | Anno et al. | 349/147 |
| 6,738,123 B1 | * | 5/2004 | Takahashi et al. | 349/152 |
| 2002/0044251 A1 | * | 4/2002 | Togashi et al. | 349/149 |

FOREIGN PATENT DOCUMENTS

| JP | 49-40957 | 4/1974 |
| JP | 60-67984 | 4/1985 |
| JP | 60-126979 | 8/1985 |
| JP | 61-52629 | 3/1986 |
| JP | 2-79023 | 3/1990 |

(Continued)

*Primary Examiner*—Huyen Ngo
(74) *Attorney, Agent, or Firm*—Westerman, Hattori, Daniels & Adrian, LLP

(57) ABSTRACT

A liquid crystal display panel having a first substrate and a second substrate that are opposed to each other with a predetermined gap provided therebetween. A liquid crystal layer is sealed in the gap with a sealant, and pixel portions are formed by electrodes, the electrodes being provided on the first substrate and on the second substrate to oppose to each other via the liquid crystal layer. Lead electrodes for applying electric signals to the electrodes forming the pixel portions are provided on at least the first substrate. An insulating covering member is provided to cover at least portions of the lead electrodes outside the sealant and to overlap with at least a portion of a surface of the second substrate opposite to the liquid crystal layer side. An insulating resin is provided on the insulating covering member or between the insulating covering member and the first substrate.

63 Claims, 26 Drawing Sheets

FOREIGN PATENT DOCUMENTS

| | | |
|---|---|---|
| JP | 4-25732 | 6/1992 |
| JP | 4-72224 | 6/1992 |
| JP | 5-8831 | 2/1993 |
| JP | 9-33941 | 2/1997 |
| JP | 10-268792 | 10/1998 |
| JP | 2000-181368 | 6/2000 |

* cited by examiner

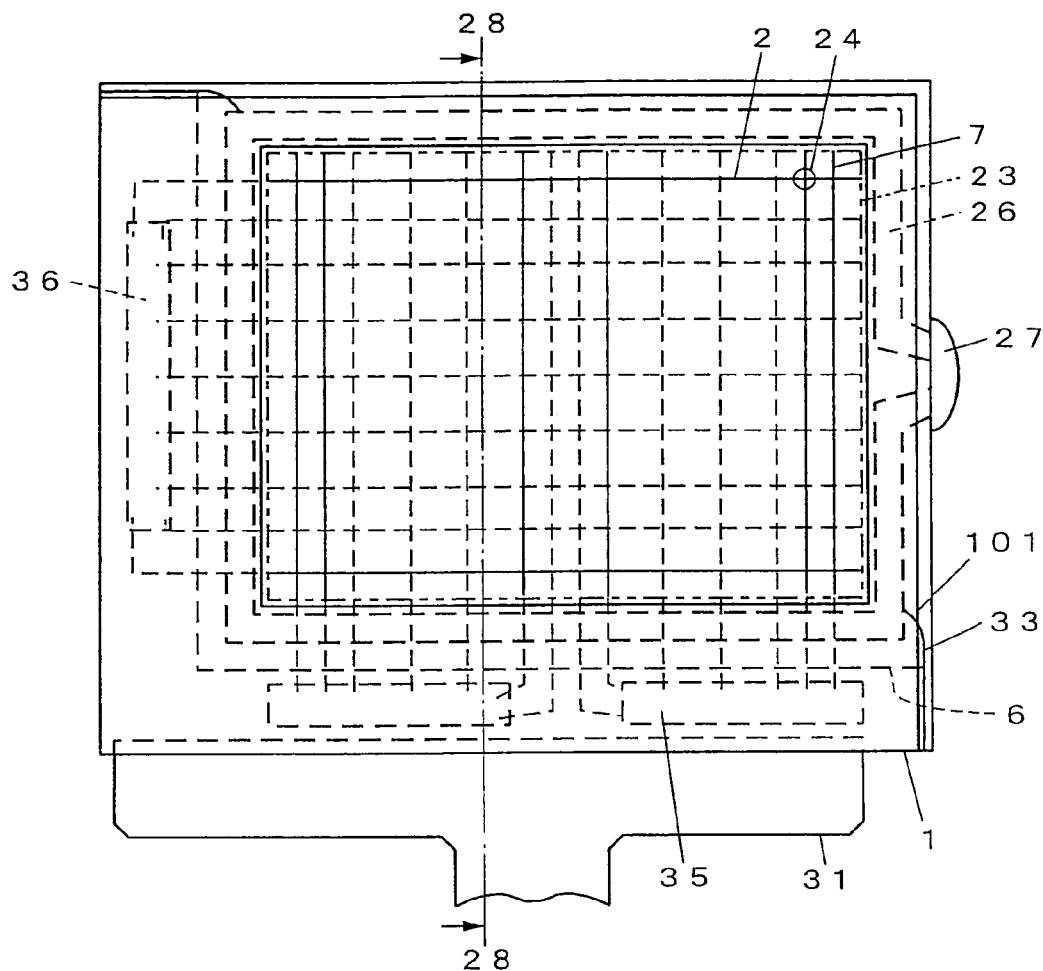
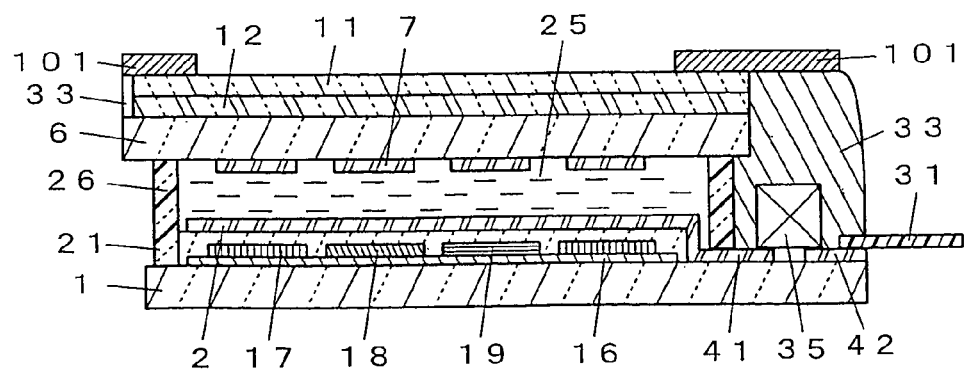

F I G. 3 7
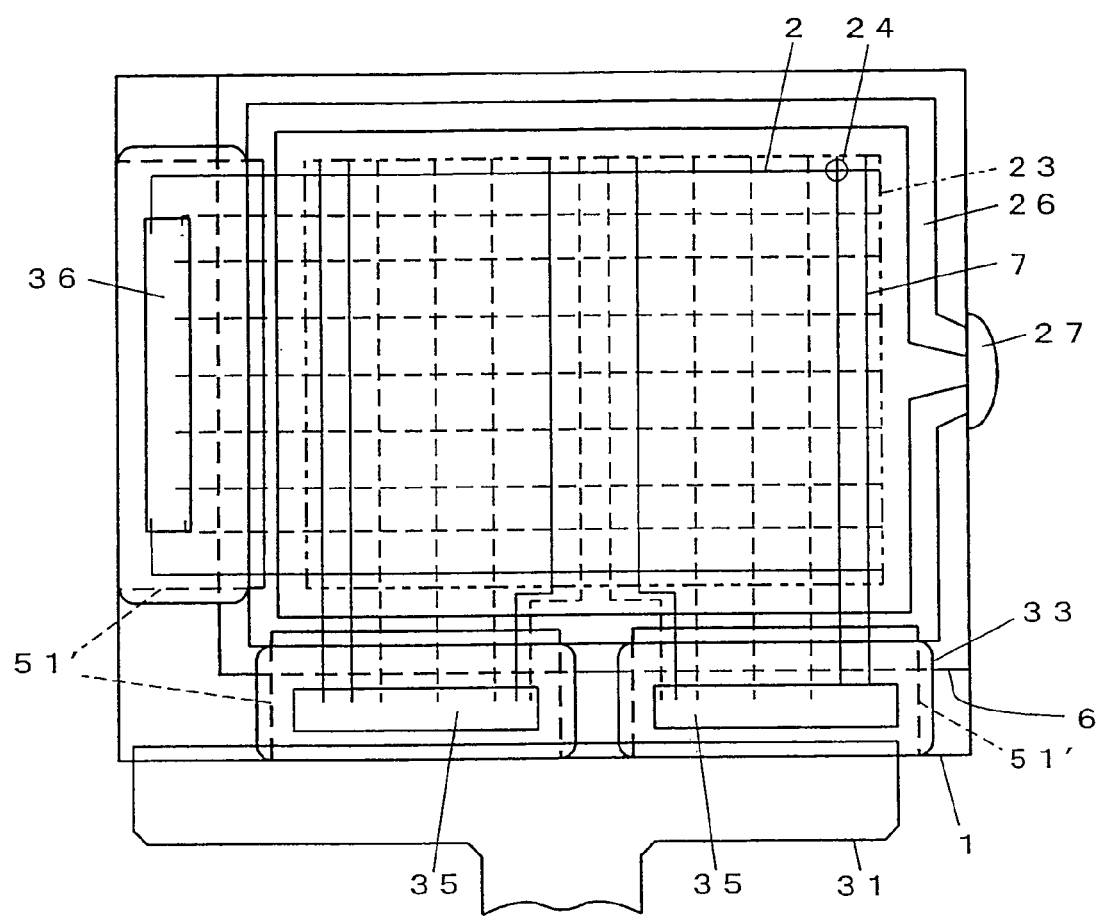

LIQUID CRYSTAL DISPLAY PANEL HAVING AN INSULATING MEMBER TO PROTECT LEAD ELECTRODES

TECHNICAL FIELD

The present invention relates to a liquid crystal display panel characterized in a structure for preventing electrolytic corrosion of lead electrodes for applying electric signals to electrodes forming pixel portions, and a method for fabricating such a liquid crystal display panel.

BACKGROUND TECHNOLOGY

Conventionally, a liquid crystal display panel has been used in which a first substrate and a second substrate are opposed to each other with a predetermined gap provided therebetween, a liquid crystal layer is sealed in the gap with a sealant, pixel portions are formed by electrodes, the electrodes being provided on the substrates to oppose to each other via the liquid crystal layer, and lead electrodes for applying electric signals to the electrodes forming the pixel portions are provided at least on the first substrate. In such a liquid crystal display panel, the electric signals applied to the electrodes forming the pixel portions change optical characteristics of the liquid crystal layer to control ON/OFF states of the pixel portions for performance of display.

The configuration of such a conventional liquid crystal display panel will be described using FIG. 41 to FIG. 43 taking, as an example, a reflective liquid crystal display panel for use in a cellular phone, a personal digital assistant, a timepiece, and the like. FIG. 41 is a plan view of the conventional liquid crystal display panel, FIG. 42 is a cross-sectional view taken along a line 42—42 shown in FIG. 41, and FIG. 43 is a partially enlarged plan view of a part (in circle C) in FIG. 41.

This liquid crystal display panel is, as shown in FIG. 41, a matrix-type liquid crystal display panel having m stripe first electrodes 2 provided on a first substrate 1 and n stripe second electrodes 7 provided on a second substrate 6, and a display region 23 constituted of m by n pixel portions 24 being intersections of the first electrodes 2 and the second electrodes 7. The first substrate 1 and the second substrate 6 are opposed to each other with a predetermined gap provided therebetween with not-shown spacers and are bonded together with a sealant 26 as shown in FIG. 42, and a liquid crystal layer 25 is sealed in the gap and hermetically sealed with a closing member 27 so that hermeticity is ensured.

Further, as shown in FIG. 42, a reflector 16 composed of an aluminum film or a silver alloy film is provided on the second substrate 6, and a color filter which is composed of a red (R) color filter 17, a green (G) color filter 18, and a blue (B) color filter 19 is provided on the reflector 16. Thereon, a flattening protective film 21 is provided to flatten projections and depressions of the color filter and prevent an electrical short circuit between the reflector 16 and the second electrodes 7, and the second electrodes 7 are provided on the flattening protective film 21. Furthermore, on the first electrodes 2 and on the second electrodes 7, alignment films (not shown) are provided to align liquid crystal molecules in the liquid crystal layer 25 in predetermined directions.

By the way, in this liquid crystal display panel, as shown in FIG. 41, the first substrate 1 is made larger in size than the second substrate, and a driving integrated circuit (IC) 36 for applying driving signals to the first electrodes 2 and driving ICs 35 for applying driving signals to the second electrodes 7 are mounted on the first substrate 1. Note that the second substrate 6 is made to have a size larger than the display region 23 and not to reach a region where the driving ICs 35 and 36 are provided on the first substrate 1.

Then, lead electrodes continued to the first electrodes 2 for connecting the first electrodes 2 and the driving IC 36 are led out from the display region 23 to the outside of the sealant 26. On the lead electrodes, the driving IC 36 is mounted through an anisotropic conductive film containing conductive particles in a polyimide resin, and the film is compressed by heat to cure, so that the first electrodes 2 are connected to the driving IC 36 through the lead electrodes.

Further, lead electrodes 41 for connecting the second electrodes 7 and the driving ICs 35 are provided on the first substrate. A portion of the sealant 26 is composed of an anisotropic conductive sealant containing conductive particles in an acrylic resin, and a pressure is applied to the second substrate 6 and the first substrate 1 through the anisotropic conductive sealant, so that the second electrodes 7 provided on the second substrate 6 are electrically conducted through the conductive particles to the lead electrodes 41 provided on the first substrate 1. Then, the driving ICs 35 are mounted on the lead electrodes 41 similarly to the case of the above-described driving IC 36, so that the second electrodes 7 are connected to the driving ICs 35 through the lead electrodes 41.

Further, to apply signals to the driving ICs 35 and 36 from an external circuit, a flexible printed circuit board (FPC) 31 connected to the driving ICs 35 and 36 through connecting electrodes 42 shown in FIG. 42 and FIG. 43 is provided. Note that the FPC 31 and the driving ICs 35 and 36 are connected to the connecting electrodes 42 through an anisotropic conductive film.

In such a conventional liquid crystal display panel, as shown in FIG. 43, an insulating resin 32 is applied to a portion where the lead electrodes 41 are provided on the first substrate 1 to prevent occurrence of a potential difference between adjacent lead electrodes 41 and adherence of contamination or moisture thereto. As this insulating resin 32, an epoxy resin having low moisture permeability or a silicon resin having low moisture absorbability is used.

However, in a fabrication process of a liquid crystal display panel body, a mounting process of the driving integrated circuits 35, or a mounting process of the FPC 31, if contamination adheres thereto, pinholes form in the insulating resin 32, or the insulating resin 32 has an insufficient moisture blocking property, the electrode material melts (is corroded) at a portion of the lead electrode 41 to create an electrolytically corroded portion 47 as shown in FIG. 43, finally giving rise to a phenomenon that the lead electrode 41 is broken, when the liquid crystal display panel is driven for a long time or in an atmosphere at a high temperature and high humidity. Therefore, when the electrolytically corroded portion 47 is created, the driving signals from the driving ICs 35 and 36 cannot be transmitted to electrodes constituting the pixel portion 24, which makes it impossible to perform intended display, and as a result, the display quality of the liquid crystal display panel is significantly reduced.

The connecting electrode 42 for establishing connection with the FPC 31 can have an electrode width and gap between electrodes which are larger than those of the lead electrode 41 and thus can be structured to be relatively insusceptible to electrolytic corrosion. On the other hand, the lead electrode 41 has to have a small electrode width and gap between electrodes to increase the pixel density within the display region 23 and thus becomes susceptible to electrolytic corrosion.

Therefore, it is very important to prevent the electrolytically corroded portion 47 from being created in the lead electrode 41 even when the liquid crystal display panel is used in the atmosphere at a high temperature and high humidity, in order to increase the usable range of the liquid crystal display panel and keep good display quality for a long time. Besides, since there is a strong demand for a reduction in size and cost of the liquid crystal display panel, it is also important to prevent the electrolytically corroded portion 47 from being created without greatly departing from the thickness and size of the conventional liquid crystal display panel and with suppressing an increase in cost and weight to a minimum. More than that, an electrolytic corrosion preventing structure is necessary which can cope with various kinds of methods for connecting lead electrodes to external circuits and driving ICs.

It should be noted that a structure shown in FIG. 44 is also well known as a connecting structure for preventing moisture entrance into a connecting portion in a flat display panel in which an FPC is directly connected to a lead electrode.

This flat display panel is a thin film EL (electro luminescent) display panel in which a lead electrode 94 provided on a glass substrate 91 is bonded and connected to an FPC 95 with a solder 96, a resin 97 is filled in a region including the connecting portion on the glass substrate 91, and further a protective glass plate 98 is disposed on the resin 97.

The protective glass 98 provided on the resin 97 as described above can decrease the area of the resin 97 in contact with air and prevent moisture entrance into the lead electrode 94 and corrosion of the lead electrode 94.

Even in this structure, however, it is conceivable that moisture enters through between a rear glass substrate 92 and the protective glass plate 98, and thus it cannot be said that the structure is sufficient in moisture blocking property and accordingly electrolytic corrosion preventing ability.

It is an object of the present invention to solve such problems and greatly reduce occurrence of electrolytic corrosion at a lead electrode using a simple technique with the size and weight of a conventional liquid crystal display panel being secured.

DISCLOSURE OF THE INVENTION

In order to attain the above object, the liquid crystal display panel of the invention is a liquid crystal display panel, in which a first substrate and a second substrate are opposed to each other with a predetermined gap provided therebetween, a liquid crystal layer is sealed in the gap with a sealant, pixel portions are formed by electrodes, the electrodes being provided on the first substrate and on the second substrate to oppose to each other via the liquid crystal layer, and lead electrodes for applying electric signals to the electrodes forming the pixel portions are provided at least on the first substrate, wherein an insulating covering member is provided to cover at least portions of the lead electrodes outside the sealant and overlap with a portion of the second substrate.

In such a liquid crystal display panel, it is preferable to mount an integrated circuit element on the lead electrodes, and provide the insulating covering member also on the integrated circuit element.

Besides, in addition to that or in stead of that, it is preferable to provide a flexible connecting board connected to the integrated circuit element, and provide the insulating covering member also at least on a portion of the flexible connecting board.

Alternatively, it is also adoptable that the insulating covering member is provided on both faces of the flexible connecting board, also on a side face of the second substrate, or also on a side face of the first substrate or on a face of the first substrate opposite to a face provided with the lead electrodes.

Besides, it is also adoptable that a polarizing film is provided on at least one of the first substrate and the second substrate, and the insulating covering member is provided also on the polarizing film or also between the polarizing film and the substrate provided with the polarizing film.

Further, it is also adoptable that a reflecting layer is provided on one of the first substrate and the second substrate.

Besides, in such a liquid crystal display panel, it is preferable that an insulating resin is provided on the insulating covering member. Further, it is adoptable that a second insulating covering member is provided on the insulating resin.

Besides, it is preferable that the insulating covering member is an insulating layer formed in a vacuum condition, and is an insulating layer containing silicon or an insulating layer made of metal oxide.

Further, it is preferable that the insulating covering member is smaller in thickness than the liquid crystal layer.

Further, it is preferable that the insulating covering member has a structure in which two or more different kinds of insulating films are laminated.

Furthermore, it is preferable that the insulating covering member is 200 nm to 500 nm in thickness.

The liquid crystal display panel of the invention is the above-described liquid crystal display panel, in which an insulating resin is provided to cover at least portions of the lead electrodes outside the sealant, and the insulating covering member is provided thereon.

In such a liquid crystal display panel, it is preferable that a portion where the first substrate, the insulating resin, the second substrate, and the insulating covering member overlap one another as seen from the first substrate side, is provided.

Besides, it is also adoptable that the first substrate and the insulating covering member are bonded together with the insulating resin, or that the insulating covering member is bonded to both the first substrate and the second substrate with the insulating resin.

Besides, in such a liquid crystal display panel, it is also adoptable to mount an integrated circuit element on the lead electrodes, and provide the insulating resin between the integrated circuit element and the sealant.

Further, it is preferable that the insulating covering member has portions overlapping with the insulating resin, the integrated circuit element, and the second substrate, respectively as seen from the first substrate side, or that the insulating covering member is in contact with both the integrated circuit element and the second substrate.

Besides, it is preferable to provide a flexible connecting board for connecting the integrated circuit element and an external circuit. In this case, it is preferable that the insulating covering member has portions overlapping with the insulating resin, the second substrate, and the flexible connecting board, respectively as seen form the first substrate side, or that the insulating covering member has portions overlapping with the insulating resin, the integrated circuit element, the second substrate, and the flexible connecting board, respectively as seen form the first substrate side.

Alternatively, it is also adoptable to provide a flexible connecting board directly connected to the lead electrodes.

In this case, it is preferable that the insulating covering member has portions overlapping with the insulating resin, the second substrate, and the flexible connecting board, respectively as seen form the first substrate side.

Besides, in the above-described liquid crystal display panel, it is preferable that the insulating resin is composed of at least two kinds of resins, or that the insulating covering member has a thermal expansion coefficient equal to that of the first substrate or the second substrate.

Besides, it is also adoptable to provide a polarizing film, and use the polarizing film as the insulating covering member. It is also adoptable that the insulating covering member is provided to be in contact with the polarizing film. It is also adoptable that the insulating covering member is provided to have a predetermined gap with the polarizing film.

In the above liquid crystal display panel, it is preferable that the insulating covering member is formed of glass, plastic, ceramics, or metallic material. Further, it is preferable to provide a gas barrier layer or a moisture blocking layer.

Further, it is preferable that a second insulating covering member is provided on the insulating covering member, and the second insulating covering member is an anodic oxide layer of the metallic material.

Besides, it is preferable that the insulating resin is constituted of an epoxy resin, an ultraviolet curing resin, or a silicon resin, and it is also adoptable that the insulating resin has a light absorption material.

It is preferable that the insulating resin is composed of a first insulating resin for covering at least portions of the lead electrodes and a second insulating resin for sealing a space formed by the first insulating resin, the first substrate, and the second substrate.

Besides, it is preferable that the insulating covering member has a face in contact with the insulating resin and in a direction perpendicular to the first substrate.

Then, it is preferable that the insulating covering member is provided with an opening. In this case, it is preferable that the opening is provided at a portion not overlapping with the lead electrodes. Besides, it is preferable that the opening is an opening for introducing the insulating resin, and the insulating resin has a swollen structure in the opening.

Besides, it is also adoptable that the insulating covering member has a U-shaped cross section and is provided such that the first substrate is in contact with inside of the letter U. In this case, it is preferable that the insulating covering member is in contact with at least two faces out of six faces being top and bottom, right and left, and front and back faces of the first substrate, that the insulating covering member is provided with a substrate groove for fitting the first substrate therein, or that a flexible connecting board for connecting the liquid crystal display panel to an external circuit is provided, and the insulating covering member is provided with an opening for passing the flexible connecting board therethrough.

Alternatively, in the above-described liquid crystal display panel, it is preferable to provide a flexible connecting board for connecting the liquid crystal display panel to an external circuit, and provide the insulating resin also at least on respective portions of both faces of the flexible connecting board.

Alternatively, it is preferable that the insulating covering member is composed of a black member and is used as a panel cover to be provided on an outer periphery of a display region constituted of the pixel portions.

Besides, it is also adoptable to provide a flexible connecting board for connecting the liquid crystal display panel to an external circuit, and use a portion of the flexible connecting board as the insulating covering member.

Alternatively, it is preferable that an outer shape of the second substrate aligns with an outer shape of the sealant at least on a side where the lead electrodes are led out to the outside of the sealant.

It is also adoptable that a second insulating covering member is provided on the insulating covering member.

Besides, in the above-described liquid crystal display panel, it is preferable to mount an integrated circuit element on the lead electrodes, and provide the insulating covering member also on the integrated circuit element and color it in black on the integrated circuit element.

Alternatively, it is preferable that an outer peripheral wall for preventing the insulating resin from flowing out is provided on at least a portion of an outer periphery of a region where the insulating resin is to be provided.

Besides, it is preferable that the insulating covering member is provided in a plurality of divided parts.

It is preferable that the insulating covering member is 80 μm to 150 μm in thickness.

Besides, a method for fabricating a liquid crystal display panel of the invention includes: a step of preparing a liquid crystal display panel in which a first substrate and a second substrate are opposed to each other with a predetermined gap provided therebetween, a liquid crystal layer is sealed in the gap with a sealant, pixel portions are formed by electrodes, the electrodes being provided on the first substrate and on the second substrate to oppose to each other via the liquid crystal layer, and lead electrodes for applying electric signals to the electrodes forming the pixel portions are provided at least on the first substrate; a step of mounting an integrated circuit element or a flexible connecting board on the lead electrodes; a resin applying step of applying an insulating resin onto the lead electrodes at least outside the sealant; an insulating covering member disposing step of disposing an insulating covering member on the insulating resin to cover at least portions of the lead electrodes outside the sealant and overlap with a portion of the second substrate; and a curing step of curing the insulating resin, the steps being performed in this order.

In such a method for fabricating a liquid crystal display panel, it is preferable to provide, prior to the insulating covering member disposing step, a step of disposing a polarizing film on the first substrate or on the second substrate.

Alternatively, it is preferable to provide, between the insulating covering member disposing step and the curing step, a low-viscosity insulating resin applying step of applying a low-viscosity insulating resin lower in viscosity than the insulating resin to seal a space formed by the insulating resin, the first substrate, and the second substrate, wherein the curing step is a step of curing the insulating resin and the low-viscosity insulating resin.

Alternatively, it is preferable to provide, prior to the resin applying step, a low-viscosity insulating resin applying step of applying a low-viscosity insulating resin lower in viscosity than the insulating resin to at least a portion of a space between the first substrate and the second substrate outside the sealant.

Further, it is preferable to provide, between the low-viscosity insulating resin applying step and the resin applying step, a low-viscosity insulating resin curing step of curing the low-viscosity insulating resin.

Besides, in the method for fabricating a liquid crystal display panel, it is preferable to provide, prior to the resin applying step, an outer peripheral wall setting step of providing an outer peripheral wall for preventing the insulating resin from flowing out on at least a portion of an outer periphery of a region to which the insulating resin is to be applied.

A method for fabricating a liquid crystal display panel of the invention includes: a step of preparing a liquid crystal display panel in which a first substrate and a second substrate are opposed to each other with a predetermined gap provided therebetween, a liquid crystal layer is sealed in the gap with a sealant, pixel portions are formed by electrodes, the electrodes being provided on the first substrate and on the second substrate to oppose to each other via the liquid crystal layer, and lead electrodes for applying electric signals to the electrodes forming the pixel portions are provided at least on the first substrate; a step of mounting an integrated circuit element or a flexible connecting board on the lead electrodes; and an insulating covering member forming step of forming an insulating covering member by a vacuum sputtering or a chemical deposition (CVD) method to cover at least portions of the lead electrodes outside the sealant and overlap with a portion of the second substrate, the steps being performed in this order.

In such a method for fabricating a liquid crystal display panel, it is preferable that the insulating covering member forming step is performed at a temperature equal to or lower than 150° C.

Besides, it is preferable to provide, prior to the insulating covering member forming step, a polarizing film disposing step of disposing a polarizing film on the first substrate or on the second substrate.

Further, it is preferable that the polarizing film disposing step is a step of disposing a polarizing film having a protective film, and to provide, after the insulating covering member forming step, a step of removing the protective film of the polarizing film.

Besides, in the above-described method for fabricating a liquid crystal display panel, it is preferable to provide, prior to the insulating covering member forming step, a step of performing for at least a region where the insulating covering member is to be provided a plasma treatment using any one of an oxygen plasma, an inert gas such as an argon gas, an oxygen gas, and a nitrogen gas, or a mixture gas of two or more kinds of these.

The liquid crystal display panel of the invention in such a structure that the lead electrodes to be provided at least on the first substrate are led out to the outside from the inside of the sealant sealing the liquid crystal layer, employs the structure, as described above, in which the insulating covering member composed of the thin film insulating layer is provided to cover at least the portions of the lead electrodes outside the sealant and overlap with a portion of the second substrate, in order to prevent the material of the lead electrodes from being electrolyzed (electrolytically corroded) by an electric current generated by application of a voltage between adjacent lead electrodes caused by moisture adhering onto the lead electrodes. It is preferable to use, as the thin film insulating layer, a dense film with no moisture permeability and capable of being formed at 100° C. to 200° C.

This thin film insulating layer, which is formed not only on the lead electrodes but also on the integrated circuit element and side faces thereof, and, in addition, on a boundary between the lead electrodes and the integrated circuit element, enables better prevention of moisture permeation.

When a tape automated bonding (TAB) is performed, or when the first substrate or the second substrate is connected to a flexible connecting board (flexible printed circuit board: FPC) or a circuit board in which circuits are formed on a plastic substrate, the moisture permeability can be made very low by providing the thin film insulating layer on the tape carrier package, FPC, or plastic substrate as well as on the electrodes on the first substrate or the second substrate.

Further, the insulating resin composed of the epoxy resin or the silicon resin is provided on the thin film insulating layer, which enables prevention of physical breakage of the thin film insulating layer and enhancement of prevention of electrolytic corrosion. Besides, the thin film insulating layer can be made dense and low in moisture permeability by employing a single film or laminated films of a silicon nitride film, a silicon oxide film, or silicon nitride oxide film as the thin film insulating layer.

Further, a thin film insulating layer composed of metal oxide such as a tantalum oxide film, a titanium oxide film, or the like can be used to form a dense film at a low temperature, which allows use of substrates or mounted members low in resistance temperature.

Although ultraviolet rays might be generated when such a film is formed, the liquid crystal layer can be protected from the generated ultraviolet rays by providing the thin film insulating layer after bonding a polarizing film having an ultraviolet cutting layer, so that the thin film insulating layer can be formed without particular protection of the liquid crystal layer. Further, since moisture permeation into the polarizing film can be prevented by forming the thin film insulating layer in the above-described order and providing the thin film insulating layer also on the polarizing film, the reliability of the polarizing film can be improved.

Further, since the surface of the sealant or closing member sealing the liquid crystal layer can also be covered with the thin film insulating layer if it is formed by the vacuum sputtering or the CVD method, moisture permeation into the liquid crystal layer can be prevented, which makes it possible to improve the reliability of the liquid crystal display panel and to keep the display quality constant.

When, as in a reflective liquid crystal display device, a reflector for blocking ultraviolet rays or a member for absorbing ultraviolet rays as the color filter is provided on the side of the substrate facing the liquid crystal layer, this member can prevent irradiation of ultraviolet rays to the liquid crystal layer. There is no need to limit, in particular, the portion where the thin film insulating layer is to be formed, and thus a configuration in which the thin film insulating layer is provided also on a display face facilitates the formation of the thin film insulating layer.

Further, use of a plastic substrate (film substrate) as the substrate is more effective because the thin film insulating layer can decrease the moisture permeability of the substrate to prevent moisture permeation into the liquid crystal layer. Further, when the thin film insulating layer is formed on both the first substrate and the second substrate, almost all the surfaces of the plastic substrate can be covered with the thin film insulating layer, so that the reliability can be improved.

Further, in a two-layered structure composed of the thin film insulating layer and the insulating resin, a multi-layered thin film insulating layer, or a three-layered structure composed of the thin film insulating layer, the insulating resin, and the second thin film insulating layer, pinholes penetrating all of them hardly form, which can decrease variation of the reliability. Further, for prevention of pinhole formation in the thin film insulating layer, repetition of steps of film formation of the thin film insulating layer, surface cleaning, and film formation a plurality of times can effectively prevent the pinhole formation.

When the liquid crystal display panel is used under a harsh condition, the glass substrate, the plastic substrate, or the second insulating covering member composed of a covering member whose surface is subjected to insulation treatment is provided on a portion overlapping with the lead electrodes formed with the thin film insulating layer, in order to prevent flaw of the thin film insulating layer and improve the hydrophobic property in the lead electrodes. When a covering member thicker than the thin film insulating layer is used, the covering member can be made low in moisture permeability and keep the state of the low moisture permeability because a flaw or the like generated by an external force never penetrates the covering member with ease.

Here, such a method is also conceivable that the insulating film is formed in advance on the first substrate 1 as a structure for suppressing occurrence of an electrolytically corroded portion. However, when the insulating film is formed before a so-called cell forming step of providing a gap between the first substrate and the second substrate, bonding them with the sealant, and sealing the liquid crystal layer therein, it is necessary to remove the insulating film and form contact holes at predetermined positions in order to establish electrical connection between bump electrodes of the driving integrated circuit and the electrodes on the first substrate 1, but this step requires positional accuracy and thus it is difficult to perform by a printing method. Therefore, a photolithography step and an etching step are required, which leads to increased cost. Further, the accuracy of the photolithography step and etching step depends on the material of the insulating film, giving rise to a problem that etching at a high accuracy is difficult to perform for a material suitable for preventing electrolytic corrosion. In contrast to this, the insulating covering member composed of the thin film insulating layer for use in the invention does not need such a photolithography step and etching step, and thus can be easily formed for prevention of electrolytic corrosion.

Besides, the liquid crystal display panel of the invention also employs a structure in which a covering member is provided as the above-described insulating covering member. In this case, the insulating resin is provided to cover at least the portions of the lead electrodes outside the sealant, and the covering member is provided thereon.

The covering member for use here can be a plastic plate having a predetermined thickness, a glass plate, a metal plate, a substrate composed of a metal plate provided with an anodic oxide layer as a second insulating covering member, a ceramic plate, or a laminated bonded material. These are very low in moisture permeability and not a film formed by application as the insulating resin, so that formation of bubbles and pinholes therein can be greatly reduced.

In the case of the plastic plate, by providing a gas barrier layer such as a silicon oxide film, a silicon nitride film, or an aluminum oxide film, or a moisture blocking film composed of a moisture barrier layer, moisture entrance into the lead electrodes can be greatly decreased.

Besides, when the integrated circuit element (IC) for driving the liquid crystal display panel is mounted on the lead electrodes provided on the first substrate by the Chip on Glass (COG) mounting method, if the covering member is provided with the second substrate and the IC as a screen, a gap between the first substrate and the covering member can be made uniform. Moreover, by applying the insulating resin to the face of the IC opposite to the face in contact with the lead electrodes and the second substrate and bonding the covering member thereto, the covering member can be securely held.

Further, a conductive film, for example, a transparent conductive film or the like provided on the face of the covering member opposite to the face in contact with the IC can realize not only prevention of moisture permeation into the lead electrodes but also reduction of electrostatic shock to the IC at the same time.

Besides, when the FPC is bonded onto the first substrate with the anisotropic conductive film by application of a pressure, electrolytic corrosion of the FPC connecting portion in contact with the FPC can be concurrently prevented by providing the covering member on the lead electrodes and on the anisotropic conductive film.

Further, when the first insulating resin is applied onto the lead electrodes provided on the first substrate, and the second insulating resin, different in characteristics from the first insulating rein, is applied to the face in contact with the covering member, that is, between the first insulating resin and the covering member, even a resin incapable of being applied thick because it has a large stress, or an insulating resin taking a long curing time due to the existence of the covering member, as the first insulating resin on the first substrate side, becomes usable. Furthermore, even an insulating resin which cures in a very short time as of an ultraviolet curing type can be used as the second insulating resin.

Besides, when the driving integrated circuit of the liquid crystal display panel is directly mounted on portions of the lead electrodes provided on the first substrate by the COG method, if a light absorbing material is mixed into the insulating resin, an increase in power consumption and malfunction of the IC due to the light can be prevented. Further, use of a material having a light shielding property as the covering member can extremely limit the light passage into the IC in the liquid crystal display panel.

Besides, for securer hermeticity by the insulating resin and the covering member, it is preferable to provide the second insulating resin, which is lower in viscosity than the first insulating resin, in a space near the sealant formed by the first substrate, the second substrate, and the sealant. As a result, the first insulating resin having a high viscosity forms a bank on the periphery, while the second insulating resin having a low viscosity can be made to permeate into the space securely and to bond to the covering member.

Furthermore, it is possible that a covering protector which is adjacent to the covering member, overlaps with a portion of the first substrate, and has a face also in a direction of a cross section side wall of the first substrate, is provided at the outer peripheral portion of the first substrate, to prevent the insulating resin from flowing down and reduce non-application of the insulating resin in the space between the first substrate and the second substrate.

BRIEF DESCRIPTION OF DRAWINGS

FIG. 27 is a plan view of a liquid crystal display panel of a sixteenth embodiment of the invention;

FIG. 28 is a cross-sectional view taken along a line 28—28 in FIG. 27;

FIG. 37 is a plan view of a liquid crystal display panel of a twenty-second embodiment of the invention;

BEST MODE FOR CARRYING OUT THE INVENTION

Embodiments of the invention will be described with reference to the accompanying drawings to describe the invention in more detail.

Figure 1:
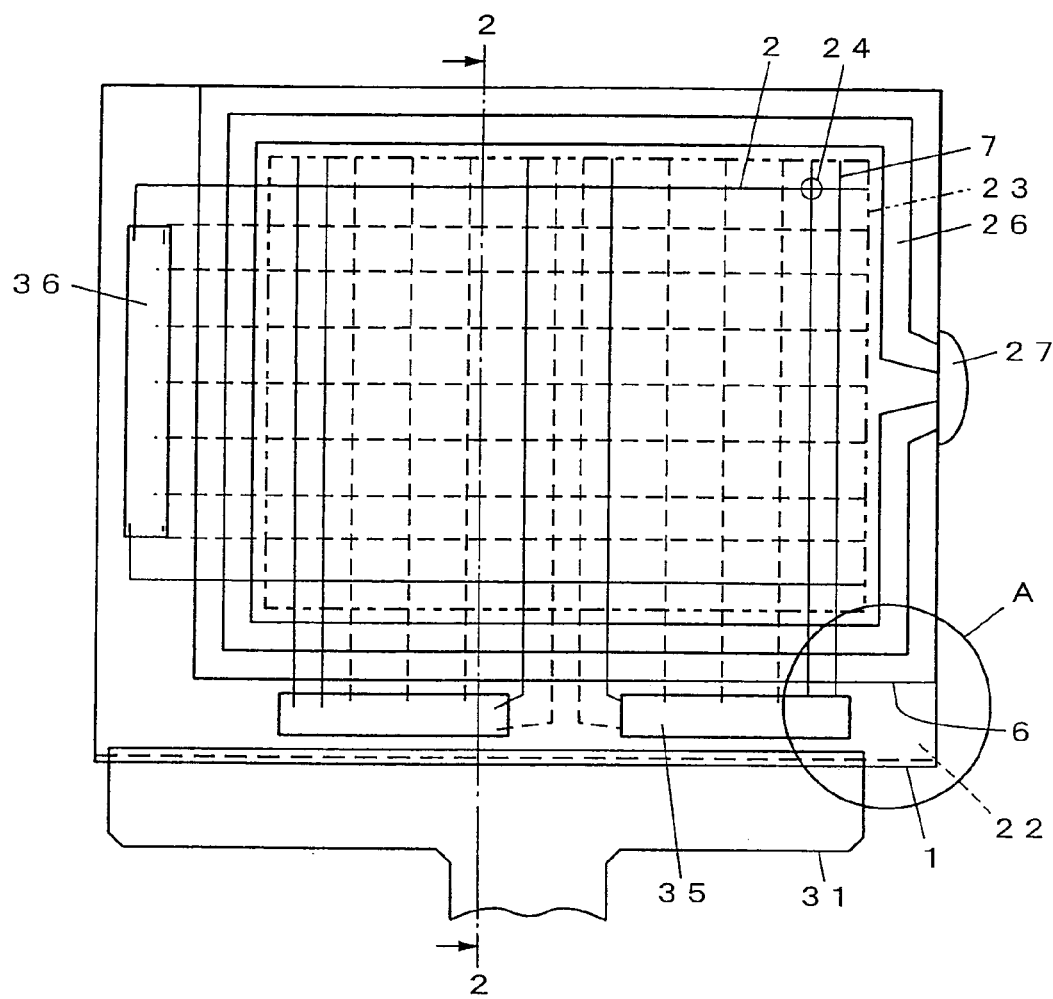
FIG. 1 is a plan view of a liquid crystal display panel of a first embodiment of the present invention.
Figure 2:
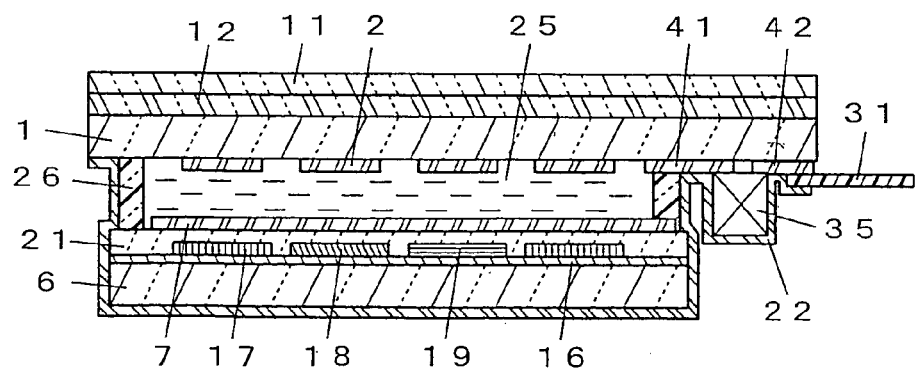
FIG. 2 is a cross-sectional view taken along a line 2—2 shown in FIG. 1.
Figure 3:
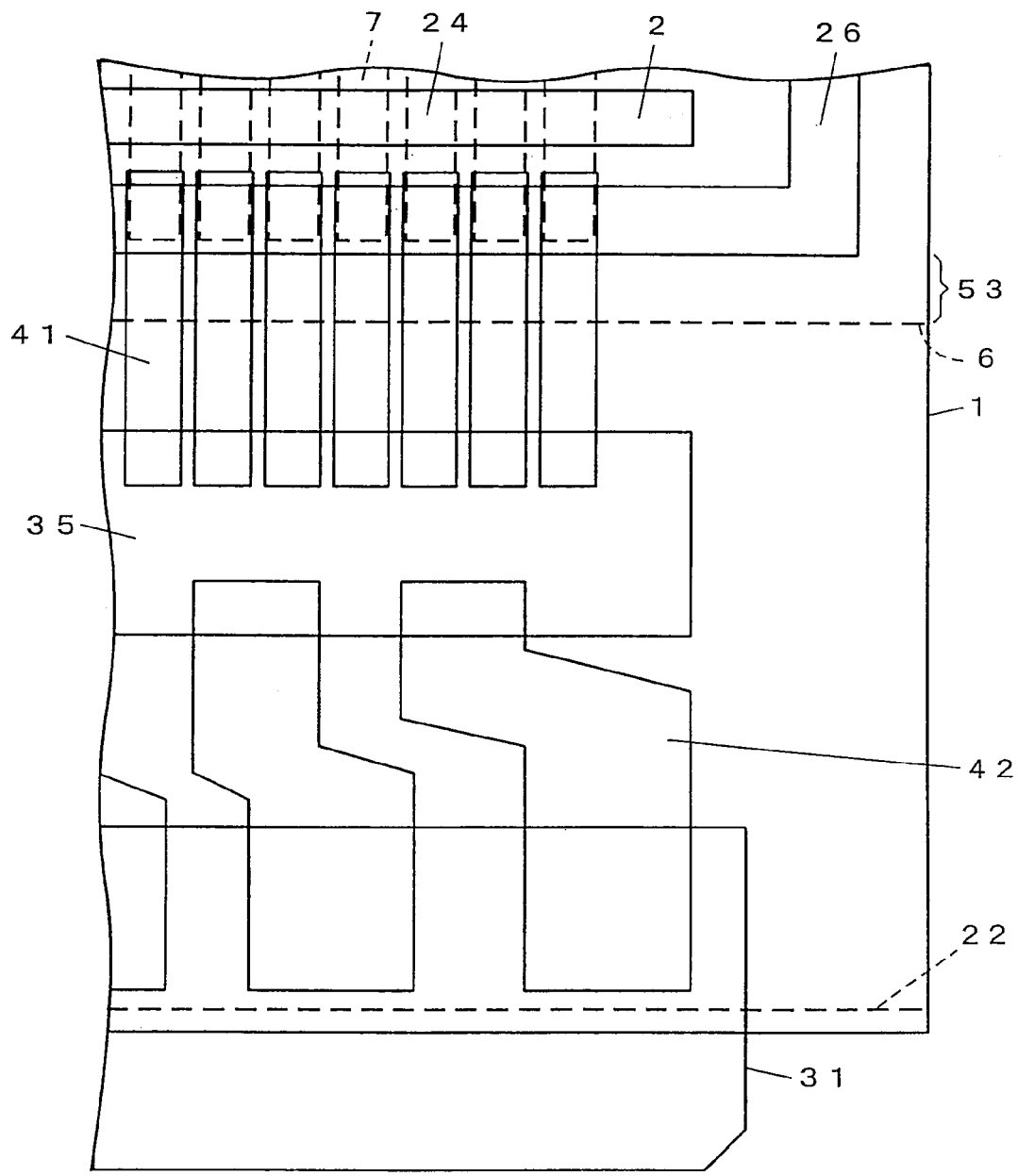
FIG. 3 is a partially enlarged plan view showing a part in circle A in FIG. 1.

First Embodiment: FIG. 1 to FIG. 3

First, a first embodiment of a liquid crystal display panel of the invention will be described. FIG. 1 is a plan view of the liquid crystal display panel, FIG. 2 is a cross-sectional view taken along a line 2—2 shown in FIG. 1, and FIG. 3 is a partially enlarged plan view of a part in circle A in FIG. 1.

This liquid crystal display panel of the first embodiment is a reflective liquid crystal display panel for use in a cellular phone, a personal digital assistant, a timepiece, and the like. The first embodiment is characterized in that a thin film insulating layer is provided as an insulating covering member on and around lead electrodes provided on a first substrate, on driving integrated circuits (IC) of the liquid crystal display panel, on a flexible printed circuit board (FPC), and on a second substrate.

This liquid crystal display panel is, as shown in FIG. 1, a matrix-type liquid crystal display panel having m stripe first electrodes 2 provided on a first substrate 1 with a thickness of 0.5 mm and n stripe second electrodes 7 provided on a second substrate 6 with a thickness of 0.5 mm, and a display region 23 constituted of m by n pixel portions 24 being intersections of the first electrodes 2 and the second electrodes 7. The first substrate 1 and the second substrate 6 are opposed to each other with a predetermined gap provided therebetween with not-shown spacers and are bonded together with a sealant 26 as shown in FIG. 2, and a liquid crystal layer 25 is sealed in the gap and hermetically sealed with a closing member 27 so that hermeticity is ensured.

Further, as shown in FIG. 2, a reflector 16 composed of an aluminum film or a silver alloy film is provided on the entire face of the second substrate 6, and a color filter which is composed of a red (R) color filter 17, a green (G) color filter 18, and a blue (B) color filter 19 is provided on the reflector 16. Thereon, a flattening protective film 21 is provided to flatten projections and depressions of the color filter and prevent an electrical short circuit between the reflector 16 and the second electrodes 7, and the second electrodes 7 are provided on the flattening protective film 21. Furthermore, on the first electrodes 2 and on the second electrodes 7, alignment films (not shown) are provided to align liquid crystal molecules in the liquid crystal layer 25 in predetermined directions.

On the other hand, on the first substrate 1, a retardation film 12 and a polarizing film 11 are provided. The polarizing film 11 is an ordinary absorption-type polarizing film having one polarizing axis being an absorption axis and the other polarizing axis perpendicular thereto being a transmission axis. As the retardation film 12, other than a one layer retardation film, two- or three-layered retardation films can also be used to improve the contrast and brightness of display.

Note that, in FIG. 1, illustration of the polarizing film 11, the retardation film 12, the reflector 16, the color filters, the flattening protective film 21, and connecting electrodes 42 is omitted. Besides, as for lead electrodes 41, though no numeral is given because it is difficult to show boundaries between the lead electrodes 41 and the first electrodes 2 and between the lead electrodes 41 and the second electrodes 7, at least portions outside the sealant 26 of the illustrated electrodes are the lead electrodes 41. This also applies to plan views corresponding to this used for description of the following embodiments.

By the way, in this liquid crystal display panel, as shown in FIG. 1, the first substrate 1 is made larger in size than the second substrate 6, and a driving IC 36 for applying driving signals by electric signals to the first electrodes 2 and driving ICs 35 for applying driving signals by electric signals to the second electrodes 7 are mounted on the first substrate 1. Note that the second substrate 6 is made to have a size larger than the display region 23 and not to reach a region where the driving ICs 35 and 36 are provided on the first substrate 1.

Then, the lead electrodes continued to the first electrodes 2 for connecting the first electrodes 2 and the driving IC 36 are led out from the display region 23 to the outside of the sealant 26. On the lead electrodes, the driving IC 36 is mounted through an anisotropic conductive film containing conductive particles in a polyimide resin, and the film is heated and compressed to cure, so that the first electrodes 2 are connected to the driving IC 36 through the lead electrodes. Such a mounting method is called the Chip on Glass (COG) method.

Further, the lead electrodes 41 for connecting the second electrodes 7 and the driving ICs 35 are also provided on the first substrate. A portion of the sealant 26 is composed of an anisotropic conductive sealant containing conductive particles in an acrylic resin, and a pressure is applied to the second substrate 6 and the first substrate 1 through the anisotropic conductive sealant, so that the second electrodes 7 provided on the second substrate 6 are electrically conducted through the conductive particles to the lead electrodes 41 provided on the first substrate 1. Then, the driving ICs 35 are mounted on the lead electrodes 41 similarly to the case of the above-described driving IC 36, so that the second electrodes 7 are connected to the driving ICs 35 through the lead electrodes 41.

It should be noted that while the driving ICs 35 and 36 are mounted here separately on two sides of the liquid crystal display panel, the lead electrodes may be routed so that all the driving ICs are mounted on one side.

Further, to apply signals to the driving ICs 35 and 36 from an external circuit, an FPC 31 being a flexible connecting board connected to the driving ICs 35 and 36 is provided through the connecting electrodes 42 shown in FIG. 2 and FIG. 3. Note that the FPC 31 and the driving ICs 35 and 36 are connected to the connecting electrodes 42 using an anisotropic conductive film.

Further, as shown in FIG. 1 to FIG. 3, a moisture-impermeable thin film insulating layer 22 made of silicon nitride (SiNx) is formed with a thickness of 250 nm (nanometer) as the insulating covering member on and around the lead electrodes 41 to cover at least entire portions of the lead electrodes 41 outside the sealant 26. Furthermore, the thin film insulating layer 22 is similarly formed on the driving ICs 35 and 36, on a portion of the FPC 31, between the driving ICs 35 and the FPC 31, and on the entire face of the second substrate 6 (the lower face in FIG. 2) opposite to the liquid crystal layer 25.

More specifically, the thin film insulating layer 22 covers the entire face except for a face of the first substrate 1 (the upper face in FIG. 2) opposite to the liquid crystal layer 25 and side faces thereof, the top of the first polarizing film 11 or the first retardation film 12, and a portion of the FPC 31. Therefore, it is possible to prevent moisture from permeating the lead electrodes 41, so that even when the liquid crystal display panel is operated for a long time at a high temperature and high humidity, electrolytic corrosion of the lead electrodes 41 can be prevented for performance of stable display. In particular, since the thin film insulating layer 22 is provided to overlap the second substrate 6, the distance from the end portion of the thin film insulating layer 22 to the lead electrodes 41 is long so that permeation of moisture from the end portion to the lead electrodes 41 can also be eliminated. Note that while the thin film insulating layer 22 is provided on the entire face of the second substrate 6 here, this effect can be exhibited when the thin film insulating layer 22 is provided to overlap with only a portion of the second substrate 6.

Besides, even a film quality when the film is formed by an atmospheric-pressure chemical vapor deposition (CVD) or an atmospheric-pressure optical CVD is usable as the thin film insulating layer 22. To prevent electrolytic corrosion of the lead electrodes 41, however, a dense film is required. A film can be formed dense and low in moisture permeability by a sputtering or by the CVD method in a vacuum condition, and thus it is particularly effective to use the film formed by this method. Besides, repetition of processes of film formation, cleaning, and film formation a plurality of times is also particularly effective because the repetition can prevent pinhole formation in the film.

The thin film insulating layer 22 is preferably formed at 150° C. or lower. This is to prevent deterioration of the liquid crystal layer 25 caused at too high temperatures. To prevent deterioration of the polarizing film 11 and the FPC 31, the film is preferably formed at a temperature lower than that, and temperatures at 150° C. and lower fall within an allowable range.

Owing to the employment of the above-describe structure, the driving ICs 35 and 36 and the thin film insulating layer 22 can keep hermeticity at a portion where the lead electrodes 41 are provided on the first substrate 1.

Note that though a cross-sectional view is not shown in particular, it is assumed that, on the side where the driving IC 36 is provided, the lead electrodes 41, the driving IC 36, and so on are also covered similarly to the case of the side where the driving ICs 35 are provided. This also applies to the following respective embodiments.

Further, while the reflector 16 is provided here to extend as far as the outer periphery of the second substrate 6 to have an outer periphery aligned with that of the flattening protective film 21, the thin film insulating layer 22 is provided also on the side faces of the sealant 26 and the second substrate 6, so that the outer peripheral portion of the reflector 16 is also provided with the thin film insulating layer 22 and prevented from coming into contact with external air. This enables prevention of change in quality and corrosion of the reflector 16 even when an aluminum (including its alloy) film or a silver (including its alloy) film is used as the reflector 16, which permits employment of the above-described structure whose steps can be simplified because of nonnecessity of pattern formation of the reflector 16.

Furthermore, the thin film insulating layer 22 can be formed also in a small gap of about 5 micrometers (μm) between the first substrate 1 and the second substrate 6. Therefore, the thin film insulating layer 22 can cover the lead electrodes 41 also at a gap portion 53 being a portion of the space outside the sealant 26, which can prevent the lead electrodes 41 from coming into contact with external air. Incidentally, to attain this effect sufficiently, the thin film insulating layer 22 is preferably thinner than the gap between the first substrate 1 and the second substrate 6, that is, the thickness of the liquid crystal layer.

The thin film insulating layer 22 is preferable about 100 nm to 500 nm in film thickness because it is formed by the sputtering or film formation by CVD, and when the film is to be formed particularly thick, it can be made thick to about 1000 nm. However, excellent results could be obtained when it was in a range about 200 nm to 500 nm.

As for the material of the thin film insulating layer 22, the same effect as the above-described silicon nitride film could be obtained even through use of a single film or laminated films of a silicon oxide film or silicon nitride oxide film similarly containing silicon which was formed in a vacuum condition. Besides, when a thin film insulating layer made of metal oxide such as a tantalum oxide film or a titanium oxide film was employed, a dense film can be formed at low temperatures. Such a thin film insulating layer was suitable for the case using a substrate or a mounted member which was low in resistant temperature. Further, it is also adoptable to employ a thin film insulating layer in which two or more different kinds of insulating films are laminated.

Here, after the liquid crystal layer 25 remaining on the gap portion 53 is sufficiently cleaned off and the driving ICs 35 and 36 and the FPC 31 are mounted, an oxygen plasma treatment is performed for a portion where the thin film insulating layer is to be formed to remove remnants and contamination, and then the thin film insulating layer 22 is formed. The performance of the oxygen plasma treatment before the mounting of the driving ICs 35 and 36 causes the surface of the transparent conductive film forming the lead electrodes 41 to change in quality (change in oxidation degree), which deteriorates conducting characteristics thereof with not shown bumps on the driving ICs 35 and 36. After the mounting of the driving ICs 35 and 36, on the other hand, the oxygen plasma treatment is allowable, and organic substances can be efficiently removed. Note that, in place of the oxygen plasma treatment, it is also adoptable to perform a plasma treatment using an inert gas such as an argon gas, an oxygen gas, a nitrogen gas, or a mixed gas of two or more kinds of these gases.

Further, since the amount of moisture passing through the sealant 26 can be reduced by the thin film insulating layer 22 provided also on the side of the sealant 26 in contact with external air, changes in characteristics of the liquid crystal layer 25 can be decreased to improve the display quality.

Beside, the thin film insulating layer 22 is formed only on a portion of the FPC 31 in this embodiment because a terminal for establishing connection with an external circuit (not shown) is provided on the second substrate 6 side of the FPC 31. For forming the thin film insulating layer 22 on a portion of the FPC 31, it is only required that a portion where the thin film insulating layer 22 is not to be formed is in advance covered with a polyimide tape, which is peeled off after formation of the thin film insulating layer 22. This method is effective also in terms of capability of protecting an electrode section for connecting the FPC 31 to the external circuit in a film forming step of the thin film insulating layer 22.

Figure 4:
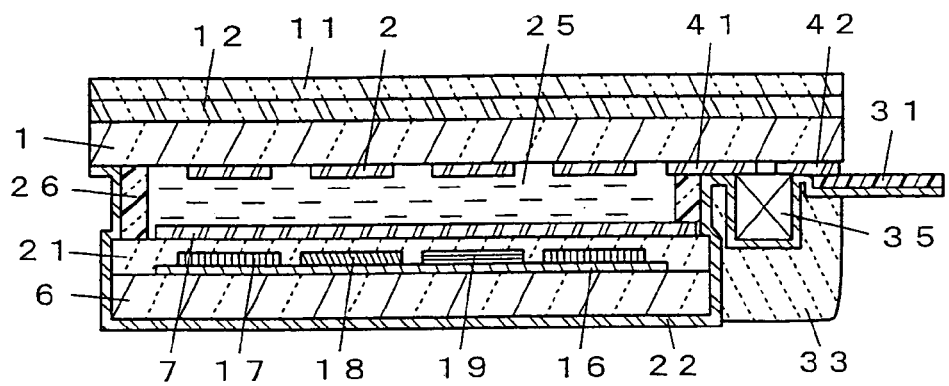
FIG. 4 is a cross-sectional view, corresponding to FIG. 2, showing a cross section of a liquid crystal display panel of a second embodiment of the invention.
Figure 5:
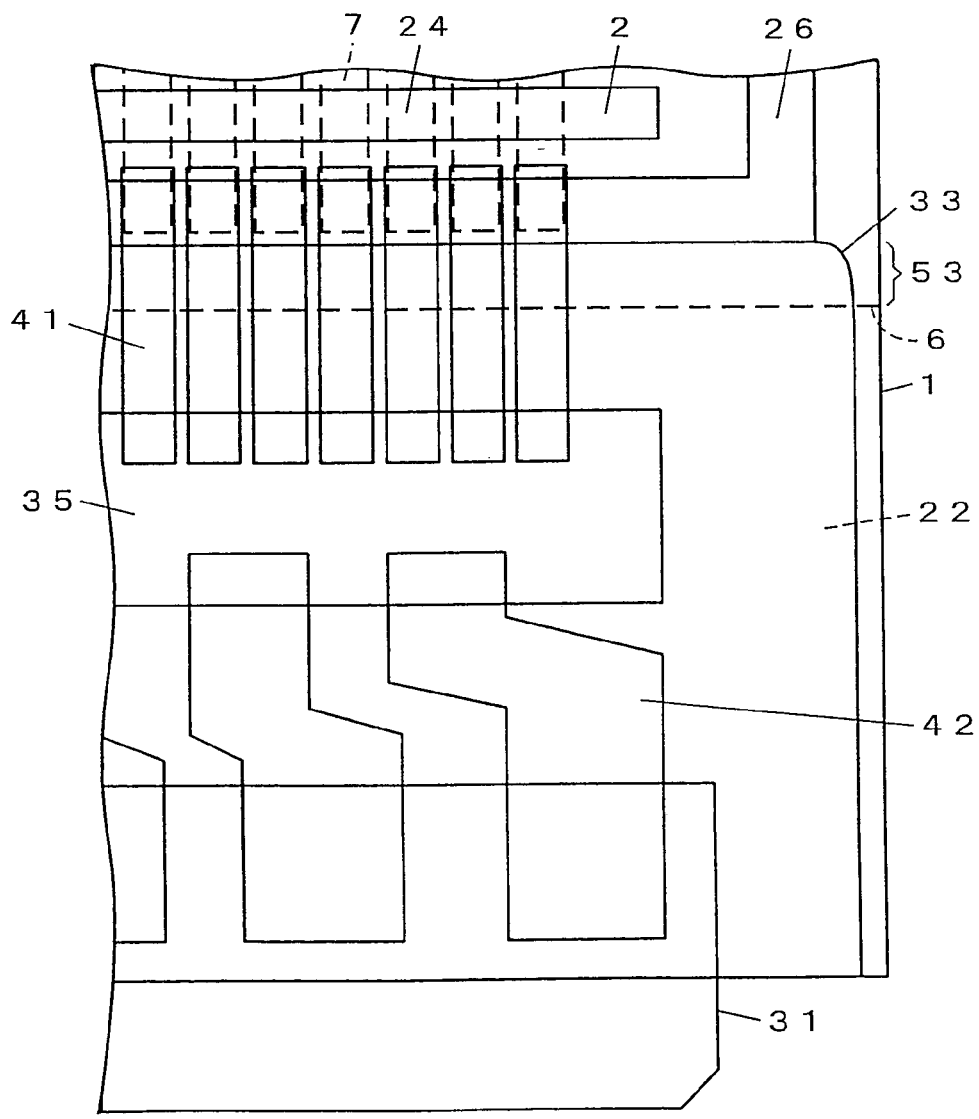
FIG. 5 is a partially enlarged plan view, corresponding to FIG. 3, showing a part near lead electrodes of the same.
Figure 6:
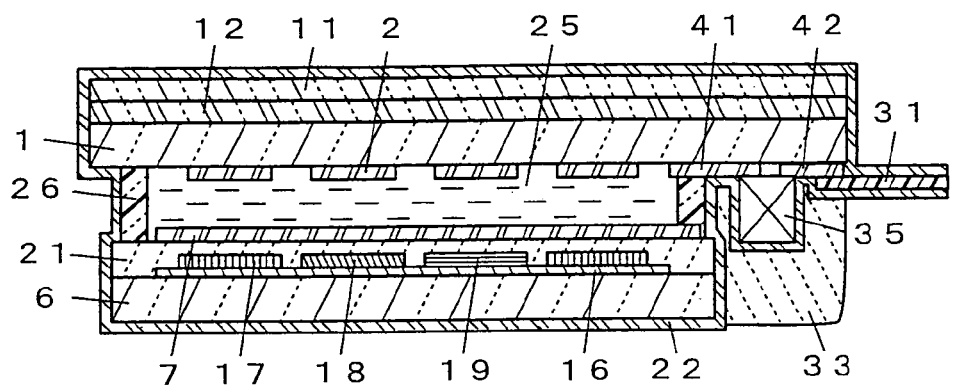
FIG. 6 is a cross-sectional view, corresponding to FIG. 4, showing the configuration of a modified example of the liquid crystal display panel of the second embodiment of the invention.

Second Embodiment: FIG. 4 to FIG. 6

Next, a second embodiment of the liquid crystal display panel of the invention and a modified example thereof will be described. FIG. 4 is a cross-sectional view, corresponding to FIG. 2, showing a cross section of the liquid crystal display panel, FIG. 5 is a partially enlarged plan view, corresponding to FIG. 3, showing a part near lead electrodes of the same enlarged, and FIG. 6 is a cross-sectional view, corresponding to FIG. 4, showing the configuration of the modified example. In these drawings, the same numerals are assigned to portions corresponding to those in the first embodiment.

The second embodiment is characterized in that a thin film insulating layer is provided, as an insulating covering member, on the entire face on a second substrate side (the lower side in FIG. 4) of an FPC, and that an insulating resin is provided on a portion of the thin film insulating layer. The liquid crystal display panel of the second embodiment is the same as that of the first embodiment except for these points and a point that a reflector 16 is pattern-formed with an outer shape smaller than that of a second substrate 6, and thus the description will be omitted or simplified except for the different points.

In this liquid crystal display panel, a thin film insulating layer 22 is provided, as in the first embodiment, on and around lead electrodes 41, on a driving integrated circuits 35, on the lower face in FIG. 4 of the second substrate 6, and so on. In addition to this, the thin film insulating layer 22 is provided on the entire face of the second substrate 6 side of the FPC 31.

This can increase the distance from the end portion of the thin film insulating layer 22 to the lead electrodes 41 also on the FPC 31 side to eliminate more effectively permeation of moisture from the end portion into the lead electrodes 41.

Further an insulating resin 32 composed of silicon resin is provided on the thin film insulating layer 22 at a portion corresponding to portions of the lead electrodes 41 outside a sealant 26 and therearound, the driving ICs 35 and 36, and a portion of the flexible printed circuit board 31. An epoxy resin is preferable in terms of the low moisture permeability but has a large thermal contraction which may deforms the substrate to change the thickness of a liquid crystal layer 25 near the sealant 26, and therefore, a silicon resin having a small thermal contraction and having elasticity is used here. This insulating resin 32 serves to prevent flaws on the thin film insulating layer 22 and reinforce adhesion of the FPC 31 to a first substrate 1 as well as has a function of preventing moisture from permeating the electrodes such as the lead electrodes 41 and the like for prevention of electrolytic corrosion.

Since the insulating resin 32 thus provided can prevent entrance of moisture in cooperation with the thin film insulating layer 22 and prevent damage of the thin film insulating layer 22 to allow its function to be stably exhibited, electrolytic corrosion of the lead electrodes 41 can be prevented.

Even such a transparent or a white insulating resin 32 for use here has an effect in reducing moisture permeability to provide a sufficient effect of preventing electrolytic corrosion. Meanwhile, when a black or gray insulating resin is used for this liquid crystal display panel, the driving ICs 35 and 36 can be shielded from irradiated light so that optical malfunction of the driving ICs 35 and 36 can be prevented. When the insulating resin is applied to the FPC 31 and also to the front face (the upper side face in FIG. 4) side of the first substrate 1 and the black or gray insulating resin is applied to a portion of the front face of the first substrate 1 corresponding to the driving ICs 35 and 36, it is possible to prevent more surely optical malfunction of the driving ICs 35 and 36 as well as to reduce moisture permeation from the interface between the first substrate 1 and the FPC 31, so that electrolytic corrosion can be prevented more effectively.

It should be noted that, in this liquid crystal display panel, since the connection between the FPC 31 and an external circuit (not shown) is established on the first substrate 1 side (the upper side in FIG. 4) of the FPC 31, it is preferable to from the thin film insulating layer 22 after masking is performed to prevent the thin film insulating layer 22 from being formed on a terminal portion provided on this portion. The thin film insulating layer 22, however, is formed mainly on the second substrate 6 side here, and thus a very thin layer is formed through a flow around onto the first substrate 1 side. Since such a layer could be mechanically broken when the terminal portion was formed of copper and gold and the connection to the external circuit was established through use of a connector, and thermally broken when the connection was established through use of solder, the connection could be established without problem even if masking was not performed. Therefore, when the masking for the formation of the thin film insulating layer 22 is omitted, the steps can be simplified.

In the example shown in FIG. 4, the thin film insulating layer 22 is formed only on the side lower than the first substrate 1 (the second substrate 6 side) in the drawing. As shown in FIG. 6, when the thin film insulating layer 22 is formed, at the same time, also on the side faces and the upper side of the first substrate 1 so that the thin film insulating layer 22 is formed on all the faces of the liquid crystal display panel including on the FPC 31, moisture can be prevented from entering from any face in contact with external air so that the reliability can further be improved.

When the thin film insulating layer 22 is formed on the side upper than the first substrate 1 in the drawing, the film can be formed directly on the first substrate 1 or on a polarizing film 11 after bonding thereof. FIG. 6 shows the latter case. In terms of the reliability of the liquid crystal display panel, the latter case was better. The reason is that the polarizing film 11 having a function of cutting ultraviolet rays can protect the liquid crystal layer 25 from ultraviolet rays generated during the film formation of the thin film insulating layer 22.

Figure 7:
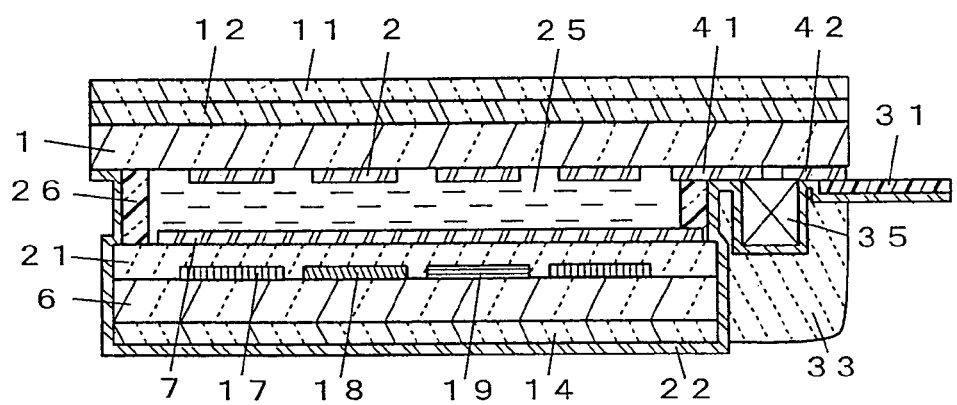
FIG. 7 is a cross-sectional view, corresponding to FIG. 2, showing a cross section of a liquid crystal display panel of a third embodiment of the invention.

Third Embodiment: FIG. 7

Next, a third embodiment of the liquid crystal display panel of the invention will be described. FIG. 7 is a cross-sectional view, corresponding to FIG. 2, showing a cross section of the liquid crystal display panel. In this drawing, the same numerals are assigned to portions corresponding to those in the first or second embodiments.

The third embodiment is characterized in that a second polarizing film is provided on a second substrate and that a thin film insulating layer is provided on the polarizing film. The liquid crystal display panel of the third embodiment is the same as that of the above-described second embodiment except for these points and a point that the reflector 16 is not provided, and thus the description will be omitted or simplified except for the different points.

As shown in FIG. 7, this liquid crystal display panel is provided with no reflector and a second polarizing film 14 on the rear side of the second substrate 6 (the lower side in the drawing). As the second polarizing film 14 used is either an absorption-type polarizing film having one polarizing axis being a transmission axis and the other polarizing axis perpendicular thereto being an absorption axis, or a reflection-type polarizing film having one polarizing axis being a transmission axis and the other polarizing axis perpendicular threreto being a reflection axis. When the panel is used in a transflective liquid crystal display device, the use of the reflection-type polarizing film can realize bright display.

A thin film insulating layer 22 is provided, as in the second embodiment, on and around the lead electrodes 41, on the driving integrated circuits 35, on a rear face of the FPC 31, and so on. On a second substrate 6, however, the thin film insulating layer 22 is provided not directly but through the second polarizing film 14.

In such a configuration, the second polarizing film 14 can protect a liquid crystal layer 25 from ultraviolet rays generated in the step of forming the thin film insulating layer 22. For this protection, it is of course necessary to form the thin film insulating layer 22 after provision of the second polarizing film 14. It is more preferable to carry out the formation after a first polarizing film 11 is also provided. Besides, mixture of an ultraviolet reflecting material or an ultraviolet absorbing agent into a sealant 26 enables further reduction in the amount of ultraviolet rays irradiated to the liquid crystal layer 25.

According to such a liquid crystal display panel, the thin film insulating layer 22 can prevent, as in the above-described embodiments, electrolytic corrosion of the lead electrodes 41 as well as deterioration of the second polarizing film 14. Further, the second polarizing film 14 can prevent deterioration of the liquid crystal layer 25 during the formation of the thin film insulating layer 22.

As a modification of this embodiment, a transflective reflector may be formed on the second substrate 6. As for the position, the transflective reflector can be provided between the second substrate 6 and the liquid crystal layer 25, between the second substrate 6 and the second polarizing film 14, or on the rear side of the second polarizing film 14. The maximum effect of this embodiment can be utilized when the transflective reflector is provided on the rear side of the second polarizing film 14. More specifically, the transflective reflector is a thin aluminum film or a film with holes (openings) for transmitting light and is thus corroded by moisture, but the corrosion can be prevented by covering also the transflective reflector with the thin film insulating layer 22.

Moreover, in the case of providing the transflective reflector between the second substrate 6 and the second polarizing film 14, when the reflector is provided on the entire face of the second substrate 6 for shortening of the steps, the cross section of the transflective reflector comes into contact with external air, and therefore, in this case it is effective to prevent corrosion of the cross section and moisture permeation into an adhesive layer through use of the thin film insulating layer 22.

Figure 8:
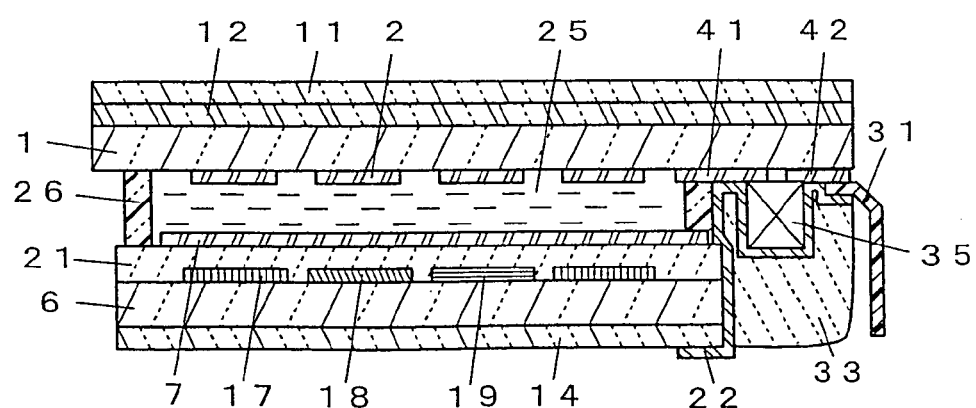
FIG. 8 is a cross-sectional view, corresponding to FIG. 2, showing a cross section of a liquid crystal display panel of a fourth embodiment of the invention.

Fourth Embodiment: FIG. 8

Next, a fourth embodiment of the liquid crystal display panel of the invention will be described. FIG. 8 is a cross-sectional view, corresponding to FIG. 2, showing a cross section of the liquid crystal display panel. In this drawing, the same numerals are assigned to portions corresponding to those in the first to third embodiments.

This fourth embodiment is the same as the above-described third embodiment except for the position where a thin film insulating layer is provided, and thus the description will be omitted or simplified except for this point.

In this liquid crystal display panel, a thin film insulating layer 22 is provided as in the third embodiment, as shown in FIG. 8, on and around lead electrodes 41 and on driving integrated circuits 35. Meanwhile, the thin film insulating layer 22 is provided only at a portion of the outer peripheral portion on the second polarizing film 14 provided on a second substrate 6. Further, also on the rear side (the lower side in the drawing) of an FPC 31, the thin film insulating layer 22 is provided only near the outer peripheral portion of a first substrate 1. In the step of forming the thin film insulating layer 22, masking is performed to limit the region where the thin film insulating layer 22 is to be formed, so that the thin film insulating layer 22 can be arranged as described above.

The reason why the thin film insulating layer 22 is provided only on the peripheral portion on the second polarizing film 14 is to prevent variation in film thickness of the thin film insulating layer 22 on the second polarizing film 14 or variation in display quality due to peeling off thereof or the like. The reason why the thin film insulating layer 22 is provided only on a portion of the rear side of the FPC 31 is not to provide the thin film insulating layer 22 on a portion of the FPC 31 to be bent so that the thin film insulating layer 22 will not peel off from the FPC 31 even when the FPC 31 is bent as shown in FIG. 8 for connection to an external circuit (not shown).

Therefore, the employment of such a configuration permits the material of the thin film insulating layer 22 to be selected for use with a focus on reduction in moisture permeability into the lead electrodes 41 without attaching importance to the adhesion to the organic material in the second polarizing film 14 or the FPC 31 and the uniformity during the film formation, thus enabling formation of the thin film insulating layer 22 with a lower moisture permeability to prevent moisture permeation into the lead electrodes 41.

Figure 9:
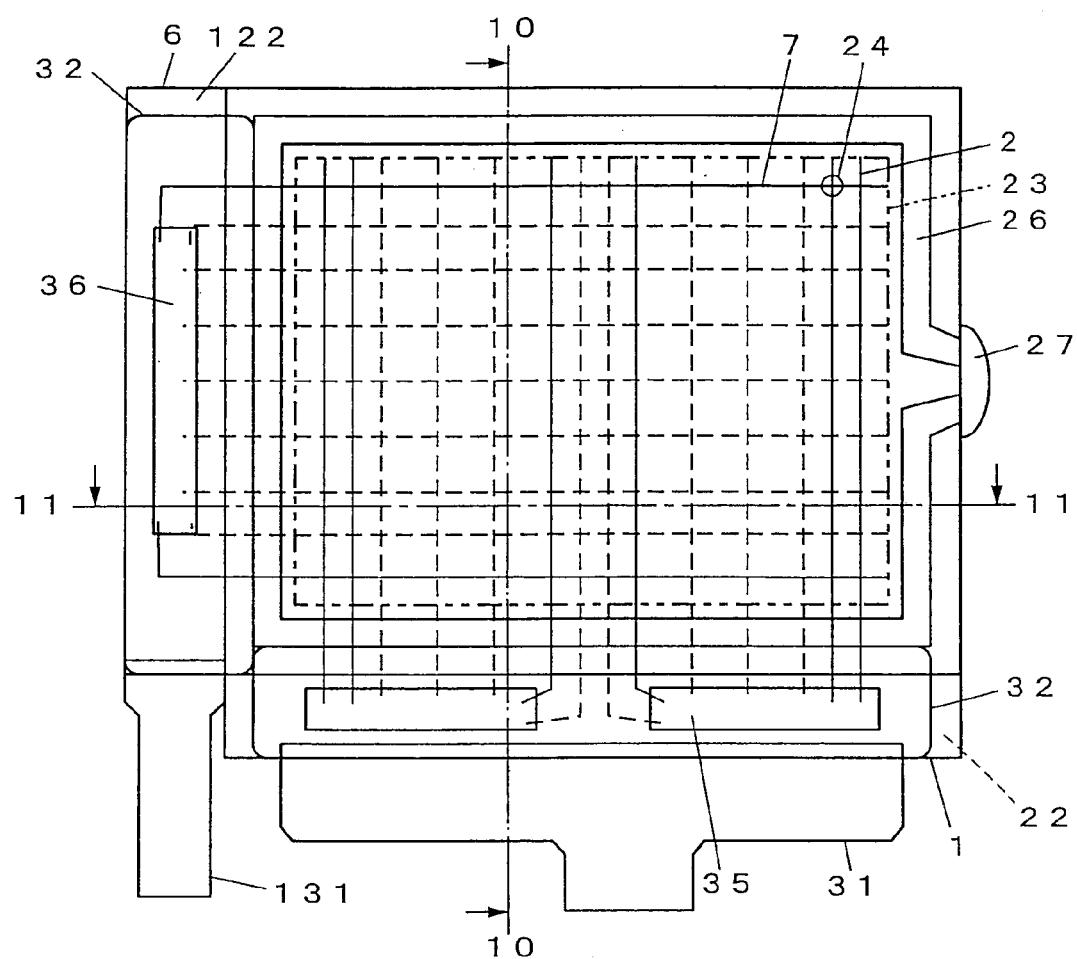
FIG. 9 is a plan view of a liquid crystal display panel of a fifth embodiment of the invention.
Figure 10:
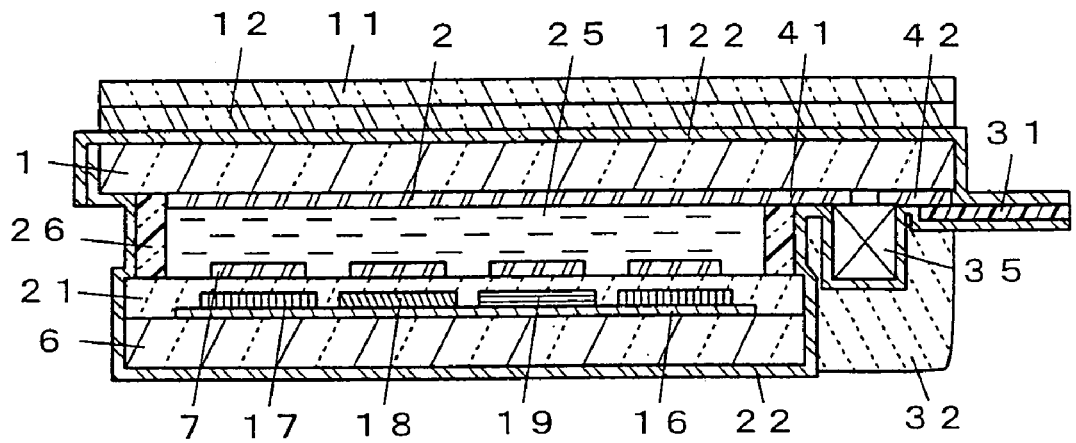
FIG. 10 is a cross-sectional view taken along a line 10—10 in FIG. 9.
Figure 11:
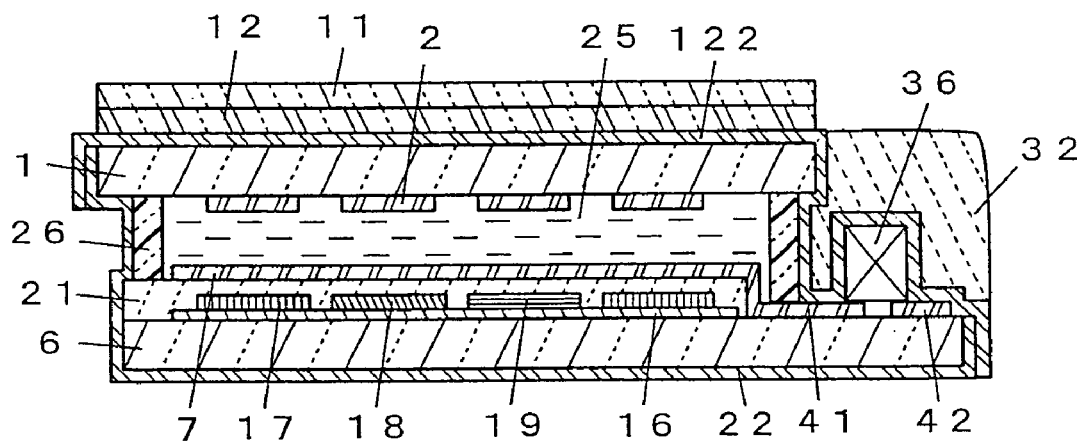
FIG. 11 is a cross-sectional view taken along a line 11—11 in FIG. 9.

Fifth Embodiment: FIG. 9 to FIG. 11

Next, a fifth embodiment of the liquid crystal display panel of the invention will be described. FIG. 9 is a plan view of the liquid crystal display panel, FIG. 10 is a cross-sectional view taken along a line 10—10 shown in FIG. 9, and FIG. 11 is a cross-sectional view taken along a line 11—11 shown in FIG. 9. In these drawings, the same numerals are assigned to portions corresponding to those in the first or second embodiments.

The fifth embodiment is characterized in that, in addition to a thin film insulating layer on a second substrate side (the lower side in FIG. 10 and FIG. 11) of the panel, a second thin film insulating layer is provided as a second insulating covering member on a first substrate side (the upper side in the same drawings).

This liquid crystal display panel has almost the same configuration as that of the liquid crystal display panel of the second embodiment described using FIG. 4 and FIG. 5, but is first different from the liquid crystal display panel of the second embodiment in that a driving IC 36 for applying driving signals to second electrodes 7 is mounted on a second substrate 6 while both the driving ICs 35 and 36 are mounted on the first substrate 1 in the second embodiment. Therefore, the lead electrodes for connecting the second electrodes 7 to the driving IC 36 are also provided on the second substrate 6. Further, the driving IC 36 is connected to an FPC 131 for the driving IC 36 through the connecting electrodes 42, whose illustration is omitted in FIG. 9, on the second substrate 6.

Secondly, in this liquid crystal display panel, in addition to a thin film insulating layer 22 similarly provided as in the second embodiment, a second thin film insulating layer 122 is provided on the first substrate side of the panel. This second thin film insulating layer 122 is formed, as shown in FIG. 9 to FIG. 11, of a moisture-impermeable film made of silicon nitride (SiNx) with a thickness of 250 nm (nanometer), on and around lead electrodes 41 provided on the second substrate 6 to cover entirely at least portions of the lead electrodes 41 outside a sealant 26, and further similarly formed also on the driving IC 36, on the entire face on a first substrate 1 side of the FPC 131, between the driving IC 36 and the FPC 131, and on the entire face on the side of the first substrate 1 (the upper side in FIGS. 10 and 11) opposite to a liquid crystal layer 25.

Then, also on this second thin film insulating layer 122, an insulating resin 32 composed of silicon resin is provided on a portion corresponding to portions of the lead electrodes 41 outside the sealant 26 and therearound, the driving integrated IC 36, and a portion of the FPC 31.

When the driving IC is provided also on the second substrate 6 as in this liquid crystal display panel, the lead electrodes 41 on the second substrate cannot be covered only with the thin film insulating layer 22 provided on the second substrate 6 side, and thus it is important to provide the second thin film insulating layer 122 also on the first substrate 1 side. Such an arrangement enables prevention of moisture permeation into the connecting electrodes provided on the second substrate 6 and electrolytic corrosion thereof.

Incidentally, the thin film insulating layer 22 and the second thin film insulating layer 122 can be provided at the same time. For example, the liquid crystal display panel only needs to be rotated around an axis of the right-left direction in FIG. 10 during the film formation of the thin film insulating layer. The thin film insulating layer 22 and the second thin film insulating layer 122 can be formed in different steps, as a matter of course, but the steps are made simpler when they are formed at the same time.

Besides, while the second thin film insulating layer 122 is formed directly on the first substrate 1 here because if the second thin film insulating layer 122 is formed on a polarizing film 11, the second thin film insulating layer 122 has to be removed when the polarizing film 11 needs to be repaired, it is of course possible to provide the second thin film insulating layer 122 on the polarizing film 11.

Figure 12:
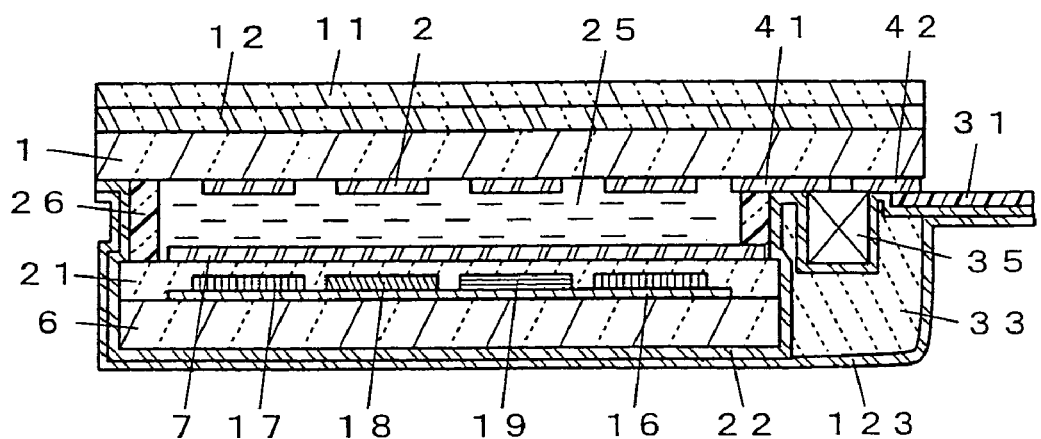
FIG. 12 is a cross-sectional view, corresponding to FIG. 2, showing a cross section of a liquid crystal display panel of a sixth embodiment of the invention.

Sixth Embodiment: FIG. 12

Next, a sixth embodiment of the liquid crystal display panel of the invention will be described. FIG. 12 is a cross-sectional view, corresponding to FIG. 2, showing a cross section of the liquid crystal display panel. In this drawing, the same numerals are assigned to portions corresponding to those in the first or second embodiments.

The sixth embodiment is characterized in that a second thin film insulating layer is provided as a second insulating covering member on a thin film insulating layer and an insulating resin. The liquid crystal display panel of the sixth embodiment is almost the same as that of the second embodiment described using FIG. 4 and FIG. 5 except for this point, and thus the description will be omitted or simplified except for the different point.

In this liquid crystal display panel, a thin film insulating layer 22 and an insulating resin 32 are provided as in the second embodiment, the insulating resin 32 being provided using acrylic resin. Then, as shown in FIG. 12, a second thin film insulating layer 122 is further provided on their entire faces to prevent more fully moisture permeation. The material, thickness, forming method of the second thin film insulating layer 122 can be the same as those of the thin film insulating layer 22.

With such an arrangement, three layers, that is, the thin film insulating layer 22, the insulating resin 32, and the second thin film insulating layer 122 can fully prevent moisture from permeating into lead electrodes 41. In addition, since two layers of the thin film insulating layer, that is, the first thin film insulating layer 22 and the second thin film insulating layer 122 can be formed also on the face of the sealant 26 in contact with external air, it is also possible to reduce the probability of occurrence of pinholes and the moisture permeability of the portion covering the sealant 26. Moreover, both the first thin film insulating layer 22 and the second thin film insulating layer 122 are formed on the entire face on a second substrate 6 side of the panel so that masking is not particularly necessary.

Note that, to prevent the thin film insulating layer from flowing around onto a polarizing film 11, it is preferable to bond to the liquid crystal display panel the polarizing film 11 with a protective sheet as a protective film adhered thereto, form the thin film insulating layer in that state, and thereafter peel off the protective sheet during inspection, during use of the liquid crystal display panel, or the like to thereby remove the thin film insulating layer on the polarizing film 11.

Besides, as for the connection between the FPC 31 and an external circuit (not shown), the thin film insulating layer can easily be broken by an external force of a connector on the external circuit side or the like to establish electrical conduction as in the second embodiment.

Figure 13:
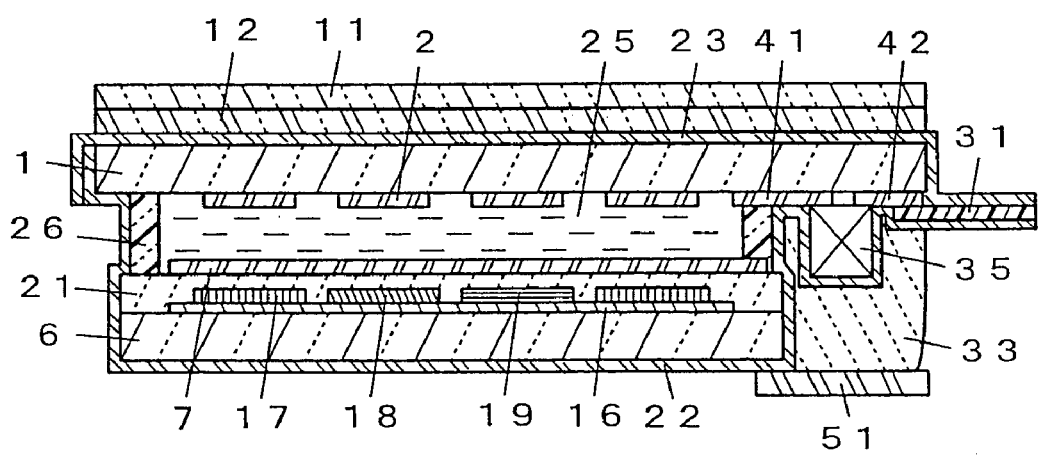
FIG. 13 is a cross-sectional view, corresponding to FIG. 2, showing a cross section of a liquid crystal display panel of a seventh embodiment of the invention.

Seventh Embodiment: FIG. 13

Next, a seventh embodiment of the liquid crystal display panel of the invention will be described. FIG. 13 is a cross-sectional view, corresponding to FIG. 2, showing a cross section of the liquid crystal display panel. In this drawing, the same numerals are assigned to portions corresponding to those in the first and second embodiments.

The seventh embodiment is characterized in that a covering member is provided as a second insulating covering member on an insulating resin. The liquid crystal display panel of the seventh embodiment is almost the same as that of the second embodiment described using FIG. 4 and FIG. 5 except for this point, and thus the description will be omitted or simplified except for the different point.

In this liquid crystal display panel, a thin film insulating layer 22 and an insulating resin 32 are provided as in the second embodiment, the insulating resin 32 being provided using acrylic resin. Then, as shown in FIG. 13, a covering member 51 composed of a polyethylene terephthalate (PET) film is provided on the insulating resin 32 from a position overlapping with a portion of a second substrate 6 to a position overlapping with a portion of an FPC 31. The thickness of the covering member 51 is preferably about 50 μm to 100 μm. With the thickness of this order, the covering member 51 fits with the irregular shape caused by driving ICs 35 and 36 on a first substrate 1 so that the distribution in thickness of the insulating resin 32 can be relaxed, while the covering member 51 has a thickness 100 times that of the thin film insulating layer 22 and can be thus made to have a very low moisture permeability. In addition, the covering member 51 is made to be hard to flaw.

Here, the steps of forming the thin film insulating layer 22, the insulating resin 32, and the covering member 51 are preferably performed as follows. Specifically, after the driving ICs 35 and 36 and the FPC 31 are mounted on the liquid crystal display panel, the thin film insulating layer 22 is first formed. Thereafter, the insulating resin 32 is applied, the covering member 51 is mounted thereon, they are fitted to each other by applying a pressure thereto, and then the insulating resin 32 is cured. In this event, it is more preferable to provide a thin film insulating layer for moisture proofing in advance on the covering member 51 or to subject the covering member 51 to a surface treatment for enhancing adhesion thereof to the insulating resin 32.

Such a configuration can further prevent moisture permeation into lead electrodes 41. Further, though use of the thin film insulating layer 22 and the covering member 51 together, even if bubbles form in the insulating resin 32, a poorly adhered portion of the thin film insulating layer 22 or the insulating resin 32 occurs at a gap portion 53 of the first substrate 1 and the second substrate 6 near a sealant 26, or pinholes form in the thin film insulating layer 22, the covering member 51 can compensate the degradation in moisture proofing property caused by the fact so as to ensure very stable characteristics.

Figure 14:
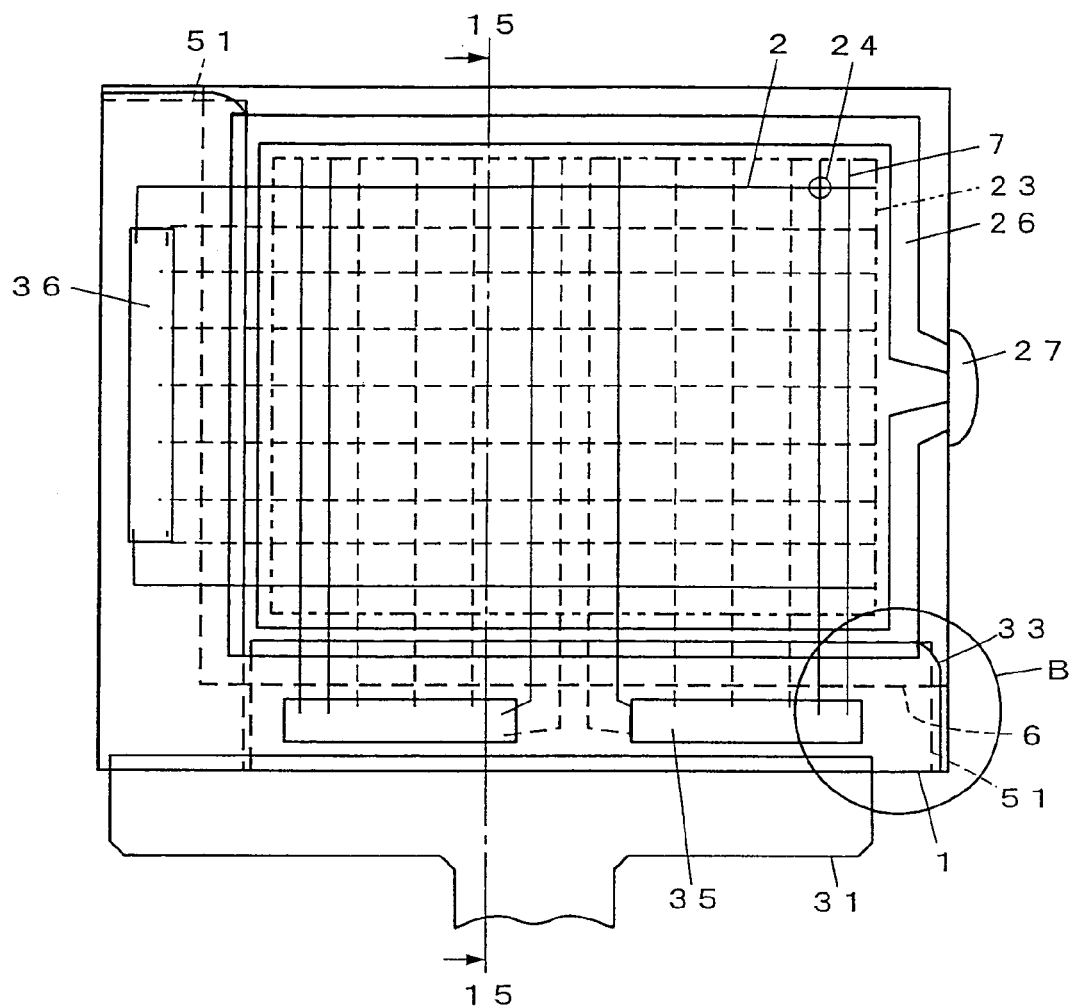
FIG. 14 is a plan view of a liquid crystal display panel of an eighth embodiment of the invention.
Figure 15:
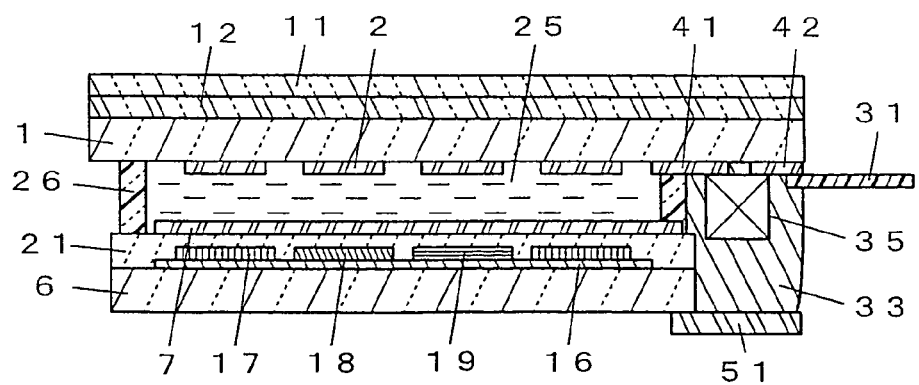
FIG. 15 is a cross-sectional view taken along a line 15—15 in FIG. 14.
Figure 16:
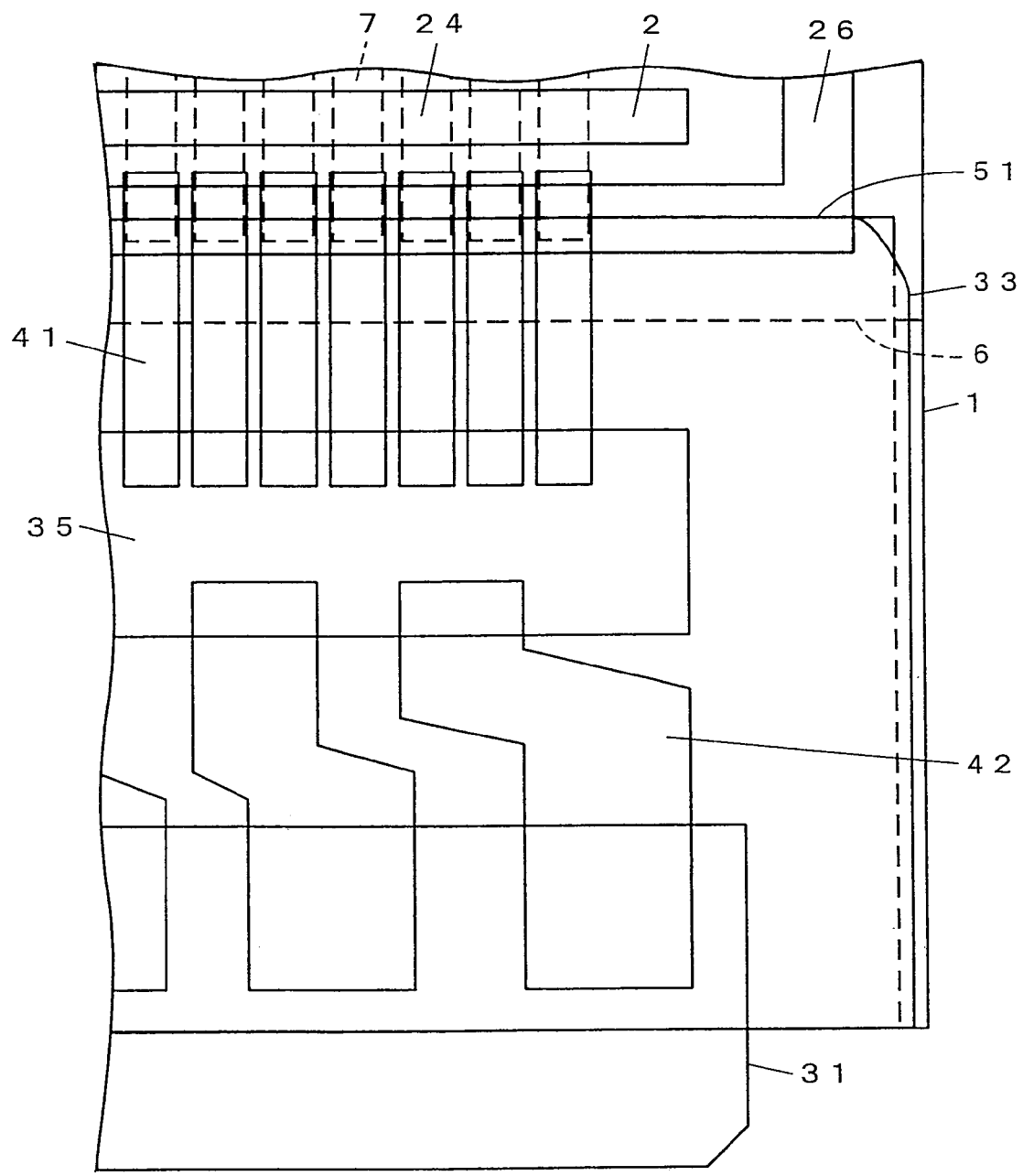
FIG. 16 is a partially enlarged plan view showing a part in circle B in FIG. 14.

Eighth Embodiment: FIG. 14 to FIG. 16

Next, an eighth embodiment of the liquid crystal display panel of the invention will be described. FIG. 14 is a plan view of the liquid crystal display panel, FIG. 15 is a cross-sectional view taken along a line 15—15 shown in FIG. 14, and FIG. 16 is a partially enlarged plan view of a part in circle B in FIG. 14. In these drawings, the same numerals are assigned to portions corresponding to those in the first and second embodiments.

The eighth embodiment is characterized in that an insulating resin is provided on and around lead electrodes provided on a first substrate, and a covering member is provided thereon as an insulating covering member. The basic configuration of this liquid crystal display panel is the same as that of the second embodiment described using FIG. 4 and FIG. 5. Thus, different points will be mainly described, and the description on the other points will be omitted or simplified.

First, in this liquid crystal display panel, unlike the second embodiment, no thin film insulating layer is provided. Second, as shown in FIG. 14 to FIG. 16, an insulating resin 33 composed of black epoxy resin having a black dye in epoxy resin is provided on and around lead electrodes 41 to cover at least portions of the lead electrodes 41 outside a sealant 26. Further, the insulating resin 33 is similarly provided also on driving ICs 35 and 36, on a portion of an FPC 31, and also between the driving ICs 35 and the FPC 31. Of course, the insulating resin 33 is provided between the driving ICs 35 and 36 and the sealant 26.

Figure 45:
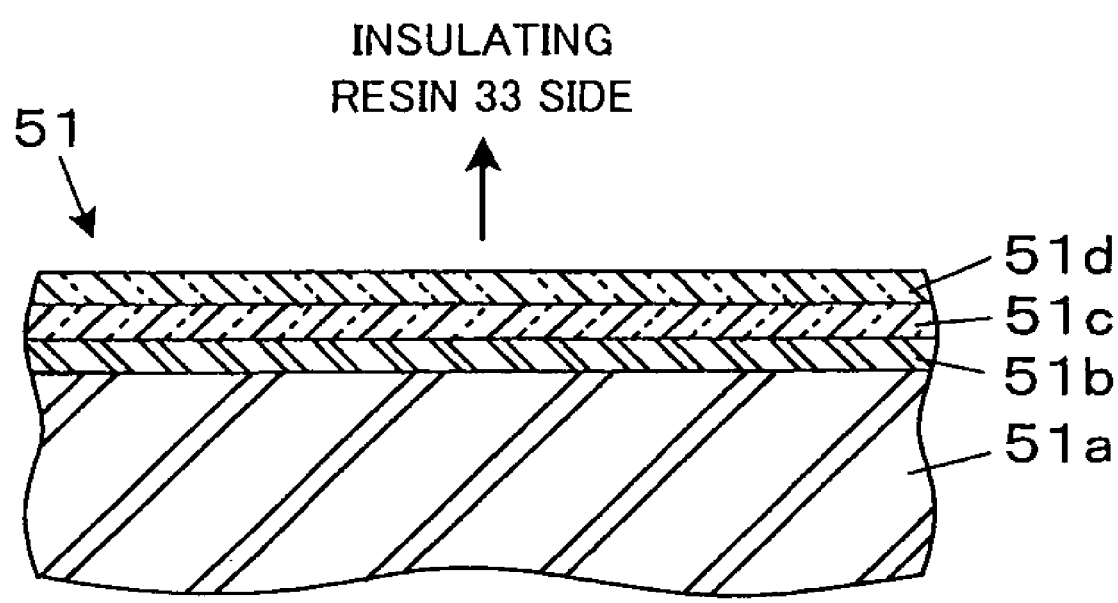
FIG. 45 is an enlarged cross-sectional view showing the structure of a covering member 51.

A covering member 51 is provided on the insulating resin 33 (the lower side in FIG. 15) in such a manner to cover at least the portions of the lead electrodes 41 outside the sealant 26, overlap with the driving ICs 35 and 36, the FPC 31, and a portion between the driving ICs 35 and 36 and the FPC 31, and partially overlap with the outer peripheral portion of a second substrate 6. In other words, the covering member 51 is provided from a position overlapping with a portion of the outer periphery of the second substrate 6 to a region overlapping with a portion of the first substrate 1 extending out to the FPC 31 side. As shown in FIG. 45, the covering member 51 includes a base 51a made of polycarbonate (PC) formed with, at least on the insulating conductive film 33 side of the base, a gas barrier layer 51d composed of a silicon oxide film and a titanium oxide film, a moisture blocking layer 51c and a transparent conduction film 51b. Incidentally, while the covering member 51 is provided separately into a first portion disposed on the side where the driving ICs 35 are provided and a second portion disposed on the side where the driving IC 36 is provided as shown in FIG. 14, the portions may be integrated.

Here, as shown in FIG. 14 and FIG. 16, the covering member 51 is provided to a position where the edge portion thereof overlaps with the sealant 26. When the plate-shaped covering member 51 is provided as in this liquid crystal display panel, it is preferable to decrease the thickness of the insulating resin 33 by pushing the covering member 51 to the panel to locate the covering member 51 close to the second substrate 6 so as to reduce the area of the cross section through which moisture permeates from the horizontal direction in FIG. 15. In this event, when the covering member 51 is pushed, the panel, especially, the second substrate 6 receives stress, but the end portion of the covering member 51 overlaps with the sealant 26 as described above so that the stress to the second substrate 6 can be mitigated for prevention of breakage of the substrate. Further, it is also possible to prevent a change in thickness of a liquid crystal layer 25 due to deformation of the substrates and a decrease in display quality caused by the change. However, only for prevention of electrolytic corrosion, it is not always necessary to provide the end portion of the covering member 51 at this position.

Usable materials for the covering member 51 include, other than the above-described PC, a plastic plate, a glass plate, a metal plate, a substrate composed of a metal plate provided with an anodic oxide layer as a second insulating covering member, a ceramic plate, or a laminated bonded member. In particular, ceramic is suitable because of its high strength and low thermal expansion coefficient. A processible ceramic such as MACOL glass (trade name) manufactured by Corning Incorporated is machinable, and thus it can be used to form into a covering member in a complicated shape. Besides, a thin film ceramic made by extending alumina into a foil, or porcelain is preferable because of its high strength and low thermal expansion coefficient. In the case of glass, a photosensitive glass substrate manufactured by Corning Incorporated is used to enable processing almost the same as metal working. In the case of a metal plate for use, it has a high ability of electromagnetic wave shielding and thus can prevent malfunction of the driving IC caused by noise.

The covering member 51 is preferably composed of a material having a thermal expansion coefficient equivalent to that of a substrate (the second substrate 6 here) in contact with the covering member 51. Such a configuration can prevent the covering member 51 from peeling off from the substrate when it is heated in a curing step of the insulating resin or the like. For example, the covering member 51, composed of the same glass as the substrate, is preferable in that it can be made equal in thermal expansion coefficient to the substrate.

The thickness of the covering member 51 is preferably about 50 μm to 700 μm. The plastic film, however, was preferably about 80 μm to 150 μm.

In this liquid crystal display panel, since the insulating resin 33 is provided also at the portion of the space between the first substrate 1 and the second substrate 6 outside the sealant 26, at this portion, the first substrate 1, the insulating resin 33, the second substrate 6, and the covering member 51 overlap one another as seen from the first substrate 1 side. Further, since the insulating resin 33 and the covering member 51 are provided also on the driving ICs 35 and 36 and the FPC 31, they have a portion overlapping with the driving ICs 35 and 36 and the FPC 31 as seen from the first substrate 1 side. Further, the insulating resin 33 extends off the outer peripheral portion of the covering member 51 at a portion on the right on paper in FIG. 15.

By the way, when such a liquid crystal display panel is fabricated, it is preferable that the driving ICs 35 and 36 and the FPC 31 are first mounted on the panel body, then the insulating resin 33 is applied thereto before the covering member 51 is disposed, and thereafter the insulating resin is cured.

Such fabrication allows the insulating resin 33 to bond the first substrate 1 and the covering member 51. Moreover, though not shown in FIG. 15, when the covering member 51 is disposed on the insulating resin 33 before the cure, a portion of the insulating resin 33 seeps out between the second substrate 6 and the covering member 51, so that the second substrate 6 and the covering member 51 can also be bonded together with the seeping-out insulating resin 33.

Through employment of the above-described structure, the covering member 51 and the insulating resin 33 can keep hermeticity of a portion where the lead electrodes 41 are provided to prevent moisture permeation into the lead electrodes 41. In particular, since the covering member 51 is provided to overlap with a portion of the second substrate 6 and bonded with the insulating resin 33, there is no space through which moisture passes between the covering member 51 and the second substrate 6, and therefore it is possible to eliminate moisture permeation from this place toward the lead electrodes 41. This enables prevention of electrolytic corrosion of the lead electrodes 41 and performance of stable display even in operation for a long time at a high temperature and high humidity.

Note that since the covering member 51 is provided separately into two portions here as shown in FIG. 14, there is a gap therebetween. However, though the liquid crystal display panel is greatly enlarged in the vertical direction in the cross-sectional view such as FIG. 15 for convenience of illustration, it is actually very thin. Thus, when the gap is located at a position apart from the lead electrodes 41 in horizontal direction, that is, a position overlapping with no lead electrodes as seen from the first substrate 1 side, even if moisture enters from the gap, the moisture has to permeate through the insulating resin 33 by a very long distance to reach the lead electrodes 41, as compared the case when moisture enters from a position directly above the lead electrodes 41. Therefore, the covering member 51 only in the aforementioned position is allowable in terms of prevention of moisture permeation even if it has a slight gap or opening.

Further, the provision of a slight gap in the covering member 51 is preferable in terms of capability of discharging excessive insulating resin 33 from between the two covering members to decrease the distance between the substrate and the covering member 51, and is advantageous in terms of capability of removing bubble forming in the insulating resin 33 through this gap. It is desirable, however, to locate the position of the gap as far as possible from the region where the lead electrodes 41 are formed.

Furthermore, the provision of the covering member 51 facilitates thick accumulation of the insulating resin 33 so that the moisture permeability can be decreased accordingly. Moreover, the covering member 51 provides a high reliability to prevent moisture permeation because it is not a film formed by application and is large in thickness so that pinholes seldom form therein.

Figure 17:
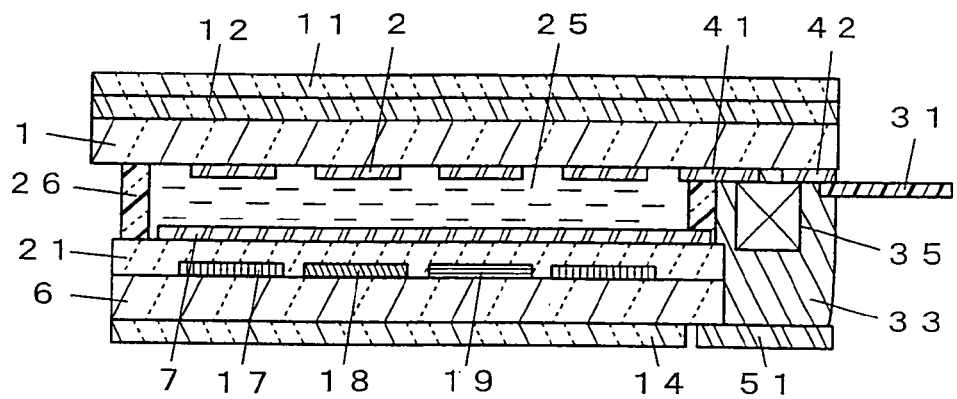
FIG. 17 is a cross-sectional view, corresponding to FIG. 15, showing a cross section of a liquid crystal display panel of a ninth embodiment of the invention.

Ninth Embodiment: FIG. 17

Next, a ninth embodiment of the liquid crystal display panel of the invention will be described. FIG. 17 is a cross-sectional view, corresponding to FIG. 15, showing a cross section of the liquid crystal display panel. In this drawing, the same numerals are assigned to portions corresponding to those in the eighth embodiment.

The ninth embodiment is characterized in that a second polarizing film is provided on a second substrate. The liquid crystal display panel of the ninth embodiment is almost the same as that of the above-described eighth embodiment except for this point and a point that the reflector 16 is not provided, and thus the description will be omitted or simplified except for the different points.

As shown in FIG. 17, this liquid crystal display panel is provided with not a reflector but a second polarizing film 14 on the rear side (the lower side in the drawing) of a second substrate 6. Then, a covering member 51 and the second polarizing film 14 are disposed with a predetermined gap provided therebetween on the second substrate 6.

As the second polarizing film 14, both an absorption-type polarizing film and a reflection-type polarizing film are usable. Besides, a scattering layer and a reflector may be provided together with the second polarizing film 14 so that a combined layer composed of these may be formed on the rear side of the second substrate 6.

The gap provided between the covering member 51 and the second polarizing film 14 as in this embodiment can prevent an insulating resin 33 bonding the covering member 51 from leaking from between the covering member 51 and the second substrate 6 and contaminating the second polarizing film 14. When RDF-C (trade name) manufactured by 3M being a reflection-type polarizing film is used as the second polarizing film 14, this polarizing film is made by laminating layers different in refractive index into many layers, and thus the layers peel off from each other due to an external force exerted on the cross section of the second polarizing film 14, resulting in distortion of polarization property thereof. However, a slight gap, which is provided between the second polarizing film 14 and the covering member 51, can prevent an external force from the covering member 51 from being exerted on the second polarizing film 14 and is thus effective in improving the reliability of the second polarizing film 14 and in preventing a decrease in display quality.

Figure 18:
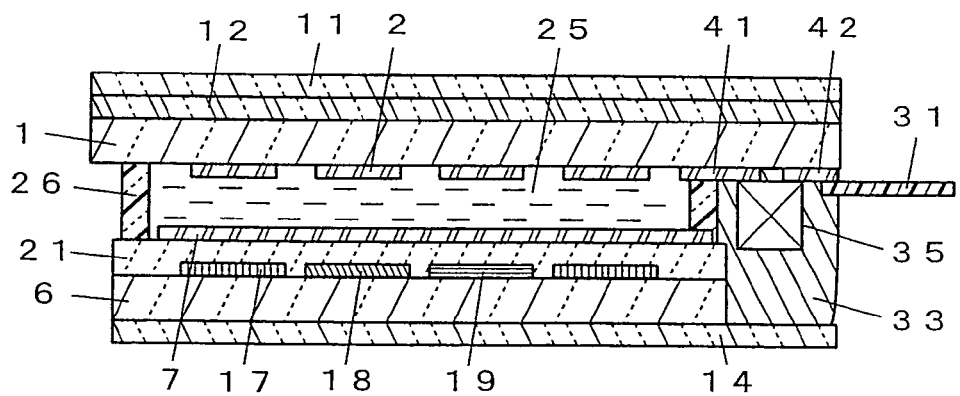
FIG. 18 is a cross-sectional view, corresponding to FIG. 15, showing a cross section of a liquid crystal display panel of a tenth embodiment of the invention.

Tenth Embodiment: FIG. 18

Next, a tenth embodiment of the liquid crystal display panel of the invention will be described. FIG. 18 is a cross-sectional view, corresponding to FIG. 15, showing a cross section of the liquid crystal display panel. In this drawing, the same numerals are assigned to portions corresponding to those in the eighth and ninth embodiments.

The tenth embodiment is characterized in that a second polarizing film provided on a second substrate is used also as an insulating covering member. The liquid crystal display panel of the tenth embodiment is the same as that of the above-described ninth embodiment except for this point, and thus the description will be omitted or simplified except for the different point.

As shown in FIG. 18, in this liquid crystal display panel, no independent covering member 51 is provided, and, instead of this, a polarizing film having a size reaching the position where a covering member is to be provided is used as a second polarizing film 14 provided on the rear side of a second substrate 6, and is used also as the insulating covering member. Incidentally, the second substrate 6 and the second polarizing film 14 are bonded together with an adhesive layer. Further, the second polarizing film 14 is not separated between the side where driving ICs 35 are provided and the side where a driving IC 36 is provided, but shall be used as an integrated covering member.

This configuration eliminates such a mutual positional interference problem that the second polarizing film 14 overlaps with the covering member 51 or that the covering member 51 extends into the display region, so that even when lead electrodes 41 are covered, the display region can occupy a wide area as close as possible to the end portion of the second substrate 6. In addition, there is no need to separately bond the second polarizing film 14 and the covering member, so that the fabrication process can be shortened.

To increase the reliability at a high temperature and high humidity, it is also adoptable to employ a method in which the adhesive layer for use in bonding the second polarizing film 14 and the second substrate 6 is not provided at a portion corresponding to the lead electrodes 41, and in stead, at this portion, the second polarizing film 14 and the second substrate 6 are bonded together with an insulating resin 33 seeping out between them.

Further, formation of a gas barrier layer and a moisture blocking layer on the second polarizing film 14 at the portion corresponding to the lead electrodes 41 can provide a structure more suitable for prevention of electrolytic corrosion of lead electrodes 41.

When the display region exists close to the substrate end faces on the driving ICs 35 and 36 sides of the second substrate 6, a transparent optical isotropic material is used as the insulating resin 33, so that even if the insulating resin 33 extends off to the display region side, the resin can be prevented from affecting the display quality.

As described above, the second polarizing film 14 provided on the lower side of the second substrate 6 is used also as the covering member, which makes it possible to prevent electrolytic corrosion of the lead electrodes 41 as well as to increase the display region and reduce the weight and thickness, resulting in a liquid crystal display panel with excellent reliability and display quality. Moreover, when a scattering layer and a reflector are provided together with the second polarizing film 14 to form a combined layer of these on the rear side of the second substrate 6, or when a polarizing film which has a multiple layer structure such as RDF-C (trade name) is used, the moisture permeability of the second polarizing film 14 can further be reduced, resulting in a further enhanced effect in preventing electrolytic corrosion of the lead electrodes 41.

Figure 19:
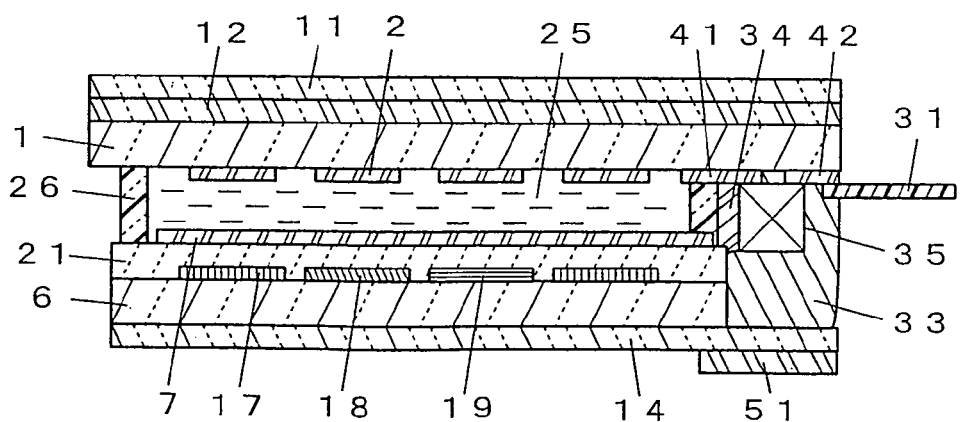
FIG. 19 is a cross-sectional view, corresponding to FIG. 15, showing a cross section of a liquid crystal display panel of an eleventh embodiment of the invention.

Eleventh Embodiment: FIG. 19

Next, an eleventh embodiment of the liquid crystal display panel of the invention will be described. FIG. 19 is a cross-sectional view, corresponding to FIG. 15, showing a cross section of the liquid crystal display panel. In this drawing, the same numerals are assigned to portions corresponding to those in the eighth and ninth embodiments.

The eleventh embodiment is a developed form of the above-described tenth embodiment and is characterized in that a second polarizing film provided on a second substrate is used also as an insulating covering member, that a covering member is further provided as a second insulating covering member on the second polarizing film, and that a second insulating resin is provided on lead electrodes. The liquid crystal display panel of the eleventh embodiment is the same as that of the above described tenth embodiment except for these points, and thus the description will be omitted or simplified except for the different points.

In this liquid crystal display panel, as shown in FIG, 19, a polarizing film having a size reaching the position where a covering member is to be provided is used as a second polarizing film 14 provided on the rear side of a second substrate 6, and is used also as the insulating covering member, and further a covering member 51 is provided on the second polarizing film 14 at a position corresponding to those in the cases of the eighth and ninth embodiments. The covering member 51 may be provided either separately or integrally between the side where driving ICs 35 are provided and the side where a driving IC 36 is provided, and integrally provided.

When the covering member 51 is provided on the second polarizing film 14 as described above, the covering member 51 is provided on an almost flat face, so that the covering member 51 can be bonded to be flat with high accuracy of position using an adhesive layer. As a matter of course, an insulating resin 33 never seeps into the display region when the covering member 51 is bonded.

Further, in this liquid crystal display panel, a second insulating resin 34 having a viscosity lower than that of the insulating resin 33 is provided on and around a portion of the lead electrodes 41 between the driving ICs 35 and 36 and a sealant 26, so as to provide two kinds of insulating resins, that is, the insulating resin 33 and the second insulating resin 34.

It can be reasoned that the insulating resin 33 cannot be applied well to the portion between the driving ICs 35 and 36 and the sealant 26, in particular, a portion of the space between the first substrate 1 and the second substrate 6 outside the sealant 26 because it is narrow, and thus the second insulating resin 34 having a lower viscosity is used to enable the application also to the narrow space with ease and reliability. The second insulating resin 34 may be cured before the application of the insulating resin 33 or at the same time with the curing step of the insulating resin 33.

Besides, when the driving ICs 35 and 36 are mounted on the lead electrodes 41 by the COG method and are left standing thereafter for a long time until installation of the FPC 31 and the covering member 51, it is also effective to use a resin capable of curing in a short time as the second insulating resin 34 and apply it on lead electrodes 41 for moisture blocking to some degree.

In any case, the two layers of the covering members and the two layers of the insulating resins can surely prevent moisture permeation into the lead electrodes 41 for prevention of electrolytic corrosion thereof.

Figure 20:
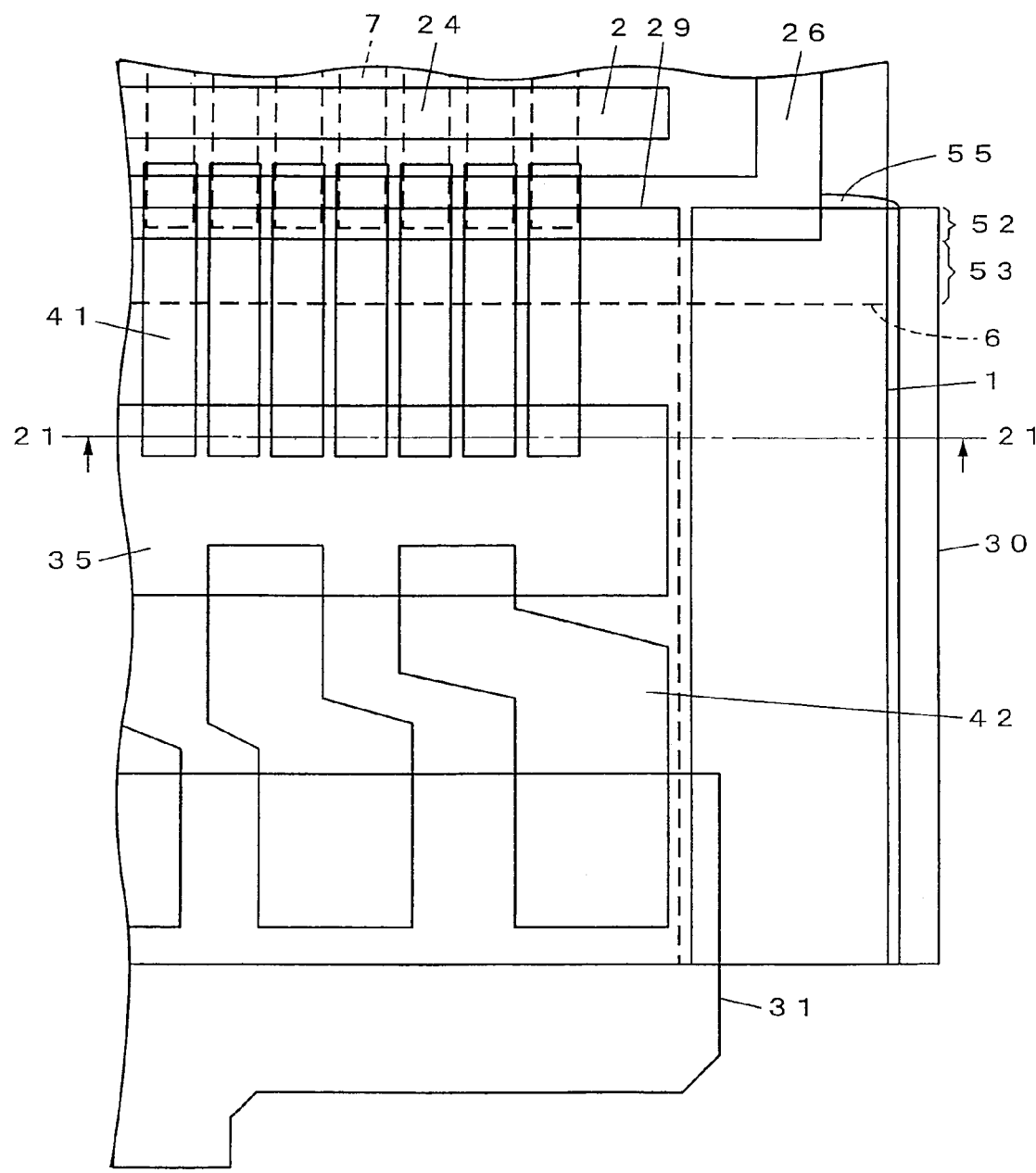
FIG. 20 is a partially enlarged plan view, corresponding to FIG. 16, showing a part of a liquid crystal display panel of a twelfth embodiment of the invention.
Figure 21:
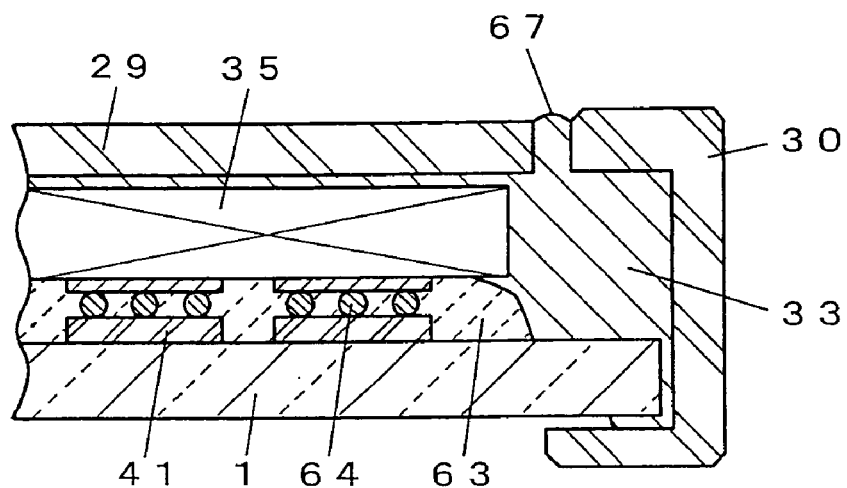
FIG. 21 is a partial cross-sectional view showing a part of a cross section taken along a line 21—21 in FIG. 20 in a vertically reversed manner.

Twelfth Embodiment: FIG. 20 and FIG. 21

Next, a twelfth embodiment of the liquid crystal display panel of the invention will be described. FIG. 20 is a partially enlarged plan view, corresponding to FIG. 16, showing a part of the liquid crystal display panel, and FIG. 21 is a partial cross-sectional view showing in a vertically reversed manner a part of the cross section taken along a line 21—21 in FIG. 20. In these drawings, the same numerals are assigned to portions corresponding to those in the eighth embodiment.

The twelfth embodiment is characterized in that a first covering member in a flat-plate shape and a second covering member having a U-shaped cross section are provided as an insulating covering member. The liquid crystal display panel of the twelfth embodiment is the same as that of the eighth embodiment described using FIG. 14 to FIG. 16 except for this point, and thus the description will be omitted or simplified except for the different point.

In this liquid crystal display panel, as shown in FIG. 20 and FIG. 21, a first covering member 29 and a second covering member 30 are provided as the insulating covering member to be provided on an insulating resin 33. Among them, the first covering member 29 is similar to the covering member 51 in the eighth embodiment, and has a flat shape. The position of the first covering member 29 to be provided is almost similar thereto, but in order not to overlap with the second covering member 30, the first covering member 29 is provided only within a position somewhat apart from the end portion of a first substrate 1, on the side where the second covering member 30 is provided.

On the other hand, at the end portion of the first substrate 1 on the right in FIG. 20, the second covering member 30 having a U-shaped cross section is provided as shown in FIG. 21. The material and thickness of the second covering member 30 are the same as those of the first covering member 29. While only the first substrate 1 is seen in the cross section in FIG. 21, this second covering member 30 is provided to have the first substrate 1 and a second substrate 6 fitted inside the letter U. An insulating resin gap portion 67 for exhausting bubbles in the insulating resin 33 and allowing an excessive insulating resin 33 to flow out to the outside, is provided between the second covering member 30 and the first insulating covering member 29.

Then, the second covering member 30 is bonded to the first substrate 1 with the insulating resin 33. Further, the insulating resin 33 slightly flows around onto the side opposite to the side where driving ICs 35 are provided, and the similar flowing around occurs also on the second substrate 6, so that the second covering member 30 is also bonded to the second substrate 6.

It should be noted that numeral 63 in FIG. 21 denotes a polyimide resin constituting the anisotropic conductive film for use in connecting lead electrodes 41 and the driving ICs 35, and numeral 64 denotes a conductive particle contained therein.

In this liquid crystal display panel, the second covering member 30 provided as described above can prevent the insulating resin 33 from hanging down from the end portion of the first substrate 1. In addition, the first covering member 29 and the second covering member 30 can apply a pressure to the insulating resin 33, so that the insulating resin 33 can efficiently be applied also to a narrow gap portion 53 between the first substrate 1 and the second substrate 6 near a sealant 26. In this event, the excessive insulating resin 33 pushed out by this application of pressure can escape to the insulating resin gap portion 67, and a flowing around portion 52 and an extending portion 55 along the sealant 26.

Therefore, the provision of the first covering member 29 and the second covering member 30 as described above greatly improves the application property of the insulating resin 33 to the gap between the first substrate 1 and the second substrate 6 near the sealant 26 and allows the bubble forming during the cure of the insulating resin and the excessive insulating resin to escape, so that the hermeticity for the lead electrodes 41 can easily be improved to greatly reduce the moisture permeability into the lead electrodes 41.

Figure 22:
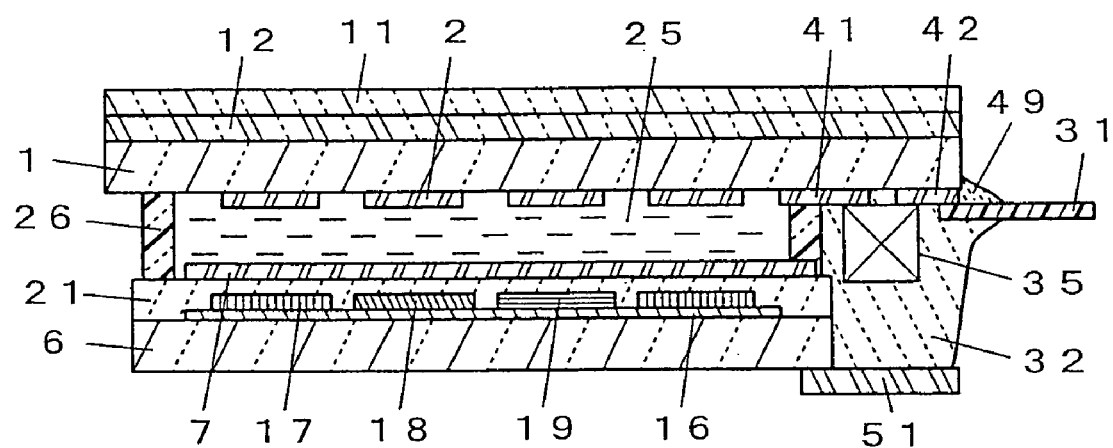
FIG. 22 is a cross-sectional view, corresponding to FIG. 15, showing a cross section of a liquid crystal display panel of a thirteenth embodiment of the invention.

Thirteenth Embodiment: FIG. 22

Next, a thirteenth embodiment of the liquid crystal display panel of the invention will be described. FIG. 22 is a cross-sectional view, corresponding to FIG. 15, showing a cross section of the liquid crystal display panel. In this drawing, the same numerals are assigned to portions corresponding to those in the eighth embodiment.

The thirteenth embodiment is characterized in that an insulating resin is provided on both sides of an FPC. The liquid crystal display panel of the thirteenth embodiment is almost the same as that of the eighth embodiment described using FIG. 14 to FIG. 16 except for this point, and thus the description will be omitted or simplified except for the different point.

As shown in FIG. 22, also in this liquid crystal display panel, while the insulating resin is provided at a position similar to that in the case of the eighth embodiment, it is provided on an FPC 31 at a slightly larger portion.

As the resin, a transparent ultraviolet curing epoxy resin or ultraviolet curing acrylic resin is used to form an insulating resin 32. The ultraviolet curing resin can cure in a short time, and thus its use can prevent a covering member 51 from moving during the cure.

Further, an FPC insulating resin 49 is provided also on a first substrate 1 side (the upper side in FIG. 22) of the FPC 31. As this resin, it is preferable to use the same resin as the insulating resin 32 when giving propriety to mechanical strength. In other words, elastic resin as represented by a silicon resin is sometimes weak in adhesion to the FPC, and thus an epoxy resin or an acrylic resin is preferable to attain its mechanical strength.

The FPC insulating resin 49 provided as described above can prevent moisture from entering from the outer periphery side of the panel not to only lead electrodes 41 but also to connecting electrodes 42 connected to the FPC 31, and prevent electrolytic corrosion thereof.

Figure 23:
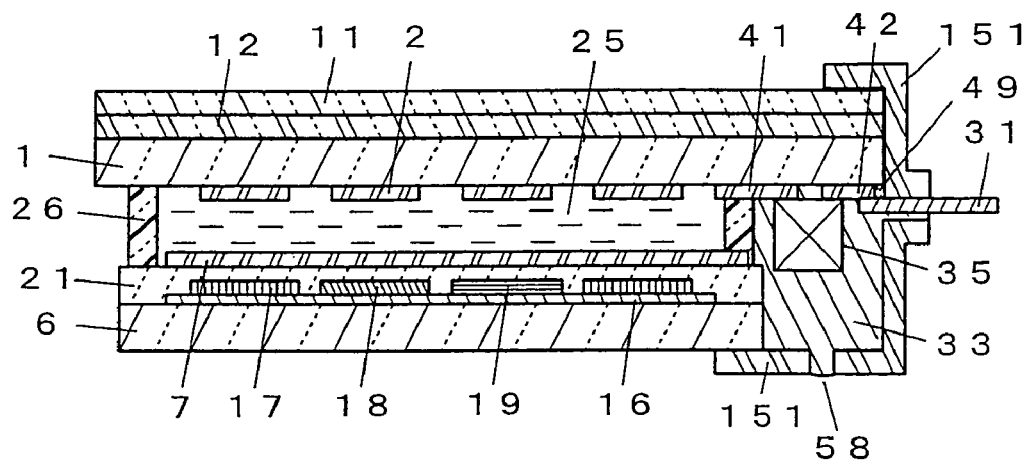
FIG. 23 is a cross-sectional view, corresponding to FIG. 15, showing a cross section of a liquid crystal display panel of a fourteenth embodiment of the invention.
Figure 24:
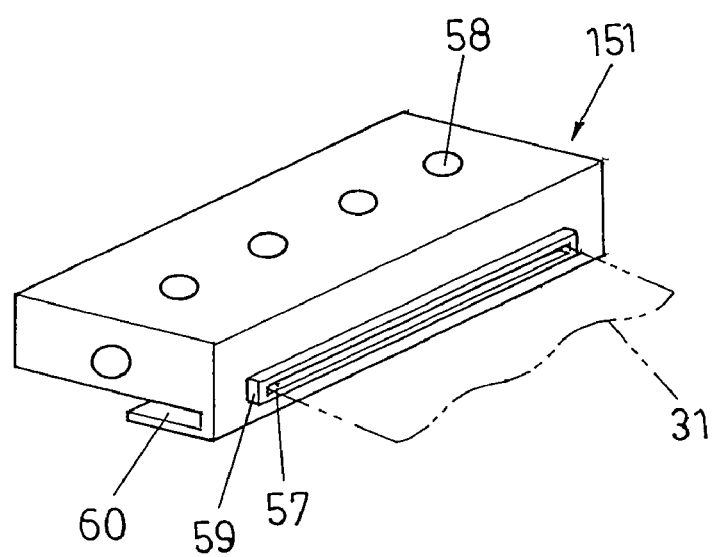
FIG. 24 is a perspective view showing the shape of a covering member to be provided on the liquid crystal display panel.

Fourteenth Embodiment: FIG. 23 and FIG. 24

Next, a fourteenth embodiment of the liquid crystal display panel of the invention will be described. FIG. 23 is a cross-sectional view, corresponding to FIG. 15, showing a cross section of the liquid crystal display panel, and FIG. 24 is a perspective view showing the shape of a covering member to be provided on this liquid crystal display panel. In these drawings, the same numerals are assigned to portions corresponding to those in the eighth embodiment.

The fourteenth embodiment is a developed form of the above-described twelfth embodiment, and is characterized in that the covering member in a shape shown in FIG. 24 is used. The liquid crystal display panel of the fourteenth embodiment is the same as that of the above-described twelfth embodiment except for this point, and thus the description will be omitted or simplified except for the different point. Incidentally, in FIG. 24, the covering member is shown with the state thereof in FIG. 23 being vertically reversed.

A covering member 151 for use in this liquid crystal display panel has, as shown in FIG. 23 and FIG. 24, a shape covering the end portions of a first substrate 1 and a second substrate 6 on the side where lead electrodes 41 led out. The cross section has a shape of the letter U. Further, on the side where an FPC 31 is provided, an FPC slit 57 is provided to take the FPC 31 out of the covering member 151, and furthermore, an FPC slit flange 59 is provided to prevent an insulating resin 33 from greatly extending off to the outside from the FPC slit 57. Moreover, the covering member 151 is provided with introducing holes 58 as openings for introducing the insulating resin. The introducing holes 58 are preferably provided at portions where they do not overlap with lead electrodes 41 or connecting electrodes 42 as seen from the first substrate 1 side. Such an arrangement can reduce to a minimum influence due to nonexistence of the covering member at the introducing holes 58.

Besides, although the inside of the covering member 151 is not illustrated in FIG. 24, this covering member 151 may be transparent. The transparent covering member 151 is preferable because of easy check of the application state of the insulating resin 33 and the occurrence state of bubbles, while the covering member is preferably black having a light shielding effect in order to shield driving ICs 35 and 36 from light. Therefore, the covering member 151 preferably has a transparent face on the side where the lead electrodes are provided and a black face on the side opposite thereto with the driving ICs 35 and 36 and the first substrate 1 intervening therebetween.

Such a covering member 151 is installed before the application of the insulating resin 33 to have the first substrate 1 and the second substrate 6 fitted inside the letter U of the cross section as shown in FIG. 23. In this event, the covering member 151 shall be fitted deep enough for the side face of the first substrate 1 to come into contact with the covering member 151. Thereafter, the insulating resin 33 is filled through the introducing holes 58. In this event, an excessive insulating resin 33 is partially discharged from the FPC slit 57 and also from the introducing holes 58 not in use for introduction of the insulating resin 33. Thereafter, bubbles forming when the insulating resin 33 cures can be exhausted similarly. Then, the insulating resin 33 forms into a state slightly swelling out from the introducing holes 58.

It should be noted that, in the example shown in FIG. 24, the side face of the covering member 151 is provided with a substrate groove 60 into which the first substrate 1 is fitted so that the side face of the covering member 151 is located inside the end portion of the first substrate 1. Such a configuration enables the excessive insulating resin 33 and the bubbles to be exhausted also through the substrate groove 60. Of course, it is not necessary to provide the substrate groove 60 when the position of the side face of the covering member 151 is located outside the end portion of the first substrate 1, and it is necessary to provide a substrate groove into which the second substrate 6 is fitted when the position is located inside the end portion of the second substrate 6.

In the case of using such a covering member 151, the covering member 151 which continues from the upper side to the lower side of the first substrate 1 is to be provided, so that even when a contraction stress or an expansion stress occurs in the cure of the insulating resin 33, the stress never concentrates on one face, leading to prevention of warpage of the substrate. Further, since the covering member 151 is in contact with both the first substrate 1 and the second substrate 6, the covering member 151 can reinforce the substrates.

Moreover, also a face perpendicular to the first substrate 1 of the covering member 151 is in contact with the insulating resin 33 to block external air so that the hermeticity at the lead electrodes 41 becomes fully secured. This provides a structure very effective in preventing electrolytic corrosion.

Figure 25:
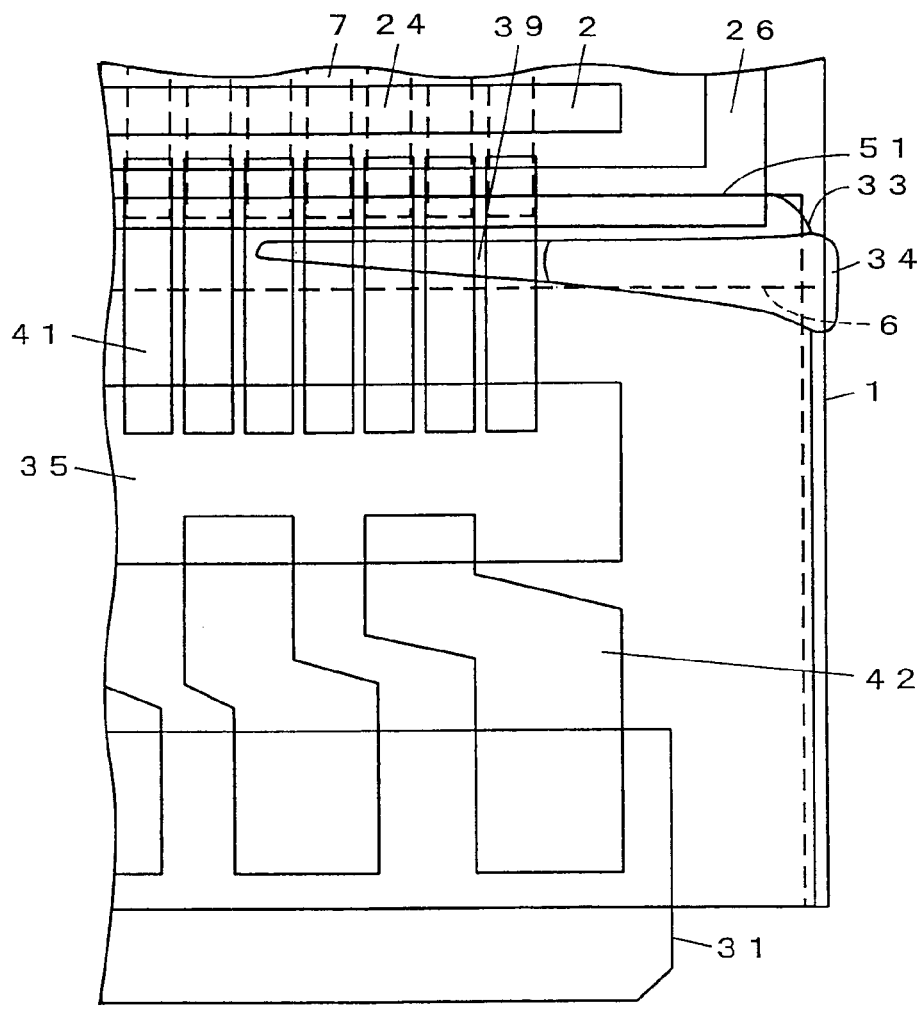
FIG. 25 is a partially enlarged plan view, corresponding to FIG. 16, showing a part of a liquid crystal display panel of a fifteenth embodiment of the invention.
Figure 26:
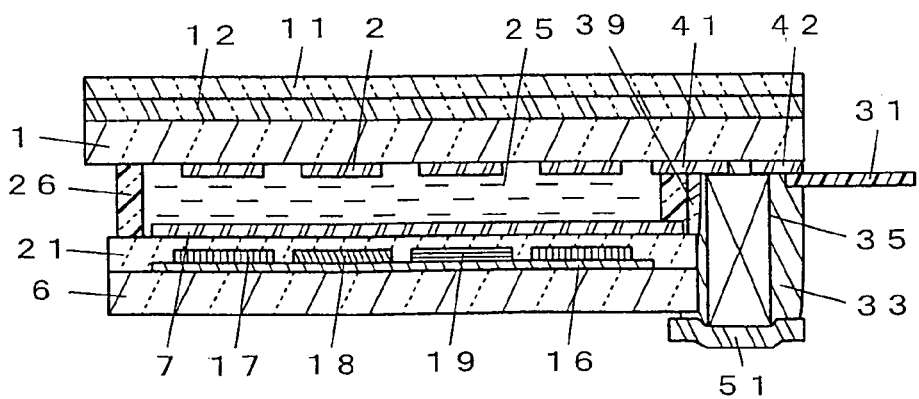
FIG. 26 is a cross-sectional view, corresponding to FIG. 15, showing a cross section of the liquid crystal display panel of the fifteenth embodiment of the invention.

Fifteenth Embodiment: FIG. 25 and FIG. 26

Next, a fifteenth embodiment of the liquid crystal display panel of the invention will be described. FIG. 25 is a partially enlarged plan view, corresponding to FIG. 16, showing a part of the liquid crystal display panel, and FIG. 26 is a cross-sectional view, corresponding to FIG. 15, showing a cross section of this liquid crystal display panel. In these drawings, the same numerals are assigned to portions corresponding to those in the eighth embodiment.

The fifteenth embodiment is characterized in that when the gap between substrates is narrow, and thus an insulating resin 33 cannot sufficiently be applied thereto, the space of the gap is filled with a second insulating resin having a low viscosity. The liquid crystal display panel of the fifteenth embodiment is almost the same as that of the above-described eighth embodiment described using FIG. 14 to FIG. 16 except for this point, and thus the description will be omitted or simplified except for the different point.

In this liquid crystal display panel, a ferroelectric liquid crystal is employed for a liquid crystal layer 25 and thus a thickness thereof is about 1 μm, and accordingly the gap between a first substrate 1 and a second substrate 6 is just at that level. As a result of the experiments conducted by the inventors, it was verified that in the aforementioned case, unless a resin for use has a very low viscosity, an insulating resin does not sometimes flow into a space between the first substrate 1 and the second substrate 6. When the insulating resin having a low viscosity is used, however, it flows away during its application and cannot be accumulated high enough to reach a covering member 51 when applied to a large area. On the other hand, the resin used as an insulating resin 33 in the eighth embodiment and so on is very hard to fill the narrow space having a thickness of 1 μm.

Hence, with the knowledge of impossibility of sufficiently filling into the space between the first substrate 1 and the second substrate 6, the insulating resin 33 used in the eighth embodiment and so on is first applied, and the covering member 51 is disposed. Then, a space portion 39 which cannot be filled with the insulating resin 33 as shown in FIG. 25 is created, and thereafter a second insulating resin 34 having a viscosity lower than that of the insulating resin 33 is introduced from near the end portion of the covering member 51 to seal the space portion 39. The second insulating resin 34 having a low viscosity can be introduced into the space portion 39 with ease by capillarity and can cover lead electrodes 41 to prevent moisture permeation thereinto.

Note that even if the space portion 39 cannot completely be filled with the second insulating resin 34 as shown in FIG. 25, the effect of preventing moisture permeation can be attained by sealing the space portion 39 with the second insulating resin 34 to shield it from the external air.

Further, in this liquid crystal display panel, since driving ICs 35 having a large height are used as shown in FIG. 26, the driving ICs 35 extend downward lower than the second substrate 6 in the drawing. The insulating resin 33 is provided, the covering member 51 is disposed thereon, and thereafter the insulating resin 33 is thermally cured. In this time, the insulating resin 33 thermally contracts. When the covering member 51 is pulled to the first substrate 1 side due to this thermal contraction, the covering member 51 is stuck on the driving ICs 35. Therefore, it is preferable to use as the covering member 51 a flexible material capable of deforming in accordance with the shape of the driving ICs 35 in the above-mentioned case to keep in close contact with the insulating resin 33.

Sixteenth Embodiment: FIG. 27 and FIG. 28

Next, a sixteenth embodiment of the liquid crystal display panel of the invention will be described. FIG. 27 is a plan view of the liquid crystal display panel, and FIG. 28 is a cross-sectional view taken along a line 28—28 shown in FIG. 27. In these drawings, the same numerals are assigned to portions corresponding to those in the eighth embodiment.

The sixteenth embodiment is characterized in that a covering member is composed of a black member and is used as a panel cover of the liquid crystal display panel. This liquid crystal display panel, in which the vertical relation between a first substrate and a second substrate is reversed, looks greatly different from that of the eighth embodiment but has many points in basic configuration common therewith, and thus the description on the common points will be omitted or simplified.

In this liquid crystal display panel, since a covering member 101 is used as the panel cover, the upper side in FIG. 28 is the visible side, on which a second substrate 6 is disposed, and a first substrate 1 is disposed on the side opposite thereto. Then, a reflector 16 and respective color filters 17, 18, and 19, and a flattening protective film 21 are disposed on a liquid crystal layer 25 side of the first substrate 1, and a polarizing film 11 and a retardation film 12 are disposed on the visible side of the second substrate 6. However, lead electrodes 41, driving ICs 35 and 36, and an FPC 31 are provided on the face on the liquid crystal layer 25 side of the first substrate 1 as in the eighth embodiment.

Then, also in this liquid crystal display panel, an insulating resin 33 composed of the black epoxy resin having the black dye in the epoxy resin is provided in a region including the top of the lead electrodes 41 and therearound, the top of the driving ICs 35 and 36, and a portion of the top of the FPC 31 as in the eighth embodiment.

On the insulating resin 33, the covering member 101 is provided as the insulating covering member, and this covering member 101 is formed by kneading a resin with a black dye, processing them into a sheet shape, and stamping the sheet by a press into an outer contour and inner contour of the covering member 101. This covering member 101 is disposed on the polarizing film 11 provided on the second substrate 6 as shown in FIG. 28, and is provided not only on the side where the insulating resin 33 is provided but around the entire periphery of the second substrate 6 as shown in FIG. 27, so that the covering member 101 is used as a panel cover for shielding the outside of a display region 23 to clarify the display region 23.

This covering member 101 is bonded, as in the eighth embodiment, to the first substrate 1 and the second substrate 6 (actually to the polarizing film 11 thereon) with the insulating resin 33. A small amount of the insulating resin 33 is provided on the second substrate 6 also on sides where no driving ICs 35 and 36 are provided, so that the covering member 101 and the second substrate 6 are bonded together also at these portions.

Such a configuration can not only provide the effect of preventing electrolytic corrosion equivalent to that of the eighth embodiment, but also reduce the number of parts and the number of steps because there is no need to provide a separate panel cover. Further, the insulating resin 33 is provided on the entire outer peripheral portion of the polarizing film 11 and thus can prevent moisture permeation into the polarizing film 11 to improve the reliability of the polarizing film 11 as well. Incidentally, it is also conceivable to use a transparent covering member and apply the insulating resin 33 on the outside of the display region by an inkjet method or a printing method to form a panel cover. The use of the black covering member 101, however, can provide more easily a high positional accuracy.

Figure 29:
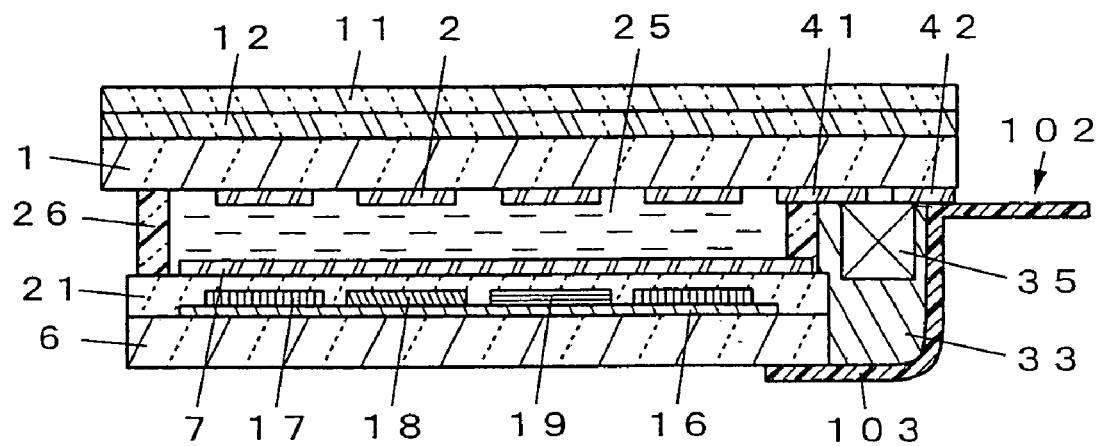
FIG. 29 is a cross-sectional view, corresponding to FIG. 15, showing a cross section of a liquid crystal display panel of a seventeenth embodiment of the invention.

Seventeenth Embodiment: FIG. 29

Next, a seventeenth embodiment of the liquid crystal display panel of the invention will be described. FIG. 29 is a cross-sectional view, corresponding to FIG. 15, showing a cross section of the liquid crystal display panel. In this drawing, the same numerals are assigned to portions corresponding to those in the eighth embodiment.

The seventeenth embodiment is characterized in that a portion of an FPC is used as an insulating covering member. The liquid crystal display panel of the seventeenth embodiment is the same as that of the eighth embodiment described using FIG. 14 to FIG. 16 except for this point, and thus the description will be omitted or simplified except for the different point.

In this liquid crystal display panel, as shown in FIG. 29, no covering member is provided on an insulating resin 33. Then, as the FPC to be connected to a connecting electrode 42, an FPC 102 which has a free end portion 103 beyond a connecting terminal with the connecting electrode 42 is used. The free end portion 103 is disposed on the insulating resin 33 in close contact therewith, and a portion thereof is made to overlap with and fix on a second substrate 6, so that the free end portion 103 is used as the insulating covering member. The free end portion 103 of the FPC 102 and the second substrate 6 may be bonded together with an adhesive or with the insulating resin 33 which is caused to seep into the space between the free end portion 103 and the second substrate 6.

Even such a configuration can decrease the moisture permeability into a lead electrode 41 to prevent electrolytic corrosion.

Figure 30:
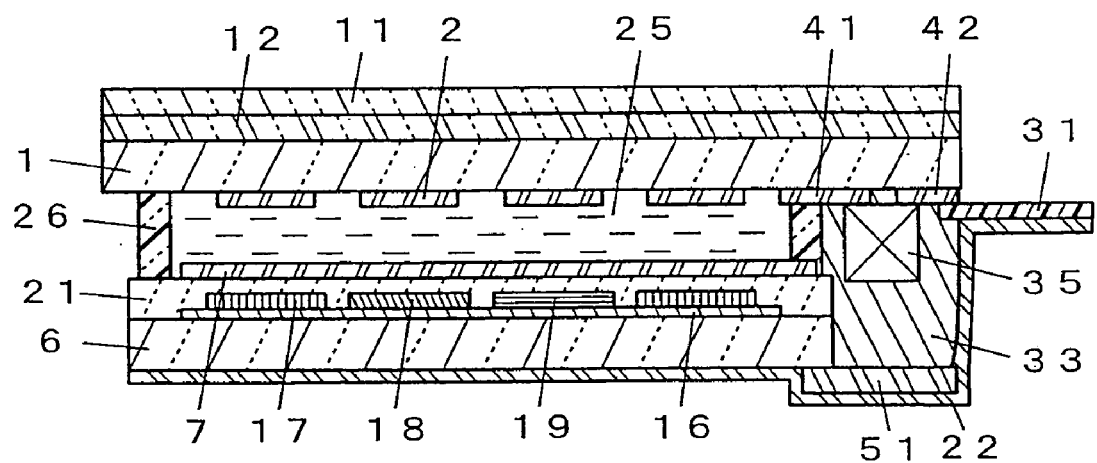
FIG. 30 is a cross-sectional view, corresponding to FIG. 15, showing a cross section of a liquid crystal display panel of an eighteenth embodiment of the invention.

Eighteenth Embodiment: FIG. 30

Next, an eighteenth embodiment of the liquid crystal display panel of the invention will be described. FIG. 30 is a cross-sectional view, corresponding to FIG. 15, showing a cross section of the liquid crystal display panel. In this drawing, the same numerals are assigned to portions corresponding to those in the eighth embodiment.

The eighteenth embodiment is characterized in that a thin film insulating layer is further provided as a second insulating covering member on a covering member. The liquid crystal display panel of the eighteenth embodiment is the same as that of the above-described eighth embodiment except for this point, and thus the description will be omitted or simplified except for the different point.

In this liquid crystal display panel, as shown in FIG. 30, an insulating thin film 22 is provided on an FPC 31, an insulating resin 33, a covering member 51, and a second substrate 6 to cover these members. The material, thickness, and forming method thereof are the same those in the first embodiment.

With such a configuration, three members, that is, the thin film insulating layer 22, the covering member 51, and the insulating resin 33 can prevent moisture permeation into a lead electrode 41 to prevent occurrence of electrolytic corrosion very fully. In particular, when the covering member 51 is provided with a gap or opening, such a configuration exhibits a great effect.

Figure 31:
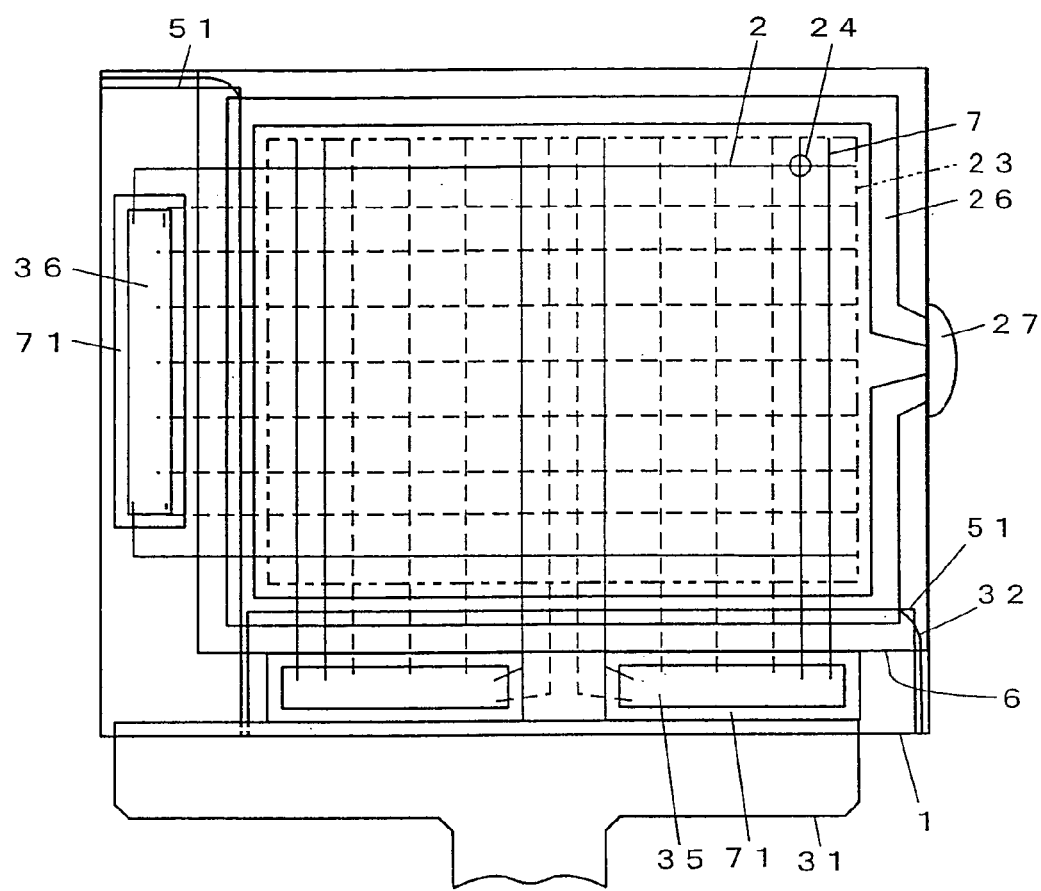
FIG. 31 is a plan view of a liquid crystal display panel of a nineteenth embodiment of the invention.

Nineteenth Embodiment: FIG. 31

Next, a nineteenth embodiment of the liquid crystal display panel of the invention will be described. FIG. 31 is a plan view of the liquid crystal display panel. In this drawing, the same numerals are assigned to portions corresponding to those in the eighth embodiment.

The nineteenth embodiment is characterized in that a portion overlapping with driving ICs of the covering member is colored in black. The liquid crystal display panel of the nineteenth embodiment is almost the same as that of the above-described eighth embodiment except for this point, and thus the description will be omitted or simplified except for the different point.

In this liquid crystal display panel, as shown in FIG. 31, a transparent insulating resin 32 is provided, and portions overlapping with driving ICs 35 and 36, as seen from a first substrate 1 side, of a covering member 51 are made colored portions 71 which are colored in black to absorb light within an ultraviolet wave range and a visible light wave range. Specifically, the covering member 51 is composed of a plastic film, and the portions to become the colored portions 71 are impregnated with a black pigment.

The colored portions 71 provided in the covering member 51 as described above can shield the driving ICs 35 and 36 from light and prevent the ICs from malfunctioning due to light. Further, it is also possible to align the covering member 51 to the panel with ease with the colored portions 71 as a guide.

Incidentally, in this liquid crystal display panel, since it is impossible to irradiate ultraviolet rays to the insulating resin 32 at a portion covered with the colored portions 71, a thermosetting resin is suitable for use as the insulating resin 32.

Further, it is preferable to form a light blocking portion by applying the insulating resin 33 or the like also onto a portion corresponding to the driving ICs 35 and 36 on the face of the first substrate 1 opposite to the side where the driving ICs 35 and 36 are provided. In such a configuration, light to the driving ICs 35 and 36 can be blocked by both faces, which is more effective in preventing the ICs from malfunctioning.

Figure 32:
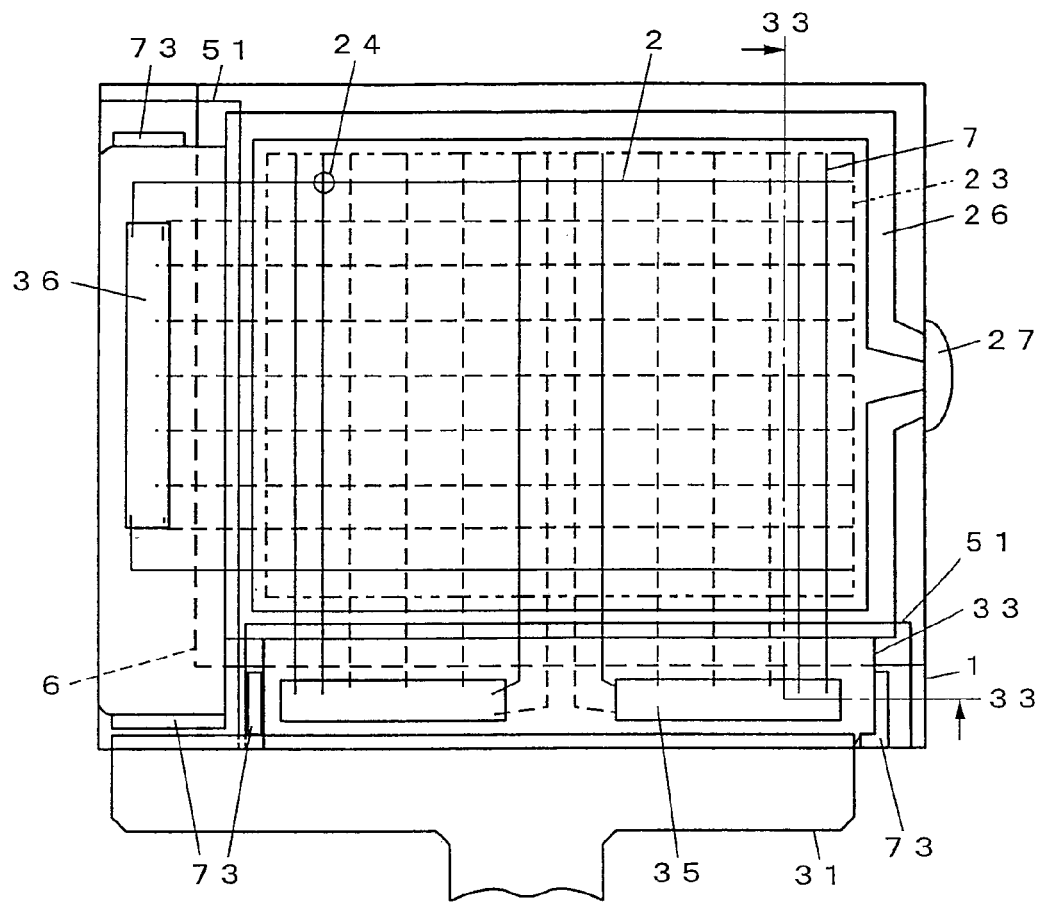
FIG. 32 is a plan view of a liquid crystal display panel of a twentieth embodiment of the invention.
Figure 33:
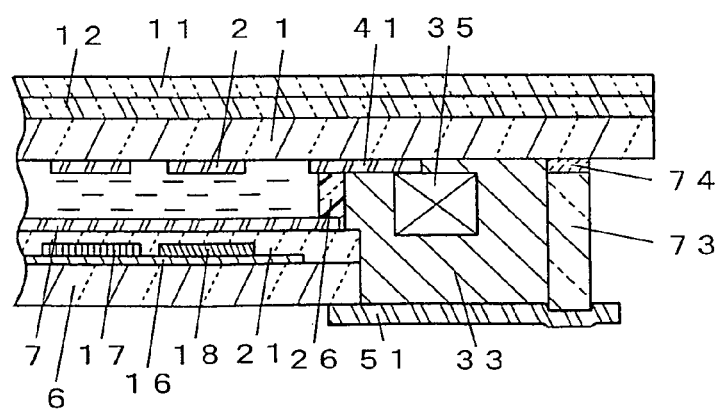
FIG. 33 is a cross-sectional view taken along a line 33—33 in FIG. 32.

Twentieth Embodiment: FIG. 32 and FIG. 33

Next, a twentieth embodiment of the liquid crystal display panel of the invention will be described. FIG. 32 is a plan view of the liquid crystal display panel, and FIG. 33 is a cross-sectional view taken along a line 33—33 shown in FIG. 32. In these drawings, the same numerals are assigned to portions corresponding to those in the eighth embodiment.

The twentieth embodiment is characterized in that outer peripheral walls are provided for preventing an insulating resin from flowing out. The liquid crystal display panel of the twentieth embodiment is also almost the same as that of the above-described eighth embodiment except for this point, and thus the description will be omitted or simplified except for the different point.

In this liquid crystal display panel, as shown in FIG. 32 and FIG. 33, outer peripheral walls 73 are provided on a first substrate 1. The outer peripheral walls 73 are made of resin and bonded to the first substrate 1 with outer peripheral wall adhesive layers 74 made of an epoxy resin or a double-sided tape. The positions for providing the outer peripheral walls 73 are located at the outer peripheral portion of the region where an insulating resin 33 is provided. Here, the insulating resin 33 is provided separately into a portion to cover lead electrodes 41 connected to driving ICs 35 and a portion to cover the lead electrodes 41 connected to a driving IC 36.

For fabricating this liquid crystal display panel, it is preferable that after the driving ICs 35 and 36 and an FPC 31 are mounted on the liquid crystal display panel body, the outer peripheral walls 73 are fixed on the first substrate 1 with the outer peripheral wall adhesive layers 74, and thereafter the insulating resin 33 is applied to a necessary portion. In this event, it is preferable that the resin is caused to somewhat overflow from the outer peripheral walls 73 in order to remove bubbles from the gap between the first substrate 1 and a second substrate 6 and near the driving ICs 35 and 36. Thereafter, a covering member 51 is disposed on the insulating resin 33, a pressure is applied thereto, and a heat treatment is performed for curing the resin, so that this liquid crystal display panel is completed.

The outer peripheral walls 73 provided as described above can prevent the resin from flowing out into an unintended portion in a step of applying the insulating resin 33, and from hanging down or extending off the outer periphery of the first substrate 1. Further, the provision of the outer peripheral walls 73 also enables the resin to fluently flow at the outer peripheral portion of the second substrate 6.

Incidentally, the outer peripheral walls 73 are preferably provided up to a height to come into contact with the covering member 51 as shown in FIG. 33. Besides, FIG. 32 shows an example in which three rectangular parallelepiped members and one L-shaped member are provided as the outer peripheral walls 73, but the number and the shape of the outer peripheral walls are not limited to these. Further, the outer peripheral walls 73 may be formed directly on the first substrate 1 by a dispenser.

Figure 34:
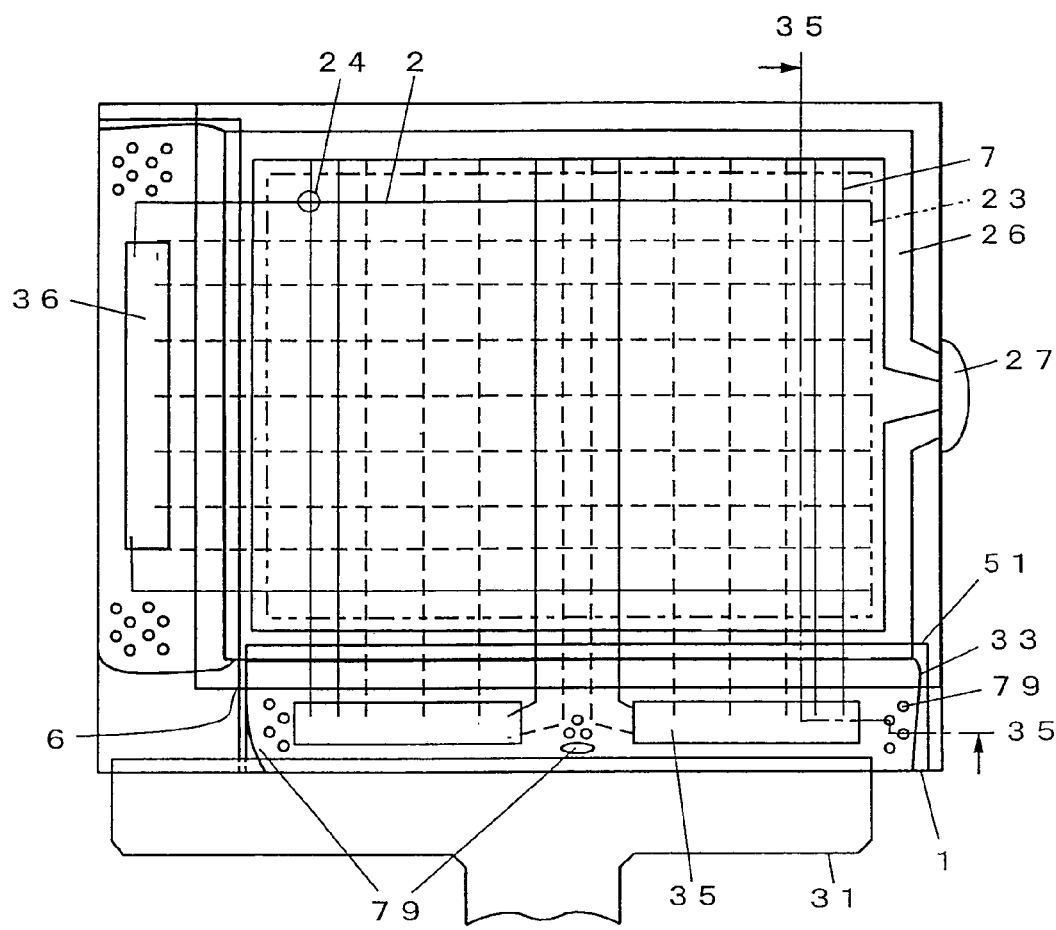
FIG. 34 is a plan view of a liquid crystal display panel of a twenty-first embodiment of the invention.
Figure 35:
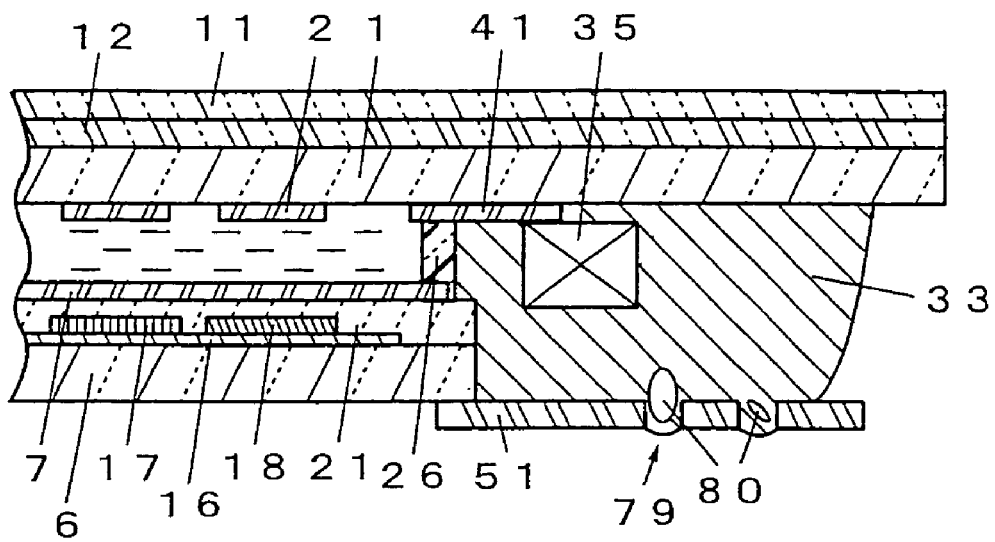
FIG. 35 is a cross-sectional view taken along a line 35—35 in FIG. 34.
Figure 36:
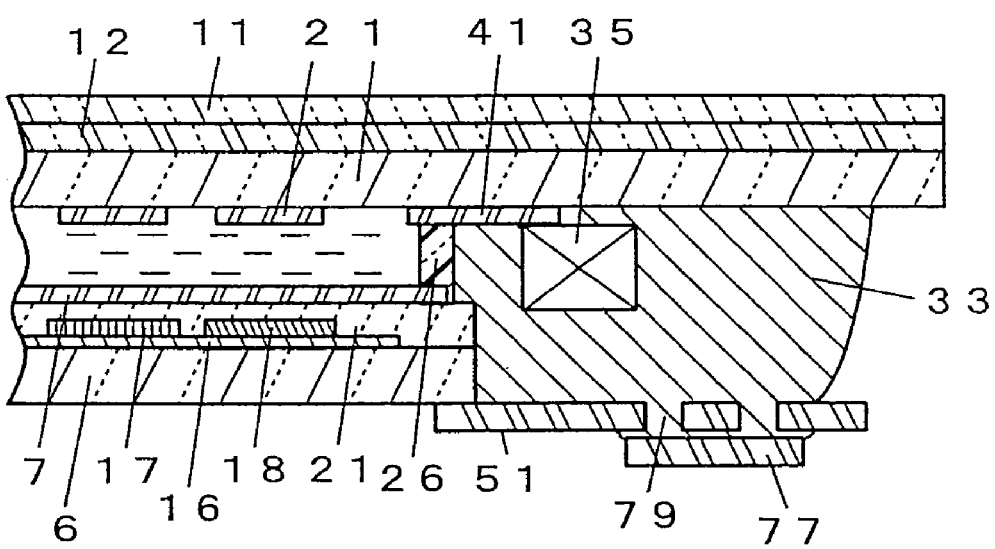
FIG. 36 is a cross-sectional view, corresponding to FIG. 35, showing the configuration of a modified example of the liquid crystal display panel of the twenty-first embodiment of the invention.

Twenty-first Embodiment: FIG. 34 to FIG. 36

Next, a twenty-first embodiment of the liquid crystal display panel of the invention and a modified example thereof will be described. FIG. 34 is a plan view of the liquid crystal display panel, FIG. 35 is a cross-sectional view taken along a line 35—35 shown in FIG. 34, and FIG. 36 is a cross-sectional view, corresponding to FIG. 35, showing the configuration of the modified example. In these drawings, the same numerals are assigned to portions corresponding to those in the eighth embodiment.

The twenty-first embodiment is characterized in that openings are provided in a covering member. The liquid crystal display panel of the twenty-first embodiment is also almost the same as that of the above-described eighth embodiment except for this point, and thus the description will be omitted or simplified except for the different point.

In this liquid crystal display panel, as shown in FIG. 34, a covering member 51 is provided with a plurality of openings 79. These openings 79 are, as shown in FIG. 35, for exhausting an excessive resin and bubbles 80 in application of an insulating resin 33. When providing small openings 79 near the end portion of a second substrate 6 and large openings 79 at a portion apart from the end portion, exhaustion of bubbles could be facilitated.

The openings 79 are provided as described above to exhaust the bubble and excessive resin for improved adhesion between the insulating resin 33 and the covering member 51 and prevention of occurrence of pinholes in the insulating resin 33, so that moisture permeation into the lead electrodes 41 can be effectively prevented.

Incidentally, when the openings 79 are provided, the insulating resin 33 can be prevented from greatly extending to the outside of the openings 79. This is because a portion of the insulating resin 33 flows out with the bubbles 80 from the openings 79, and progress of the insulating resin 33 stops near the openings 79. The resin flowing out in this event only needs to be wiped off before cure or cut away after the cure. Therefore, the openings 79 can also be used to decide a rough application position of the insulating resin 33.

Besides, the openings 79 shall be provided at such positions so as not to overlap with lead electrodes 41 or connecting electrodes 42 as seen from a first substrate 1 side. This configuration can reduce the influence due to non-existence of the covering member at the openings 79 to a minimum.

Further, in such a liquid crystal display panel, it is preferable to provide a cap covering member 77 covering the openings 79 as shown in FIG. 36 on the openings 79. When the cap covering member 77 is provided, it is possible to prevent moisture permeation by the cap covering member 77 even at the position of the openings 79 after the excessive resin and bubbles are exhausted. This eliminates a limit in position where the openings 79 are provided, so that the openings 79 can be provided at arbitrary positions to inject the insulating resin 33 and exhaust bubbles effectively.

In addition, for example, when a transparent resin is used as the insulating resin, the openings 79 are provided near the driving ICs 35 and 36, and a black cap covering member 77 is provided thereon to shield the driving ICs 35 and 36 from light as in the nineteenth embodiment for prevention of a malfunction thereof.

Twenty-second Embodiment: FIG. 37

Next, a twenty-second embodiment of the liquid crystal display panel of the invention will be described. FIG. 37 is a plan view of the liquid crystal display panel. In this drawing, the same numerals are assigned to portions corresponding to those in the eighth embodiment.

The twenty-second embodiment is characterized in that a covering member is provided in a manner to be divided for each driving IC. The liquid crystal display panel of the twenty-second embodiment is also almost the same as that of the above-described eighth embodiment except for this point, and thus the description will be omitted or simplified except for the different point.

In this liquid crystal display panel, as shown in FIG. 37, an insulating resin 33 is provided in a manner to be divided for each driving IC, and the covering member is provided also in a manner to be divided for each driving IC, as covering members 51'. Then, based on the above, the position where the lead electrodes are routed is changed so that the lead electrodes are not routed through a portion where the insulating resin 33 and the covering members 51' are not provided between two driving ICs 35 outside a sealant 26.

The covering member on one side of the substrate provided in a plurality of divided portions as in this liquid crystal display panel can decrease the stress exerted on the insulating resin 33 to prevent it from being broken or peeling off from a second substrate 6 even when there is a difference in thermal expansion coefficient between the covering member 51' and the substrate or even when the insulating resin 33 thermally contracts or thermally expands, and therefore the moisture permeability can stably be kept low. In addition, it becomes easy to exhaust bubbles forming in the insulating resin 33 and to apply the insulating resin 33.

This effect becomes greater as the covering member is divided into smaller portions for provision. However, the covering member in too smaller portions lowers the function of preventing moisture permeation itself, and thus it is preferable to provide the covering member in a manner to divide it for each driving IC in consideration of how to route lead electrodes 41.

Figure 38:
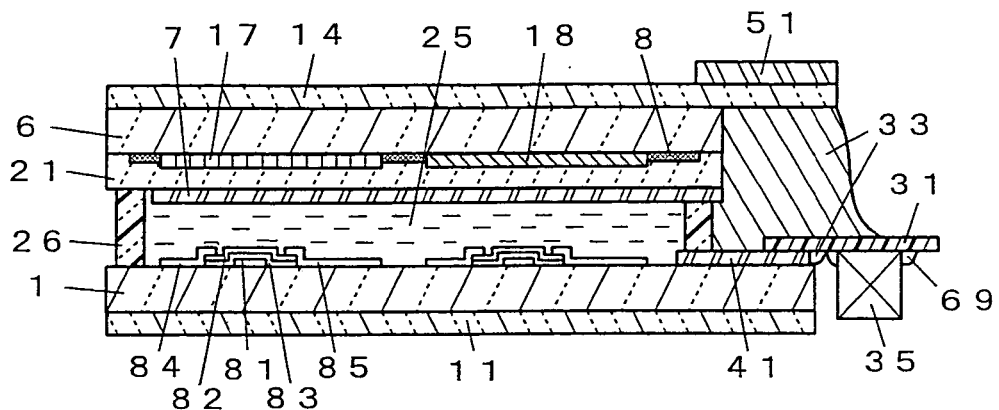
FIG. 38 is a cross-sectional view, corresponding to FIG. 15, showing a cross section of a first modified example of the liquid crystal display panel of the invention.

First Modified Example of Embodiments: FIG. 38

Next, a first modified example of each of the above-described embodiments will be described. FIG. 38 is a cross-sectional view, corresponding to FIG. 15, showing a cross section of the liquid crystal display panel of the modified example.

This first modified example is an example in which the invention is applied to a liquid crystal display panel being of an active matrix type using a thin film transistor (TFT) and having driving ICs provided on an FPC. An example in which the modification is applied to the eleventh embodiment will be described.

In this liquid crystal display panel, as shown in FIG. 38, a first substrate 1 is disposed on the lower side, and a second substrate 6 is disposed on the upper side in order to provide the TFT as a switching element on the first substrate 1. Further, on the first substrate 1, a gate electrode 81, a gate insulating film 82, and a semiconductor layer 83 are formed in this order, and further a source electrode 84 and a drain electrode 85 also serving as a display electrode are formed. Further, a semiconductor layer containing impurity ions (not shown) is provided between the source electrode 84 and the drain electrode 85 and the semiconductor layer 83. These constitute the TFT, and further an insulating film (not shown) is formed to prevent deterioration of characteristics of the TFT.

On the second substrate 6 opposite to the first substrate 1, there are provided a black matrix 8 for preventing light from leaking from the outer peripheral portion of a color filter and covering the periphery of a display region, and the color filter which is composed of a red (R) color filter 17, a green (G) color filter 18, and a blue (B) color filter (not shown). Then, on the color filter, a flattening film 21 is provided, and further a second electrode 7 made of a transparent conductive film is provided on the flattening protective film 21.

In this liquid crystal display panel, the intersection of the drain electrode 85 also serving as the display electrode connected to the TFT and the second electrode 7 becomes a pixel portion. Further, alignment films (not shown) are provided on the faces on a liquid crystal layer 25 side of the first substrate 1 and the second substrate 6 to align the liquid crystal molecules of the liquid crystal layer 25 in predetermined directions.

Besides, this liquid crystal display panel is a transmissive liquid crystal display panel with an auxiliary light source (not shown) disposed under the first substrate 1, in which a first polarizing film 11 is provided on the first substrate 1, and a second polarizing film 14 is provided on the second substrate 6.

Then, a lead electrode 41, which is connected to the gate electrode 81 or the source electrode 84 provided on the first substrate 1, is provided on the first substrate 1 having a larger outer shape than that of the second substrate 6, and led outside a sealant 26 and connected to an FPC 31. Then, driving ICs 35 are mounted on the FPC 31, and the periphery of the mounted portion is covered with a tape automated bonding (TAB) resin 69.

Also in this liquid crystal display panel, an insulating resin 33 is provided on and around the lead electrode 41 to cover at least a portion of the lead electrode 41 outside the sealant 26 as in the eleventh embodiment. Further, the insulating resin 33 is similarly provided also on a portion of the FPC 31. Then, a polarizing film having a size reaching the top of the insulating resin 33 is used as the second polarizing film 14 to be provided on the second substrate 6 and is used also as the insulating covering member, and a covering member 51 is further provided on the second polarizing film 14.

As compared to a passive matrix liquid crystal display panel with no switching element provided in each pixel portion, the active matrix liquid crystal display panel as this modified example can be made resistant to electrolytic corrosion because it is possible to use metal as the material of the lead electrode 41 and cover a portion of the lead electrode 41 with the insulating film constituting the switching element. However, when the moisture permeation preventing structure as in each of the above-described embodiments is applied to the active matrix liquid crystal display panel as described above, moisture permeation from a portion where a pinhole or scratch forms in the insulating film or the FPC 31 can be prevented for more reliable prevention of electrolytic corrosion.

Note that while the description is made here on the example using a three-terminal active element, it is needless to say that the same effect can be attained even when using a two-terminal active element.

While the description is made here on the example in which this modified example is applied to the eleventh embodiment, it is a matter of course that the modified example can be similarly applied also to other embodiments. This also applies to each of modified examples described below.

Figure 39:
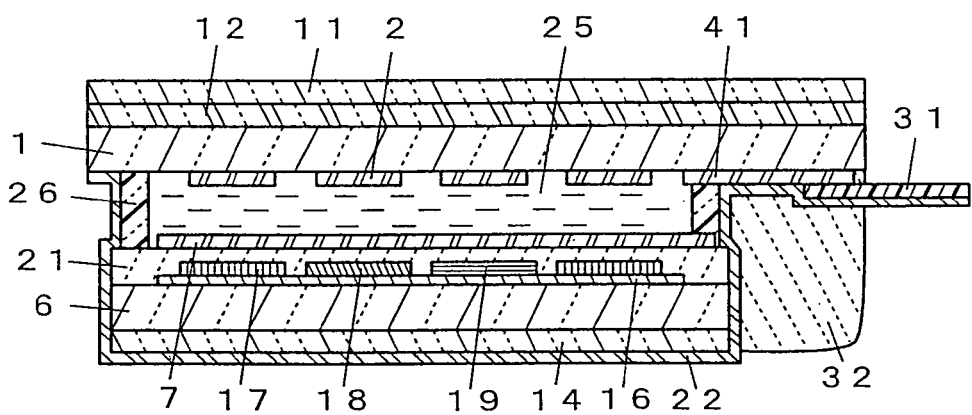
FIG. 39 is a cross-sectional view, corresponding to FIG. 2, showing a cross section of a second modified example of the liquid crystal display panel of the invention.

Second Modified Example: FIG. 39

Next, a second modified example of each of the above-described embodiments will be described. FIG. 39 is a cross-sectional view, corresponding to FIG. 2, showing a cross section of the liquid crystal display panel of the modified example.

This second modified example is an example in which the invention is applied to a liquid crystal display panel having a configuration in which an FPC is directly connected to lead electrodes. FIG. 39 shows an example in which the modification is applied to the second embodiment.

The invention, as shown in FIG. 39, can also be applied to a liquid crystal display panel in which an FPC 31 is directly connected to a lead electrode 41 without mounting a driving IC on a first substrate, and the driving IC is separately provided via the FPC 31.

In the case shown in FIG. 39, it is preferable that a thin film insulating layer 22 is provided on the lead electrode 41 and on the FPC 31 to cover at least a portion of the lead electrode 41 outside a sealant 26, and further an insulating resin 32 is provided thereon. Even in such a configuration that the FPC 31 is directly connected to the lead electrode 41, there is no recognition of occurrence of electrolytic corrosion at the lead electrode 41 because the thin film insulating layer 22 has very low moisture permeability. As a matter of course, the embodiment using the covering member is also applicable to such a liquid crystal display panel.

Figure 40:
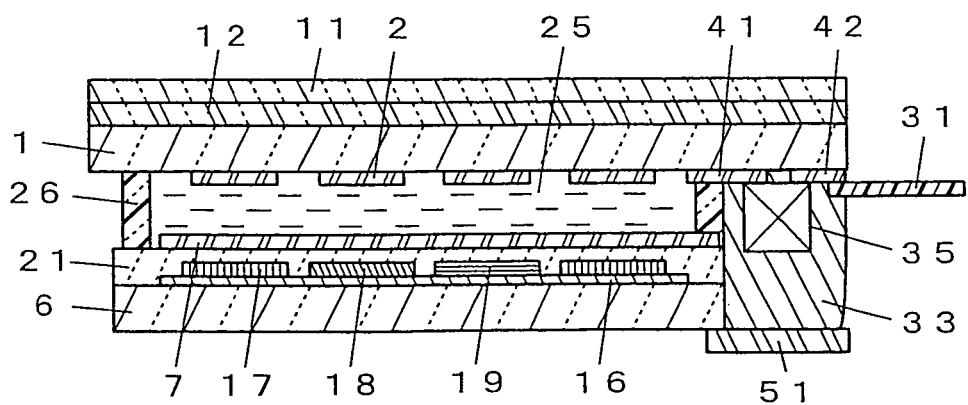
FIG. 40 is a cross-sectional view, corresponding to FIG. 15, showing a cross section of a third modified example of the liquid crystal display panel of the invention.
Figure 41:
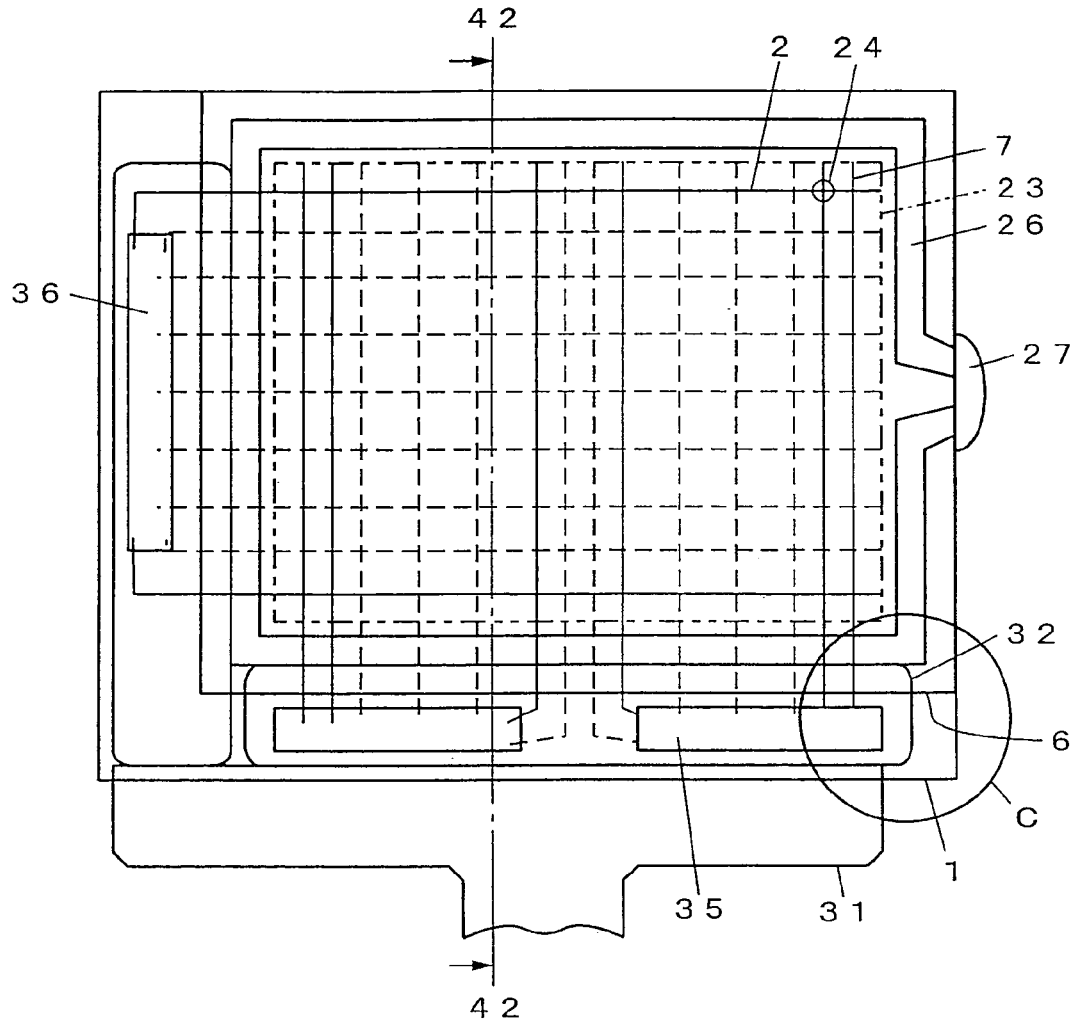
FIG. 41 is a plan view of a conventional liquid crystal display panel.
Figure 42:
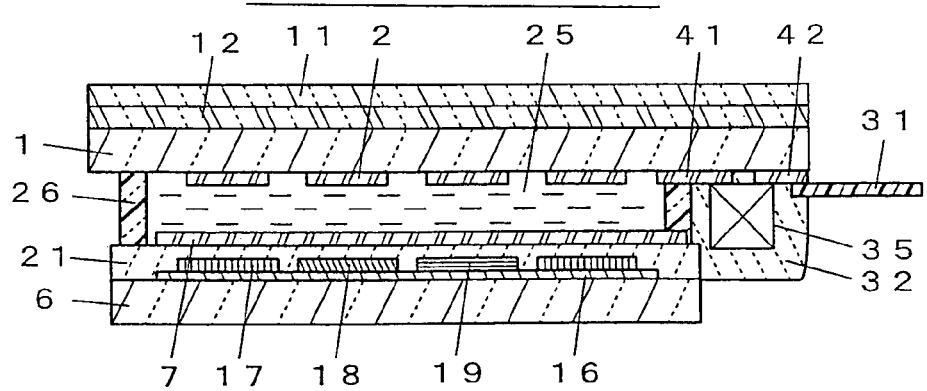
FIG. 42 is a cross-sectional view taken along a line 42—42 in FIG. 41.
Figure 43:
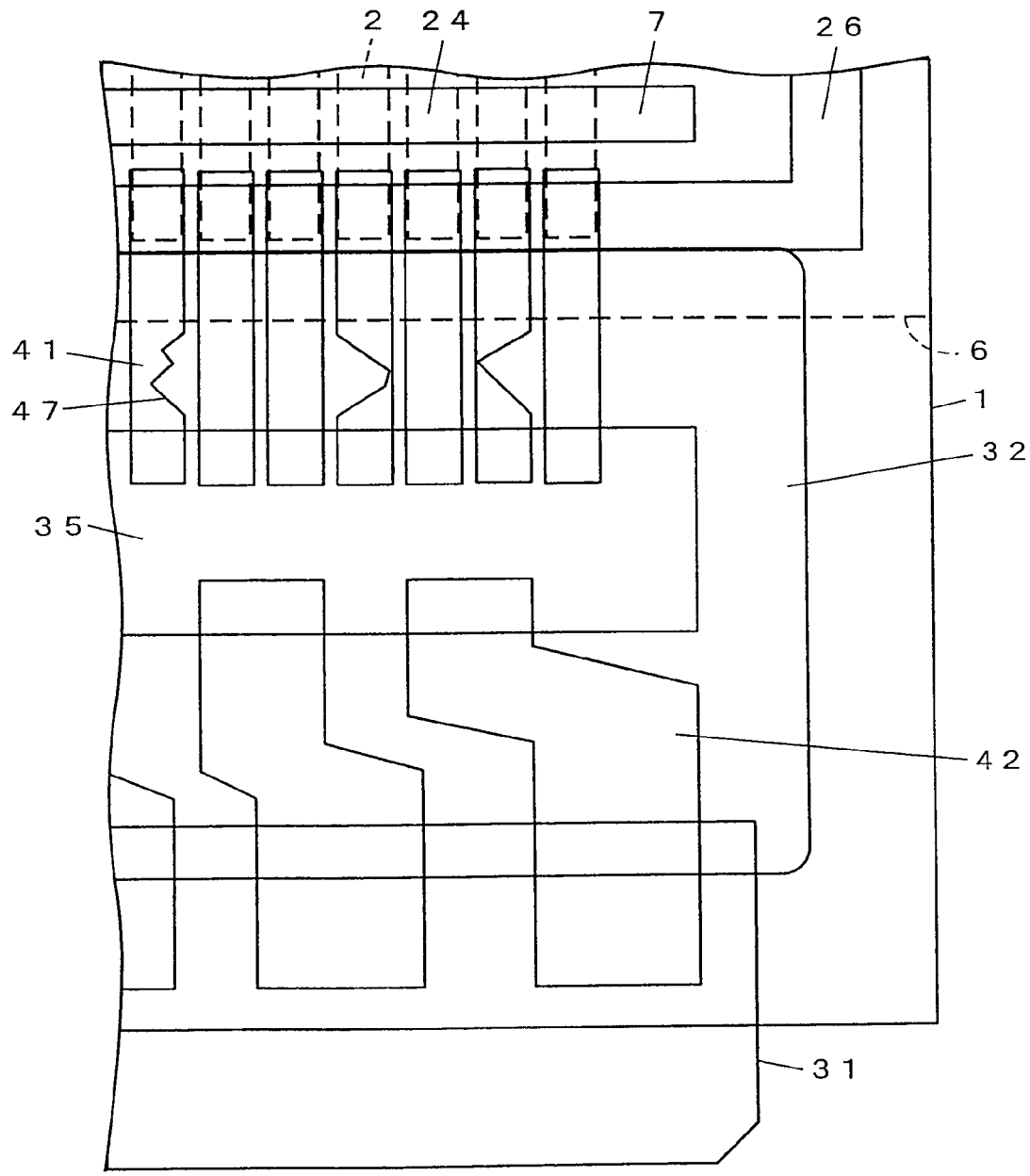
FIG. 43 is a partially enlarged plan view showing a part in circle C in FIG. 41.
Figure 44:
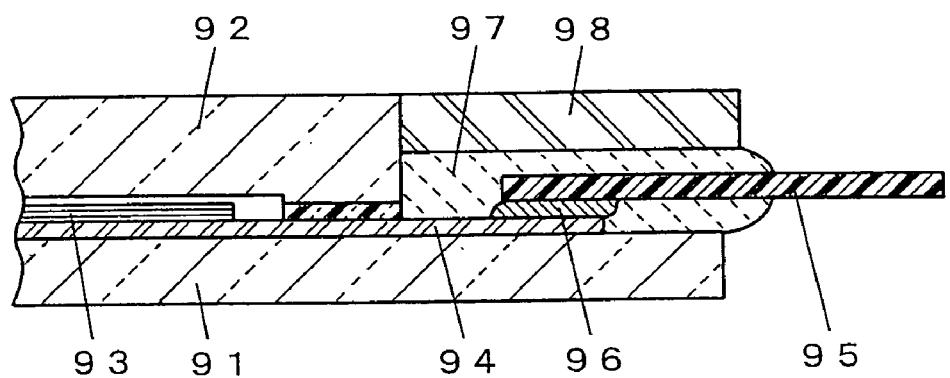
FIG. 44 is a cross-sectional view of another conventional liquid crystal display panel.

Third Modified Example: FIG. 40

Next, a third modified example of each of the above-described embodiments will be described. FIG. 40 is a cross-sectional view, corresponding to FIG. 15, showing a cross section of the liquid crystal display panel of the modified example.

This third modified example is characterized in that the outer shape of a second substrate is aligned with the outer shape of a sealant on the side where the lead electrode is led out. FIG. 40 shows an example in which the modification is applied to the eighth embodiment.

In the liquid crystal display panel in each of the above-described embodiments, it is preferable that the outer shape of a second substrate 6 is aligned with the outer shape of a sealant 26 at least on the side where lead electrode 41 is led out as shown in FIG. 40. The insulating resin and the thin film insulating layer are to be provided on the side where the lead electrode is led out in accordance with the characteristics of each embodiment. The above-mentioned configuration, however, can eliminate a narrow space between a first substrate 1 and the second substrate 6 outside the sealant 26, so that it is unnecessary to form the insulating resin and the thin film insulating layer in the narrow space, thus facilitating formation thereof. Further, it is also eliminated that the insulating resin provided in the space between the first substrate 1 and the second substrate 6 thermally expands or thermally contracts to deform the substrates and accordingly change the width of the gap, that is, the thickness of a liquid crystal layer 25 to thereby adversely affect display, so that the display quality can be improved.

Other Modified Examples

The description will be made on other modified examples applicable to the above-described embodiments.

First, the invention is applicable also to liquid crystal display panels using a guest-host liquid crystal, a scattering-type liquid crystal, and a fluorescent liquid crystal, which are capable of display without using a polarizing film. When there is a need to prevent influence of ultraviolet rays emitted during formation of the thin film insulating layer, it is preferable to use a transparent film having an ultraviolet absorbing material or ultraviolet reflecting material.

While the description is made here on the example using the COG method in which the driving ICs are mounted on the substrate, the invention is, of course, effective for measures against electrolytic corrosion in the case using a TAB mounting method, a COB mounting method, and a COF mounting method. For example, in the case of the TAB mounting method or COF mounting method in which the driving ICs are mounted on the FPC, the invention is effective also for protection of circuits around the driving ICs, because the thin film insulating layer prevents moisture permeation into the driving ICs.

While no example is shown here in which chip parts such as a resistor and so on are mounted directly on the first substrate or the second substrate, the thin film insulating layer which covers chip parts and connecting portions concurrently with the lead electrodes can prevent corrosion and electrolytic corrosion of the chip parts and connecting portions concurrently with electrolytic corrosion of the lead electrodes even when the chip parts are mounted directly.

Further, when the thin film insulating layer is provided on the polarizing film, the refractive index of the thin film insulating layer can be controlled to lower the surface reflectance for improved display quality of the liquid crystal display panel.

Further, it is needless to say that the above-described embodiments may be appropriately combined together to constitute a liquid crystal display panel having their characteristics.

INDUSTRIAL APPLICABILITY

As has been described, according to the liquid crystal display panel of the invention, the insulating covering member is provided to cover at least the portions of the lead electrodes outside the sealant and overlap with a portion of the second substrate so as to fully prevent moisture permeation into the lead electrode and prevent electrolytic corrosion from occurring in the lead electrode even when the panel is operated for a long time in an environment of a high temperature and high humidity, which enables improved display quality and reliability of the liquid crystal display panel.

Further, according to a fabricating method of the liquid crystal display panel of the invention, such a liquid crystal display panel can be easily fabricated.

What is claimed is:

1. A liquid crystal display panel, comprising:
a first substrate and a second substrate are opposed to each other with a predetermined gap provided therebetween, a liquid crystal layer is sealed in the gap with a sealant, pixel portions are formed by electrodes, said electrodes being provided on said first substrate and on said second substrate to oppose to each other via said liquid crystal layer, and lead electrodes for applying electric signals to said electrodes forming said pixel portions are provided on said first substrate,
wherein a covering member is provided to cover at least portions of said lead electrodes outside said sealant and overlap with at least a portion of a surface of said second substrate opposite to said liquid crystal layer, and
an insulating resin is provided on said covering member or between said covering member and said first substrate.

2. The liquid crystal display panel according to claim 1, wherein an integrated circuit element is mounted on said lead electrodes, and said covering member is provided also on said integrated circuit element.

3. The liquid crystal display panel according to claim 2, wherein a flexible connecting board is connected to said integrated circuit element, and said covering member is provided also at least on a portion of said flexible connecting board.

4. The liquid crystal display panel according to claim 3, wherein said covering member has portions overlapping with said insulating resin, said second substrate, and said flexible connecting board, respectively as seen from said first substrate side.

5. The liquid crystal display panel according to claim 3, wherein said covering member has portions overlapping with said insulating resin, said integrated circuit element, said second substrate, and said flexible connecting board, respectively as seen from said first substrate side.

6. A liquid display panel as recited in claim 1, wherein said covering member is an insulating covering member.

7. The liquid crystal display panel according to claim 6, wherein a flexible connecting board connected to said lead electrodes is provided, and said insulating covering member is provided also at least on a portion of said flexible connecting board.

8. The liquid crystal display panel according to claim 6, wherein a flexible connecting board for connecting said liquid crystal display panel to an external circuit is provided, and said insulating covering member is provided on both faces of said flexible connecting board.

9. The liquid crystal display panel according to claim 6, wherein said insulating covering member is provided also on a side face of said second substrate.

10. The liquid crystal display panel according to claim 9, wherein a reflecting layer is provided on one of said first substrate and said second substrate.

11. The liquid crystal display panel according to claim 6, wherein said insulating covering member is provided also on a side face of said first substrate or on a face of said first substrate opposite to a face provided with said lead electrodes.

12. The liquid crystal display panel according to claim 11, wherein a reflecting layer is provided on one of said first substrate and said second substrate.

13. The liquid crystal display panel according to claim 6, wherein a polarizing film is provided on at least one of said first substrate and said second substrate, and said insulating covering member is provided also on said polarizing film.

14. The liquid crystal display panel according to claim 6, wherein a polarizing film is provided on at least one of said first substrate and said second substrate, and wherein said insulating covering member is provided also between said polarizing film and said substrate provided with said polarizing film.

15. The liquid crystal display panel according to claim 6, wherein a second insulating covering member is provided on said insulating resin.

16. The liquid crystal display panel according to claim 6, wherein said insulating covering member is an insulating layer formed in a vacuum condition.

17. The liquid crystal display panel according to claim 16, wherein said insulating covering member is an insulating layer containing silicon.

18. The liquid crystal display panel according to claim 16, wherein said insulating covering member is an insulating layer which is made of metal oxide.

19. The liquid crystal display panel according to claim 6, wherein said insulating covering member is smaller in thickness than said liquid crystal layer.

20. The liquid crystal display panel according to claim 6, wherein said insulating covering member has a structure in which two or more different kinds of insulating films are laminated.

21. The liquid crystal display panel according to claim 6, wherein said insulating covering member is 200 nm to 500 nm in thickness.

22. The liquid crystal display panel according to claim 6, wherein said insulating covering member has a thermal expansion coefficient equal to that of said first substrate or said second substrate.

23. The liquid crystal display panel according to claim 6, wherein a polarizing film is provided, said polarizing film being used as said insulating covering member.

24. The liquid crystal display panel according to claim 6, wherein said insulating covering member is formed of glass.

25. The liquid crystal display panel according to claim 6, wherein said insulating covering member is formed of plastic.

26. The liquid crystal display panel according to claim 25, wherein said insulating covering member has a gas barrier layer or a moisture blocking layer.

27. The liquid crystal display panel according to claim 6, wherein said insulating covering member is formed of ceramics.

28. The liquid crystal display panel according to claim 6, wherein a flexible connecting board for connecting said liquid crystal display panel to an external circuit is provided, and a portion of said flexible connecting board is used as said insulating covering member.

29. The liquid crystal display panel according to claim 6, wherein a second insulating covering member is provided on said insulating covering member.

30. The liquid crystal display panel according to claim 1, wherein said covering member is a plate-shaped member.

31. The liquid crystal display panel according to claim 1, wherein a portion where said first substrate, said insulating resin, said second substrate, and said covering member overlap one another as seen from said first substrate side, is provided.

32. The liquid crystal display panel according to claim 1, wherein said first substrate and said covering member are bonded together with said insulating resin.

33. The liquid crystal display panel according to claim 1, wherein said covering member is bonded to both said first substrate and said second substrate with said insulating resin.

34. The liquid crystal display panel according to claim 1, wherein an integrated circuit element is mounted on said lead electrodes, and said insulating resin is provided between said integrated circuit element and said sealant.

35. The liquid crystal display panel according to claim 34, wherein said covering member has portions overlapping with said insulating resin, said integrated circuit element, and said second substrate, respectively as seen from said first substrate side.

36. The liquid crystal display panel according to claim 34, wherein said covering member is an insulating covering member and is in contact with both said integrated circuit element and said second substrate.

37. The liquid crystal display panel according to claim 1, wherein a flexible connecting board directly connected to said lead electrodes is provided, and said covering member has portions overlapping with said insulating resin, said second substrate, and said flexible connecting board, respectively as seen from said first substrate side.

38. The liquid crystal display panel according to claim 1, wherein said insulating resin is composed of at least two kinds of resins.

39. The liquid crystal display panel according to claim 1, wherein a polarizing film is provided, and said covering member is provided to be in contact with said polarizing film.

40. The liquid crystal display panel according to claim 1, wherein a polarizing film is provided, and said covering member is provided to have a predetermined gap with said polarizing film.

41. The liquid crystal display panel according to claim 1, wherein said covering member is formed of metallic material.

42. The liquid crystal display panel according to claim 41, wherein a second covering member is provided on said covering member.

43. The liquid crystal display panel according to claim 42, wherein said second covering member is an anodic oxide layer of said metallic material.

44. The liquid crystal display panel according to claim 1, wherein said insulating resin is constituted of an epoxy resin.

45. The liquid crystal display panel according to claim 1, wherein said insulating resin is constituted of an ultraviolet curing resin.

46. The liquid crystal display panel according to claim 1, wherein said insulating resin is constituted of a silicon resin.

47. The liquid crystal display panel according to claim 1, wherein said insulating resin has a light absorption material.

48. The liquid crystal display panel according to claim 1, wherein said insulating resin is constituted of a first insulating resin for covering at least portions of said lead electrodes and a second insulating resin for sealing a space formed by said first insulating resin, said first substrate, and said second substrate.

49. The liquid crystal display panel according to claim 1, wherein said covering member has a face in contact with said insulating resin and in a direction perpendicular to said first substrate.

50. The liquid crystal display panel according to claim 1, wherein said covering member has an opening.

51. The liquid crystal display panel according to claim 50, wherein said opening is provided at a portion not overlapping with said lead electrodes.

52. The liquid crystal display panel according to claim 50, wherein said opening is an opening for introducing said insulating resin, and said insulating resin has a swollen structure in said opening.

53. The liquid crystal display panel according to claim 1, wherein said covering member has a U-shaped cross section and is provided such that said first substrate is in contact with the inside of the letter U.

54. The liquid crystal display panel according to claim 53, wherein said covering member is in contact with at least two faces out of six faces being top and bottom, right and left, and front and back faces of said first substrate.

55. The liquid crystal display panel according to claim 53, wherein said covering member has a substrate groove for fitting said first substrate therein.

56. The liquid crystal display panel according to claim 53, wherein a flexible connecting board for connecting said liquid crystal display panel to an external circuit is provided, and
wherein said covering member is provided with an opening for passing said flexible connecting board therethrough.

57. The liquid crystal display panel according to claim 1, wherein a flexible connecting board for connecting said liquid crystal display panel to an external circuit is provided, and
wherein said insulating resin is provided also at least on respective portions of both faces of said flexible connecting board.

58. The liquid crystal display panel according to claim 1, wherein said covering member comprises a black member and is used as a panel cover to be provided on an outer periphery of a display region constituted of said pixel portions.

59. The liquid crystal display panel according to claim 1, wherein an outer shape of said second substrate aligns with an outer shape of said sealant at least on a side where said lead electrodes are led out to the outside of said sealant.

60. The liquid crystal display panel according to claim 1, wherein an integrated circuit element mounted on said lead electrodes is provided, and said covering member is provided also on said integrated circuit element and is colored in black on said integrated circuit element.

61. The liquid crystal display panel according to claim 1, wherein an outer peripheral wall for preventing said insulating resin from flowing out is provided on at least a portion of an outer periphery of a region where said insulating resin is to be provided.

62. The liquid crystal display panel according to claim 1, wherein said covering member is provided in a plurality of divided parts.

63. The liquid crystal display panel according to claim 1, wherein said covering member is 80 μm to 150 μm in thickness.

* * * * *